(12) United States Patent
Koo

(10) Patent No.: US 12,125,330 B2
(45) Date of Patent: *Oct. 22, 2024

(54) RETAIL LIGHT-BASED SENSOR-DRIVEN MESSAGING SYSTEMS

(71) Applicant: John C. S. Koo, Los Angeles, CA (US)

(72) Inventor: John C. S. Koo, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,260

(22) Filed: Jun. 12, 2023

(65) Prior Publication Data

US 2023/0326272 A1 Oct. 12, 2023

Related U.S. Application Data

(63) Continuation of application No. 17/327,684, filed on May 22, 2021, now Pat. No. 11,727,737, which is a
(Continued)

(51) Int. Cl.
*G07C 9/28* (2020.01)
*G01S 5/16* (2006.01)
(Continued)

(52) U.S. Cl.
CPC .................. *G07C 9/21* (2020.01); *G01S 5/16* (2013.01); *G06F 3/0481* (2013.01); *G06F 21/00* (2013.01);
(Continued)

(58) Field of Classification Search
CPC . G01S 3/783; G01S 5/16; G06F 21/00; G06F 21/31; G06F 21/32; G06F 3/0481;
(Continued)

(56) References Cited

U.S. PATENT DOCUMENTS 6,201,234 B1 3/2001 Chow et al.
10,679,448 B2 6/2020 Koo
(Continued)

OTHER PUBLICATIONS

Printout from http://www.economist.com/node/21543470 on Apr. 5, 2012.
(Continued)

*Primary Examiner* — Dionne Pendleton
(74) *Attorney, Agent, or Firm* — LOZA & LOZA LLP; Joseph Swan

(57) ABSTRACT

Provided is an in-store dual-mode communication system in which shelves are disposed within a commercial space. A server is coupled to the Internet and/or a wide-area network and is configured to send and receive communications. Also provided are light-based messaging units that are located on and/or attached to such shelves, each: 1) having a light source, 2) receiving a communication from the server, and 3) in response to receipt of such communication, turning the light source on and off so as to broadcast a digital message that was included within such communication, as a binary-encoded digital signal corresponding to on/off states of the light source. A user device: (i) receives, via its light sensor, and then decodes the binary-encoded digital signal from a light-based messaging unit in order to obtain the digital message that corresponds to it; and also (ii) communicates with the server via its wireless interface.

21 Claims, 19 Drawing Sheets

Related U.S. Application Data continuation of application No. 16/890,119, filed on Jun. 2, 2020, now Pat. No. 11,049,344, which is a continuation-in-part of application No. 16/530,767, filed on Aug. 2, 2019, now Pat. No. 10,679,448, which is a continuation-in-part of application No. 16/507,192, filed on Jul. 10, 2019, now Pat. No. 10,810,645, and a continuation-in-part of application No. 16/048,477, filed on Jul. 30, 2018, now Pat. No. 10,395,453, said application No. 16/507,192 is a continuation of application No. 15/263,180, filed on Sep. 12, 2016, now Pat. No. 10,395,290, said application No. 16/048,477 is a continuation of application No. 14/996,718, filed on Jan. 15, 2016, now Pat. No. 10,068,396, which is a continuation of application No. 13/954,319, filed on Jul. 30, 2013, now Pat. No. 9,270,627, which is a continuation-in-part of application No. 13/787,737, filed on Mar. 6, 2013, now abandoned, which is a continuation-in-part of application No. 13/559,372, filed on Jul. 26, 2012, now Pat. No. 8,924,255.

(60) Provisional application No. 62/253,363, filed on Nov. 10, 2015.

(51) Int. Cl.

| | | |
|---|---|---|
| *G06F 3/0481* | (2022.01) | |
| *G06F 21/00* | (2013.01) | |
| *G06F 21/31* | (2013.01) | |
| *G06Q 10/00* | (2023.01) | |
| *G06Q 30/02* | (2023.01) | |
| *G06Q 30/0601* | (2023.01) | |
| *G07C 9/00* | (2020.01) | |
| *G07C 9/21* | (2020.01) | |
| *G07C 9/22* | (2020.01) | |
| *G07C 9/25* | (2020.01) | |
| *H04B 10/114* | (2013.01) | |
| *H04B 10/116* | (2013.01) | |
| *H04B 10/66* | (2013.01) | |
| *H04B 10/67* | (2013.01) | |
| *H04J 14/08* | (2006.01) | |
| *H04L 9/40* | (2022.01) | |
| *H04W 4/33* | (2018.01) | |
| *G01S 3/783* | (2006.01) | |
| *G06Q 10/107* | (2023.01) | |
| *G07C 9/26* | (2020.01) | |

(52) U.S. Cl.
CPC .............. *G06F 21/31* (2013.01); *G06Q 10/00* (2013.01); *G06Q 30/02* (2013.01); *G06Q 30/0281* (2013.01); *G06Q 30/0641* (2013.01); *G07C 9/00182* (2013.01); *G07C 9/22* (2020.01); *G07C 9/257* (2020.01); *G07C 9/28* (2020.01); *H04B 10/1141* (2013.01); *H04B 10/116* (2013.01); *H04B 10/66* (2013.01); *H04B 10/676* (2013.01); *H04J 14/08* (2013.01); *H04L 63/10* (2013.01); *H04W 4/33* (2018.02); *G01S 3/783* (2013.01); *G06Q 10/107* (2013.01); *G07C 2009/00253* (2013.01); *G07C 9/26* (2020.01)

(58) Field of Classification Search
CPC .. G06F 16/2457; G06Q 10/00; G06Q 10/107; G06Q 30/02; G06Q 30/0281; G06Q 30/0641; G06Q 20/3224; G07C 2009/00253; G07C 9/00182; G07C 9/21; G07C 9/22; G07C 9/257; G07C 9/26; G07C 9/28; H04B 10/1141; H04B 10/1149; H04B 10/116; H04B 10/66; H04B 10/676; H04J 14/08; H04L 63/10; H04W 12/08; H04W 4/021; H04W 4/024; H04W 4/33; H04W 4/029; H04W 4/80; G01C 21/206

See application file for complete search history.

(56) References Cited

U.S. PATENT DOCUMENTS

| | | | |
|---|---|---|---|
| 11,049,344 B2 | 6/2021 | Koo | |
| 11,727,737 B2 * | 8/2023 | Koo | G06F 21/32 340/5.21 |
| 2006/0239675 A1 | 10/2006 | Ilzuka et al. | |
| 2008/0281515 A1 | 11/2008 | Ann et al. | |
| 2008/0292320 A1 | 11/2008 | Pederson | |
| 2008/0310850 A1 | 12/2008 | Pederson et al. | |
| 2011/0007672 A1 | 1/2011 | Park et al. | |
| 2011/0195686 A1 | 8/2011 | Darling | |
| 2011/0217044 A1 | 9/2011 | Kang et al. | |
| 2011/0243570 A1 | 10/2011 | Kim et al. | |
| 2012/0050061 A1 | 3/2012 | Timm et al. | |
| 2012/0102409 A1 | 4/2012 | Fan et al. | |
| 2012/0116861 A1 * | 5/2012 | Dobyns | H04B 5/24 705/14.34 |
| 2012/0214515 A1 | 8/2012 | Davis et al. | |
| 2012/0286698 A1 | 11/2012 | Pas | |
| 2013/0217332 A1 * | 8/2013 | Altman | G06Q 20/3224 455/3.01 |
| 2013/0317916 A1 | 11/2013 | Gopalakrishnan et al. | |
| 2014/0280316 A1 * | 9/2014 | Ganick | G06F 16/2457 707/769 |
| 2015/0229422 A1 | 8/2015 | Guagenti et al. | |
| 2019/0311592 A1 | 10/2019 | Wulff | |
| 2019/0394404 A1 * | 12/2019 | Becker | G01S 17/894 |
| 2020/0287624 A1 | 9/2020 | Darbi | |

OTHER PUBLICATIONS

Printout from http://en.wikipedia.org/wiki/Li-Fi on Apr. 5, 2012.
Printout from http://www.newscientist.com/article/mg21128225.400-will-lifi-be-the-new-wifi.html on Apr. 5, 2012.
Rodney S. Tucker, Gadi Eisentstein, Steven K. Korotky, "Optical Time-Division Multiplexing For Very High Bit-Rate Transmission", Nov. 1988 Journal of Lightwave Technology, vol. 6 No. 11 pp. 1737 and 1747-1749.
Printout of webpage at http://www.merriam-webster.com/dictionary/game, Merriam-Webster Online Dictionary definition of "game", on Aug. 22, 2013.
Prosecution history of, including prior art cited in, parent U.S. Appl. No. 13/559,372, filed Jul. 26, 2012 (now U.S. Pat. No. 8,924,255).
Prosecution history of, including prior art cited in, parent U.S. Appl. No. 13/787,737, filed Mar. 6, 2013.
Prosecution history of, including prior art cited in, parent U.S. Appl. No. 13/954,319, filed Jul. 30, 2013 (now U.S. Pat. No. 9,270,627).
Prosecution history of, including prior art cited in, parent U.S. Appl. No. 14/996,718, filed Jan. 15, 2016 (now U.S. Pat. No. 10,068,396).
Prosecution history of, including prior art cited in, parent U.S. Appl. No. 16/048,477, filed Jul. 30, 2018 (now U.S. Pat. No. 10,395,453).
Prosecution history of, including prior art cited in, parent U.S. Appl. No. 15/263,180, filed Sep. 12, 2016 (now U.S. Pat. No. 10,395,290).
Prosecution history of, including prior art cited in, parent U.S. Appl. No. 16/507,192, filed Jul. 10, 2019.
Prosecution history of, including prior art cited in, parent U.S. Appl. No. 16/530,767, filed Aug. 2, 2019 (now U.S. Pat. No. 10,679,448).
Prosecution history of, including prior art cited in, parent U.S. Appl. No. 16/890,119, filed Jun. 2, 2020 (U.S. Pat. No. 11,049,344).
Prosecution history of, including prior art cited in, parent U.S. Appl. No. 17/327,684, filed May 22, 2021.

* cited by examiner

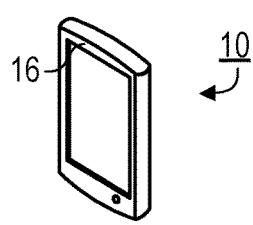
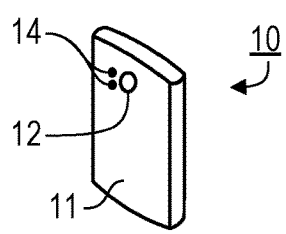
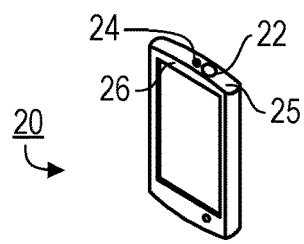
FIG. 1A (Prior Art)　　FIG. 1B (Prior Art)　　FIG. 2
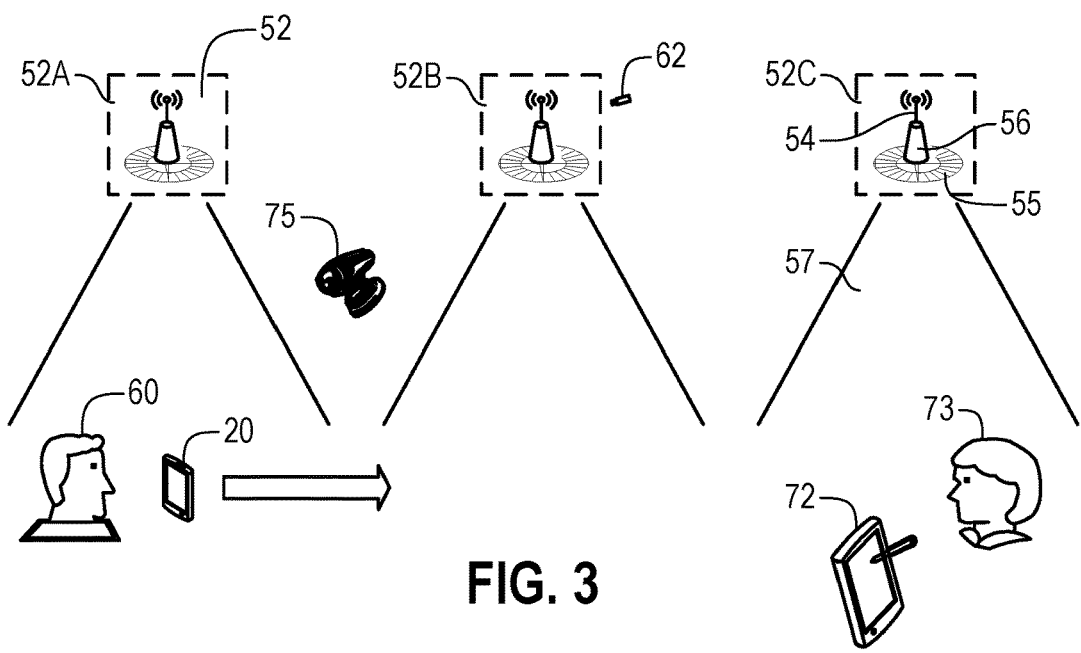
FIG. 3
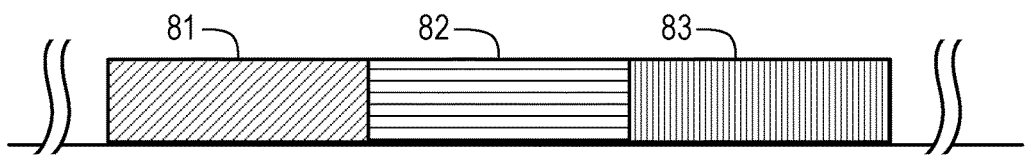
FIG. 4

RETAIL LIGHT-BASED SENSOR-DRIVEN MESSAGING SYSTEMS

FIELD OF THE INVENTION

The present invention pertains to systems for sending and/or receiving messages, e.g., using light-based communications either in whole or in part, such as individualized messages based on the locations and/or characteristics of the recipients and/or other individuals.

BACKGROUND

A variety of different messaging systems currently exist. Examples include SMS or text messaging, e-mail, Twitter, Facebook and other social-network messaging protocols. However, each of such systems has its own shortcomings. The present inventor has discovered that one significant problem with existing messaging systems is that they fail to adequately take into account the locations of the individuals who are communicating. Efforts to address this problem typically focus on the use of a global positioning system (GPS) or, in some cases, an indoor variation of such a system. Unfortunately, the present inventors discovered that such solutions often do not work well. Another problem with existing messaging systems that has been discovered by the present inventor is that they often are inadequate at personalizing or individualizing messages.

Also, systems have been used or proposed for tracking and/or monitoring the locations of people or objects. Most of such systems use GPS or related techniques. However, such systems have a number of drawbacks, e.g., in terms of cost and/or the amount of effort required to implement them.

Still further, systems have been used or proposed for providing secured access to various kinds of resources, such as data or physical locations. Such systems typically rely on the use of passwords, physical keys or biometric information. However, these systems also have drawbacks.

SUMMARY OF THE INVENTION

The present invention addresses the foregoing problems, e.g., by providing systems, apparatuses, methods and techniques that employ light-based messaging. Such approaches often can provide: fairly precise location-based and/or characteristic-based message targeting, e.g., for large numbers of people in locations that would not be appropriate for GPS-based systems; spatial tracking of people, machines and other objects; and/or enhanced security systems.

Thus, one embodiment of the invention is directed to a messaging system that includes: messaging units disposed at different locations within a space, each including at least one light source (e.g., light-emitting diode or LED); at least one messaging/modulation controller coupled to the light sources and configured to turn the light sources on and off so as to broadcast input digital messages; a central server coupled to the messaging/modulation controller(s) and configured to selectively provide messages to the messaging/modulation controller(s) for broadcast by different ones of the messaging units; and an associate device coupled to the central server and configured to: (a) display a user interface for manually inputting information about individuals within the space and (b) provide such information to the central server. Preferably, the central server selects messages to be broadcast by individual ones of the messaging units based on the information received from the associate device.

Another embodiment is directed to a messaging system that includes multiple messaging units at different locations within a commercial space, with each of such messaging units including: a light-emitting diode (LED) or other light source; and a messaging/modulation controller coupled to the light source and configured to turn the light source on and off so as to broadcast a digital message, with each of the messaging units configured to broadcast a different digital message, including substantive content that is different from what is broadcast by the other messaging units.

A still further embodiment is directed to a location monitoring system that includes: (a) a plurality of messaging units disposed at different locations within a space, each of such messaging units including: (i) a light source, and (ii) a messaging/modulation controller coupled to the light source and configured to turn the light source on and off so as to broadcast a digital message; and (b) a receiving unit that includes: (i) a light sensor, and (ii) a processor coupled to the light sensor. The messaging units are configured to broadcast different location codes via their corresponding light sources, and the processor is configured to (1) receive the location codes through the light sensor, (2) in response, to obtain location information based on the location codes, and (3) at least one of store and use, or cause the transmission of, the location information.

A still further embodiment is directed to a security system that includes: (a) a messaging unit that includes: (i) a light source, and (ii) a messaging/modulation controller coupled to the light source and configured to turn the light source on and off so as to broadcast a digital message; and (b) a receiving unit that includes: (i) a light sensor, and (ii) a processor coupled to the light sensor; and (c) an access-control unit that includes: (i) a user interface, and (ii) a processor coupled to the user interface. The receiving unit is configured to receive the digital message broadcast by the messaging/modulation controller and, in response, to at least one of display or transmit information based on such broadcast digital message. The user interface of the access-control unit is configured to input a code based on the displayed or transmitted information, and the processor of the access-control unit is configured to verify whether the input code corresponds to a reference code that is based on the digital message broadcast by the messaging/modulation controller and, only if so, to provide access to a secure resource.

Another embodiment is directed to a messaging system that includes: (a) messaging units disposed in different locations within a commercial space, each including a light-emitting diode (LED); (b) a messaging/modulation controller coupled to the LED and configured to turn the LED on and off so as to broadcast a digital message as a binary-encoded digital signal corresponding to on/off states of the LED; and (c) a user interface, coupled to the messaging/modulation controller, that permits a user to create schedules that specify how and when specified messages are to be broadcast by such messaging units. Different ones of the messaging units are configured to broadcast different digital messages, including substantive content that is different from what is broadcast by other ones of the messaging units, in accordance with the schedules input through the user interface.

Another embodiment is directed to an in-store dual-mode communication system in which shelves are disposed within a commercial space. A server is coupled to the Internet and/or to a wide-area network and is configured to send and receive communications. Also included within the system are light-based messaging units, located on and/or attached to such shelves, each: 1) having a light source, 2) receiving one of the communications from the server, and 3) in response to receipt of such communication, turning the light source on and off so as to broadcast a digital message that was included within such communication, as a binary-encoded digital signal corresponding to on/off states of the light source. A user device that includes a light sensor and a wireless interface for communicating via at least one of WiFi or a cellular-based Internet service: (i) receives, via the light sensor, and then decodes the binary-encoded digital signal from at least one of the light-based messaging units in order to obtain the digital message that corresponds to such light-based messaging unit(s); and also (ii) communicates with the server via its wireless interface.

A still further class of embodiments is directed to an in-store dual-mode communication system that includes: shelves disposed within a commercial space; a server, coupled to the Internet and/or to a wide-area network, and configured to send and receive communications; and multiple light-based messaging units, each: 1) having a light source, and 2) turning the light source on and off so as to broadcast a digital message as a binary-encoded digital signal corresponding to on/off states of the light source. The system also includes a user device that has: (i) a light sensor, and (ii) a wireless interface for communicating via at least one of WiFi or a cellular-based Internet service. Preferably, the light-based messaging units are: located on and/or attached to such shelves; and/or are oriented so as to emit light beams that are directed toward and illuminate such shelves. In any event, the user device: (a) receives, via its light sensor, the binary-encoded digital signal from at least one of the light-based messaging units; and then (b) based on such binary-encoded digital signal, communicates with the server via its wireless interface.

Optionally, in any of the foregoing embodiments, or in any of the other embodiments discussed herein: (a) the light sensor used to receive the binary-encoded digital signal from such light-based messaging unit(s) includes, and/or is part of, a camera, such camera also captures image information that is representative of at least one image, and upon initiation of such communications with the server via the wireless interface, the user device transmits such image information to the server; (b) in response to receiving such image information, the server generates and transmits an assisted-reality element to the user device; (c) the user device displays such assisted-reality element superimposed on a frame captured by the camera, and such assisted-reality element functions as a link to additional network resources; (d) such link, when designated, establishes a real-time two-way audio communications call; (e) the server performs image-recognition processing on such image information in order to identify an individual product within such image information, and the assisted-reality element pertains to such individual product; (f) along with such image information, the user device transmits message information based on the binary-encoded digital signal, and the server first uses such message information to identify a set of potential products from which the server then identifies such individual product from such set; (g) the set of potential products includes not more than 30 different products; (h) the message information includes repeated samples of incident light that had been taken at a rate of at least 50 samples per second, the server decodes such message information to obtain identifier(s) for corresponding light-based messaging unit(s), and the server identifies the set of potential products as products within a vicinity of such corresponding light-based messaging unit(s); (i) the message information includes an identifier for a specific one of the light-based messaging units, and the server identifies the set of potential products as products within a vicinity of such specific one of such light-based messaging units; (j) the user device identifies such specific one of the light-based messaging unit by first sampling incident light at a rate of at least 50 samples per second to generate a received signal and then decoding such received signal; (k) the user device decodes the received signal using a code division multiple access (CDMA) decoding technique; (l) the user device first decodes the binary-encoded digital signal in order to obtain a digital message embedded within the binary-encoded digital signal and then communicates with the server via its wireless interface based on such digital message; (m) the digital message that corresponds to the binary-encoded digital signal from such light-based messaging unit(s) identifies a communications address to which the user device initiates communications with the server via its wireless interface; (n) such communications address is provided as a link on a display of the user device, and the user device initiates communications with the server at such communications address in response to designation of such link by a user; and/or (o) the user device initiates communications with the server via the wireless interface in response to reception of the binary-encoded digital signal from the light-based messaging unit(s).

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIGS. 1A&B are front and rear perspective views, respectively, of a small, portable, mobile device.

FIG. 2 is a front perspective view of an alternate small, portable, mobile device.

FIG. 3 is a block diagram of a messaging system according to a representative embodiment of the present invention.

FIG. 4 illustrates an exemplary timeline showing time-division multiplexing of multiple different messages.

DESCRIPTION OF THE PREFERRED EMBODIMENT(S)

Figure 5:
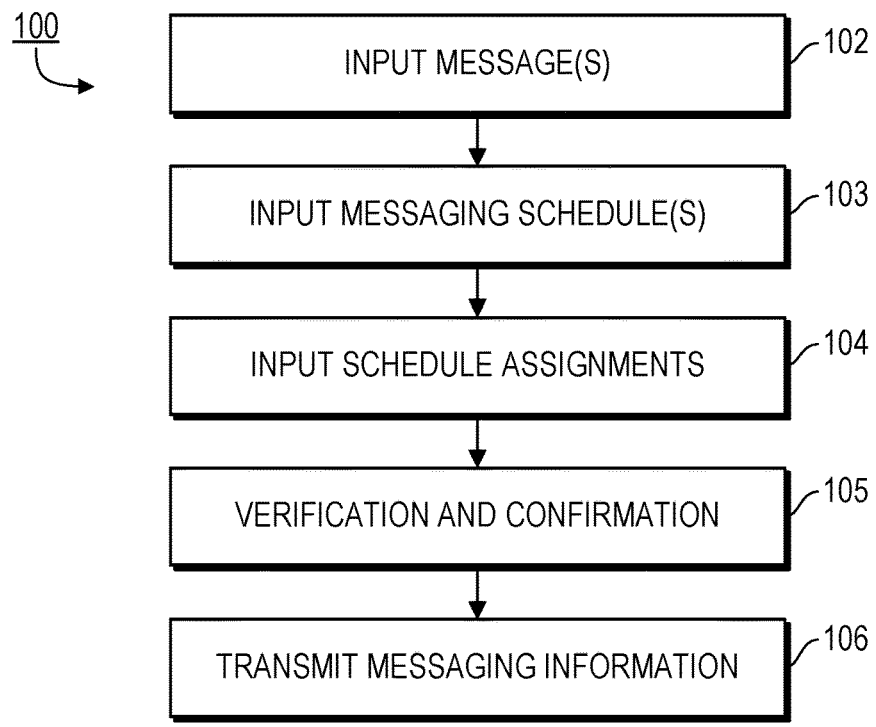
FIG. 5 is a flow diagram illustrating a process, executed by a central computer, for enabling an administrator to create and distribute a messaging pattern.

Any of a variety of different conventional, portable, typically handheld user devices can be used within, or included within, a system according to the preferred embodiments of the present invention. One example of such a user device 10 (which could be a mobile cellular-based phone or a tablet computer) is shown in FIGS. 1A&B. As shown, user device 10 includes, on its back side 11, a light sensor 12 (typically a camera) and one or more light sources 14 (such as light-emitting diodes or LEDs, e.g., of the type conventionally placed in close proximity to the camera 12 and used as a camera flash, among other things). To achieve greater reception efficiency in certain environments, a user device 20 (e.g., a mobile phone or tablet computer), shown in FIG. 2, also (or instead) includes a light sensor 22 (such as a camera or a simple light-detecting sensor) and/or a light source 24 (preferably one or more LEDs) on its top edge 25. Similarly, a light sensor and/or a light source also (or instead) can be included on the front side 16 or 26 of a user device (e.g., user device 10 or 20, respectively).

For ease of description, the following discussion typically refers to user device 10 or user device 20; however, it should be understood that either such reference can be replaced with a reference to the other or to any other portable (typically handheld) user device, such as any of the devices contemplated herein. In fact, any appropriately configured user device can be used in any embodiment of the present invention. The preferred user device includes at least: (1) a processor and storage medium for executing and storing a software application (or set of computer-executable process steps) to provide the functionality ascribed to user device 10 or 20 herein (typically referred to herein as the "user app"); (2) a light sensor for receiving the broadcast, modulated light discussed herein; and (3) one or more hardware user interface components (typically, a display screen and/or a speaker or output audio jack) for presenting the received messages that are discussed herein. It is noted that the expression "presenting messages" and similar expressions are used herein to refer to visually showing, displaying, playing or otherwise providing such messages, which could involve presenting any kind of content or any combination of different kinds of content (e.g., any combination of text, graphics, images, audio and/or video content). In addition, in certain embodiments it is preferable for the user device 10 or 20 to have other hardware and/or software capabilities, such one or more wireless network interfaces to wirelessly access the Internet (e.g., via Wi-Fi and/or via a mobile cellular network) and/or a light source for also (or even instead) transmitting messages within a system according to the present invention.

Location-Based Messaging within a Designated Space.

One such system 50, shown in FIG. 3, includes a user device 20 (preferably running the user app) and a plurality of messaging units 52 (such as messaging units 52A-C) disposed at different locations throughout an overall space. In the preferred embodiments, this space is a commercial space, such as a single retail store (or other establishment) or a shopping center or mall containing a plurality of independently managed and/or operated retail establishments. However, a system according to the present invention can be implemented in any kind of (typically large) space. Although only three messaging units 52A-C are shown in FIG. 3, more typically there will be many more such messaging units 52, e.g., at least 5-50 such units.

Each of the messaging units 52 preferably includes one or more light sources 55 (typically, each such light source including one or more LEDs) and a processor-based messaging/modulation controller 56. However, the messaging/modulation controller 56 need not be included within a messaging unit 52; instead, one or more messaging/modulation controllers 56 may be coupled to one or more messaging units 52 (so that each controller 56 controls one or more messaging units 52). Nevertheless, for ease of description, the following discussion assumes that each messaging unit 52 includes its own controller 56.

In the current embodiments, each messaging unit 52 broadcasts a digital message, including substantive content that is different than the substantive content of the digital messages broadcast by all (or a majority or at least some) of the other messaging units 52. However, such messages preferably are coordinated with each other in order to provide a desired overall user experience. To broadcast such message(s), each controller 56 modulates (typically by turning on and off) the light 57 emitted from the unit's light source 55. Then, as any particular user device 20 is moved about within the space covered by the messaging units 52, it receives the light 57, and therefore the corresponding digital message, from different ones of the messaging units 52. For example, as depicted in FIG. 3, user device 20 currently is receiving and presenting to user 60 any message(s) broadcast by messaging unit 52A; then, as user device 20 is moved forward by user 60, it ceases to receive (or at least to present to user 60) messages broadcast from messaging unit 52A and begins to receive and present to user 60 messages broadcast from messaging unit 52B. In this way, the system 50 provides a structure for communicating different messages at different locations within the overall space and, typically, for fairly precisely controlling what messages are presented at different locations and/or (e.g., in the embodiment described below in reference to FIG. 10) even at different orientations of the user 60.

Each light source 55 preferably is modulated on and off at a very high rate (e.g., at least 1,000, 10,000, 100,000, 1 million, 10 million or 100 million times per second) so that, although a binary signal is being broadcast via such modulation, the variation is too fast to be noticed by the human eye. The sensor 22 of user device 20 receives this modulated light, decodes it and presents the corresponding message, in accordance with the logical rules encoded in the user app and, in some embodiments, with the user app referencing data that it previously stored into the memory of user device 20.

The user app often will have been initially downloaded by the user device 20 via a wireless Internet connection or else will have been downloaded by a different computer (via its Internet connection) and then transferred to user device 20. Upon such initial downloading, the user 60 preferably has the ability to establish a profile (and in some cases is incentivized or required to do so), and preferably may elect to have special offers and/or suggestions delivered to him or her via in-store communications and/or may elect to have such notifications sent to him or her, irrespective of his or her location, by e-mail, via a social-networking site or in any other manner Thereafter, updates to the user app and/or additional (e.g., pre-stored) content can be received in either of those ways, or instead can be downloaded from one of the messaging units 52 (e.g., the first messaging unit 52 that device 20 receives from after entering the space. Still further, if the user device 20 previously had an application for interfacing with Li-Fi system 50, the user app initially could have been downloaded from one of the messaging units 52.

As indicated above, in addition to transferring messages and delivery schedules into the controller 56, in certain embodiments of the present invention pre-stored content also can be placed in the controller 56. Typically, such pre-stored content is content that is intended to be used by multiple different messages and can include, e.g., logos, backgrounds, music and/or other audio clips.

The digital messages and other content broadcast by the messaging units 52 can be encoded using any of the techniques used for other kinds of digital transmissions. In addition, multiple messages (and/or other kinds of content) can be delivered simultaneously by using time-division multiplexing (i.e., broadcasting each message in a stream of time slices that alternate with the times slices allocated to the other messages), or by using any other multiplexing technique. As a result, for example, in these embodiments it is possible to simultaneously broadcast both a new message and any update to the user app or the pre-stored content accessible by it.

In the preferred embodiments, the messages broadcast by the messaging units 52 are modified or replaced from time to time, e.g., from moment to moment, at different times of day, and/or over extended periods of time. In this regard, the controller 56 preferably includes memory and/or one or more other storage devices that store one or more such messages and computer-executable process steps for implementing the controller functionality described herein (typically referred to as the "messaging app"). The controller 56 also includes a processor for executing the messaging app. Still further, in certain embodiments the controller 56 includes a real-time clock and/or scheduling information also is stored into its storage device(s); then, the messaging app can cause different messages to be broadcast, e.g.: at different times of the day, on different days of the week, in one or more specified sequences, at one or more different time intervals and/or in any other time-varying manner. In this way, once the controller 56 is loaded with a set of messages and a schedule, it can automatically change the messages that it causes to be broadcast over time in accordance with any specified schedule.

Typically, however, it also will be desirable, from time to time, to change the stored messages and/or the schedule according to which they are broadcast. Any of a variety of different approaches can be employed to change or update such information. For example, in certain embodiments, controller 56 is provided with a physical port (e.g., USB), and when a physical storage medium (e.g., flash drive 62 shown in FIG. 3) is inserted into such a port, the messaging app automatically retrieves the new or replacement messages and scheduling information stored within it and uses it to update and/or replace the corresponding information currently stored within the storage device(s) of controller 56.

More preferably, however, such updates are delivered automatically to the individual messaging units 52. Some of the reasons for this preference are that there often will be a large number of messaging units 52 and access to them often will be fairly cumbersome, e.g., when they are mounted on or within the ceiling. Therefore, the messaging units 52 preferably are in (or capable of) real-time communications with one or more central computers (e.g., computer 65), and both the individual messaging units 52 and such a central computer 65 are configured to interface with each other, e.g., such that computer 65 can directly address and update each desired messaging unit 52.

Even more preferably, as shown in FIG. 3, the communication link between the central computer 65 and the individual messaging units 52 is a wireless link (e.g., a WiFi network according to any of the 802.11x protocols). For this purpose, computer 65 is shown connected to a wireless router 67, and the controller 56 within each of the messaging units 52 includes a corresponding wireless transceiver and antenna 54. In addition, for covering a large space, one or more wireless signal repeaters may also be incorporated into system 50. In any event, although a hardwired network instead could be used, wireless technology eliminates the effort and expense of having to physically connect all of the messaging units 52 to such a network. On the other hand, use of a hardwired network often will be a good option when infrastructure already exists, e.g., using the same lines from which central computer 65 and the messaging units 52 obtain their electrical power to also transmit communication signals.

The messaging app (e.g., including any wireless communication interfaces) preferably is stored within each controller 56 as firmware. The scheduling and message information preferably is stored within a non-volatile storage device, such as flash memory, within the corresponding controller 56. Preferably, however, most of the functionality is implemented by computer 65, with the individual messaging units 52 including just enough processing power and corresponding functionality to perform message and schedule updates, to implement the stored schedule(s), and to generate corresponding drive signals for their light sources 55 based on the stored digital messages.

In the simplest embodiments of the present invention, the messaging app executed by the controller 56 simply causes its currently loaded message to be repeatedly broadcast, over and over, but that single message is capable of being replaced by a new message, e.g., using any of the techniques described above. However, in certain embodiments, the messaging app continuously broadcasts in accordance with one or more messaging schedules (as discussed in more detail below). In the following discussions, this latter type of embodiment usually is assumed, in order to be as comprehensive as possible.

Also, upon receipt of a signal from the wireless interface (or other interface used for updates) indicating that new updates are available, controller 56 performs the updating operation. In this regard, the updating message preferably includes a set of instructions (or a script) indicating what changes should be made, together with any new or replacement messages or other content. For instance, such a script might include simple statements to delete particular messages, content and/or schedules (each specified with a unique identifier) and/or to add the new blocks of information appended to the received message, with each such new block including a unique identifier, a type identifier (e.g., message, media content or schedule) and a main body that includes the actual content. Similarly, each schedule also can be specified as a script with instructions indicating, e.g.: any condition(s) as to when it should be executed (such as time of day and/or day of week), the sequence in which messages are to be broadcast (if more than one), any messages to be broadcast concurrently (e.g., multiplexed), any desired pauses between sequentially broadcast messages, any specific times at which messages are to be broadcast, and the like.

Also, in certain embodiments the messaging units 50 include real-time clocks. In that case, the messaging app preferably also includes functionality for receiving a timestamp and a synchronization signal and for setting the device's real-time clock to the specified time at the moment indicated by the synchronization signal.

In certain embodiments of the invention (discussed in greater detail below), additional components also are included within system 50. Such components can include, e.g., one or more associate devices 72, each typically being a wireless handheld device, such as a tablet computer or a wireless telephone, but any or all instead could be, e.g., laptop or desktop computers. Each such associate device 72 is operated by an individual 73 who is associated with the system 50 and is coupled to the central computer 65, e.g., via one of the presently disclosed LiFi systems, such as system 50, a wireless Wi-Fi connection, an ethernet connection, or any other wireless or hardwired connection. In addition (or instead) system 50 can include one or more automated sensors 75 (such as a video or still-image camera, operating in the visible and/or infrared spectra, a radio receiver configured to receive transmissions from user devices 20, or a radio transceiver for use in combination with RFID devices) for obtaining information regarding the users 60. Such sensors 75 can be located anywhere in the covered space, such as on items that are being offered for sale, on shelves or other fixtures, or on ceilings, walls or other portions of a structure that makes up, encloses or borders the covered space.

A representative example of time-division multiplexing is shown in FIG. 4. In this particular example, portions of three different messages 81-83 are broadcast using alternating time slices over a relatively short period of broadcast time (e.g., between $10^{-2}$ and $10^{-7}$ second, or even less), followed by a longer time period (e.g., 5-10 times as long) during which the light source 55 remains continuously on, with this pattern repeating potentially indefinitely. Preferably, an entire static message is delivered within a time period of 0.5-3.0 seconds, and time-varying content (such as audio or video) is delivered in real-time. At the same time, because only a relatively small fraction of the time (e.g., a maximum of 10-20%) is used for modulated broadcasting, the intensity of the light need not be significantly reduced.

Computer 65 preferably is configured with a software application that executes a process for allowing an administrator 70 to create and distribute a desired messaging pattern. An example of one such process 100 is discussed with reference to FIG. 5.

Initially, in step 102 a user interface for inputting or creating one or more messages is displayed. If a desired message just includes text, the administrator 70 preferably can simply type in (or otherwise enter) the message. In addition, the displayed interface preferably permits the administrator 70 to specify, e.g.: (1) the display of pre-stored discrete graphical elements and/or a background or wallpaper; or (2) the playing of a pre-stored audio track. Still further, the displayed interface preferably permits the administrator 70 to upload new content (such as images, audio, video, or any combination of such content) and then incorporate such new content into any particular message. In this regard, a variety of conventional software applications exist for authoring content in one or more types of media, and any of the features incorporated into such conventional applications also can be incorporated into the user interface displayed in this step. Preferably, the displayed user interface permits the creation of any number of messages in this manner.

In step 103, a user interface is displayed for creating schedules that specify how and when the message(s) created in step 102 are to be broadcast, e.g., the sequences in which such messages are to be broadcast (if more than one are to be broadcast by a particular messaging unit 52 during any given time period) and/or the times and/or days when they are to be broadcast. In most embodiments, each of the messaging units 52 broadcasts just a single message at any given time. However, the present interface preferably permits the administrator 70 to specify that different messages are to be broadcast at different times of day and/or on different days (e.g., different days of the week).

For this purpose, the present user interface preferably allows the administrator 70 to specify a time segment for each message that has been assigned to a messaging unit or, conversely, to specify different time segments and one or more messages to be broadcast during each. If multiple messages are specified for any particular time segment, the default preferably is that the messages are broadcast sequentially without any significant delay between them, in the order selected by the administrator 70 within the present user interface (e.g., in the order the administrator 70 lists them for that time segment). However, in certain embodiments the present interface provides the administrator 70 with a great deal of flexibility in specifying how and when messages are to be broadcast by individual messaging units 52. In certain embodiments, the present interface even permits the administrator 70 to specify that two or more different messages are to be played simultaneously on the user device (e.g., device 10 or 20). More preferably, however, any such concurrent combinations preferably are specified during the message-authoring process in step 102.

In one example, the foregoing schedule information is input by the administrator 70 in textual format, e.g., using a scripting language such as:

Schedule255(M,Tu,W:11 AM-1.30 PM; Th,F:11.30 AM-2 PM)
Play(Msg435);
Play_Concurrent(Msg 112, Msg390, dur10 sec);
Wait(5 sec);
Play(Msg029);
Return which would be interpreted to mean that when this schedule (with the unique identifier "Schedule255") has been assigned to a messaging unit 52, it is to be executed on Monday Tuesday and Wednesday from 11:00 AM until 1:30 PM and on Thursday and Friday from 11:30 AM until 2:00 PM (sometimes referred to herein as the "applicability" of the schedule), and during those times the following actions should be executed: play Message 435, then immediately play Messages 112 and 390 together (i.e., simultaneously) for a period of 10 seconds (e.g., one being the visual portion and the other being the audio portion), then wait 5 seconds, then play Message 029, then immediately return to the beginning (i.e., begin again playing Message 435). In this example, it assumed that Messages 435 and 029 have an inherent duration (e.g., a video or audio clip) or a duration that has been explicitly specified within the messages themselves (e.g., as metadata), while Messages 112 and 390 potentially could be played indefinitely (e.g., text, static images and/or looping audio). In alternate embodiments, the present user interface allows the administrator 70 to define schedules (or to otherwise specify the schedule information) using a graphical user interface, e.g., with real-time presentation of the messages that are being specified to be presented, a "start" button and/or a "stop" button.

In the preferred embodiments, it is possible to specify the applicability of a particular schedule to be the "default", either instead of or in addition to specific times, dates and/or days. A default schedule is one that is to be implemented if and when no other schedule currently stored within the messaging unit 52 is applicable. More preferably, at least one schedule stored by each messaging unit 52 is required to be the default schedule, and this requirement preferably is verified in step 105 (discussed below).

It should be noted that the times at which the digital messages are broadcast can be somewhat independent of when those messages are to be displayed (or otherwise played or presented), e.g., by configuring the user device (e.g., 10 or 20) to have buffering capabilities. It is also noted that it is possible to combine this step with step 102, e.g., providing a single user interface for both authoring messages and specifying broadcasting schedules.

In step 104, a user interface is displayed for assigning any of the schedules created in step 103 to any of the messaging units 52. For this purpose, each of such messaging units 52 and each of the schedules preferably has a unique identifier. In one example, a separate window, containing a complete list of the available schedules, is opened for a selected messaging unit 52, and then the administrator 70 simply selects the schedule(s) to be assigned to that messaging unit 52, e.g., by clicking on checkboxes next to the desired schedule(s). It also should be noted that this step 104 can be combined with step 102 and/or step 103, e.g., so that a message is assigned to one or more messaging units 52 at the time it is created, and/or so that messages, schedules and message or schedule assignments are all defined in a single step, and/or so that the instructions for transferring, deleting and/or replacing messages and/or content are generated automatically based on the schedules that have been selected for the corresponding messaging unit 52.

In step 105, a user interface is displayed for performing any desired verification (automatic and/or manual) of the overall messaging pattern that has been specified in steps 102-104. For example, in certain embodiments a map showing the layout of the space covered by the messaging units 52 (e.g., similar to the maps shown in FIGS. 9 and 10, discussed below) is displayed, and then the administrator 70 is able to input any desired day and time and then hover over (or click on) any of the graphic symbols representing the locations of the messaging units 52, causing the corresponding digital message(s) to be presented.

In certain embodiments, this simulation also takes into account functionality that is expected (or known) to be implemented by the user app (running on the user device 10 or 20). For instance, as discussed in greater detail below, in certain embodiments the user app on the user device 10 receives multiple messages from a single messaging unit (as discussed in greater detail below) but only presents one, depending upon the recent location history of the user device 10 (e.g., the sequence of messaging units 52 from which it has received broadcasts). As result, the administrator 70 would be able to click on different sequences of messaging units 52 and observe the corresponding sequences of messages that would be played by the user device 10 of an individual who traveled that same path through the space.

This verification procedure can be important for identifying any problems or schedule inconsistencies. In this latter regard, it might have been the case that two different schedules inadvertently were made active for the same messaging unit 52 and for the same period of time. Preferably, any such overlapping schedules are automatically highlighted in this verification step. Although certain embodiments permit intentionally overlapping schedules (e.g., with the different messages being multiplexed together), more preferably only a single schedule can be made active at any given time for any given messaging unit 52. In any event, based on these verifications, the administrator 70 preferably can either modify the messaging pattern (by revisiting any of steps 102-104) or confirm the existing messaging pattern.

In step 106, the messaging pattern information is transmitted (preferably automatically once the pattern has been confirmed) to the appropriate ones of the messaging units 52. Typically, this step involves transmitting: (1) the new schedules that are to be implemented by the corresponding messaging unit 52 (e.g., with a "store_schedule" command); (2) instructions to delete (or in some cases, just inactivate) any existing schedules that are not currently desired to be executed (e.g., with a "delete_schedule" or "inactivate_schedule" command); (3) any new content that is needed in connection with the new schedules, such as any new messages and/or any new pre-stored content or other new content that is referenced by, but not explicitly part of, any such new messages (with a "store_content" command); and/or (4) instructions to delete any messages or other content that are no longer needed (with a "delete_content" command).

In certain embodiments, for each of the messaging units 52, only the new or changed information is transmitted, in order to reduce the amount of data transmission required. In any event, the new information preferably replaces any corresponding existing information. The actual information transmitted can also include any combination of (1) raw data that has not been pre-stored by the recipient messaging unit or assumed to have been stored by the user device 10 through its system-interface software application or (2) identification codes for messaging information previously stored by either such device. In certain embodiments, from time to time or upon receipt of an indication that a particular messaging unit 52 is not currently storing the information that it is supposed to, a reset operation is performed in which all the information currently stored in that messaging unit 52 is deleted and a complete set of the proper information is transmitted to it.

In this way, each of the messaging units 52 can be kept up-to-date on an ongoing basis. The processing of such new information by the individual messaging units 52 preferably is performed on a transaction basis (e.g., by or under the control of the controller 56), so that the processing associated with receipt of a new message from computer 65 is performed only when there is an indication that such a message has been received (e.g., on an interrupt basis). When that occurs, the controller 56 of the corresponding messaging unit 52 preferably executes the received commands (e.g., those noted above) in order to store, delete or inactivate any schedules, messages or other content, as applicable. In addition, in certain embodiments the controller 56 also creates or updates and applicability table that indicates when each of the stored schedules is applicable.

Figure 6:
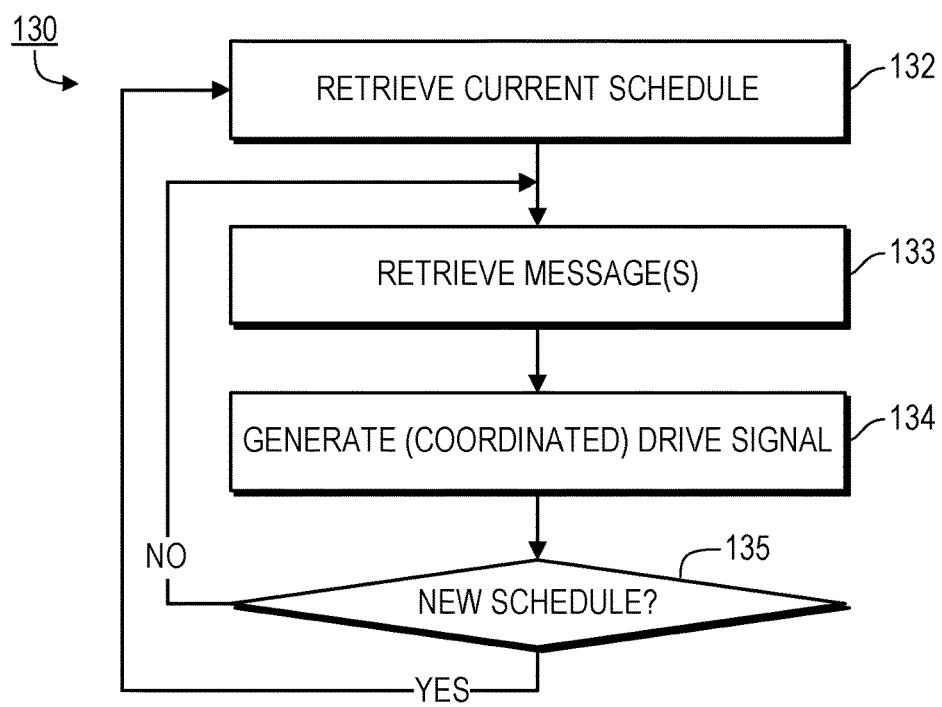
FIG. 6 is a flow diagram illustrating a process, executed by the controller of a messaging unit, for causing messages to be broadcast.

Most of the time, the messaging units 52 broadcast the stored digital messages in accordance with the currently active stored schedules. One example of a process 130 for doing so, e.g., executed by a processor within the controller 56 for the messaging unit 52, is now discussed with reference to FIG. 6.

Initially, in step 132 the currently applicable schedule is identified. This step can be performed by directly reading the applicability information from the stored schedules or by reading such information from an applicability table that has been created for the schedules.

In step 133, the first message (or multiple messages if there is to be a concurrent broadcast) identified in the applicable schedule is retrieved. As noted above, each message preferably has a unique identifier and therefore the current message can be retrieved based on its identifier, as specified in the current schedule.

In step 134, a drive signal for the light source 55 is generated based on the current message. For this purpose, the content preferably is converted into a binary signal, e.g., using any of the techniques conventionally used in conjunction with digital transmissions. Examples include compression, encryption, interleaving and/or error correction/detection. In addition, multiplexing can be used for broadcasting multiple messages simultaneously. Preferably, the signal that is generated is a fairly high-frequency (as noted above) binary-encoded digital signal which corresponds to when the light source 55 is to be turned on and when it is to be turned off. This signal is then output to drive the light source 55 (either directly or after being amplified first). In certain embodiments, the messages are delivered at relatively high frequencies for relatively short periods of time so that the light source 55 is continuously on (i.e., non-modulated) for at least 50-99% of any given interval of 1.00 to 0.01 second. As result, the intensity of the light source 55 (which preferably also is being used to provide illumination) is not unduly impaired as a result of the modulation.

Still further, in certain embodiments the light 57 from one of the messaging units (e.g., unit 52A) significantly overlaps with the light 57 from one of the other messaging units (e.g., unit 52B). In some of such embodiments, the two messaging units coordinate with each other, e.g., using the same wireless network that is also used for communicating with central computer 65 so that each's message is broadcast in a separate set of time slices (i.e., using time-division multiplexing). Alternatively, each's message can have a different code applied to it, within an overall code division multiple access (CDMA) system, so that the receiving user device 10 can selectively receive either one or both. Still further, any other multiplexing technique instead may be used, either with or without coordination between the individual messaging units 52. Instead (or in addition), adjacent messaging units 52 can be provided with light sources 55 that produce different colors, so that they can be distinguished by the user devices 10 or 20 on that basis.

In step 135, a determination is made as to whether a new schedule is now applicable (e.g., the applicability of the current schedule has expired and/or the time period for the applicability of another schedule has just begun). If so, processing returns to step 132 to retrieve and implement this newly applicable schedule, typically instead of (but in some cases in addition to) the current schedule. Otherwise, processing returns to step 133 to retrieve the next message (if any) specified by the current schedule. If the current schedule specifies just a single message, then that message is simply rebroadcast (e.g., immediately or with any specified delay).

Figure 7:
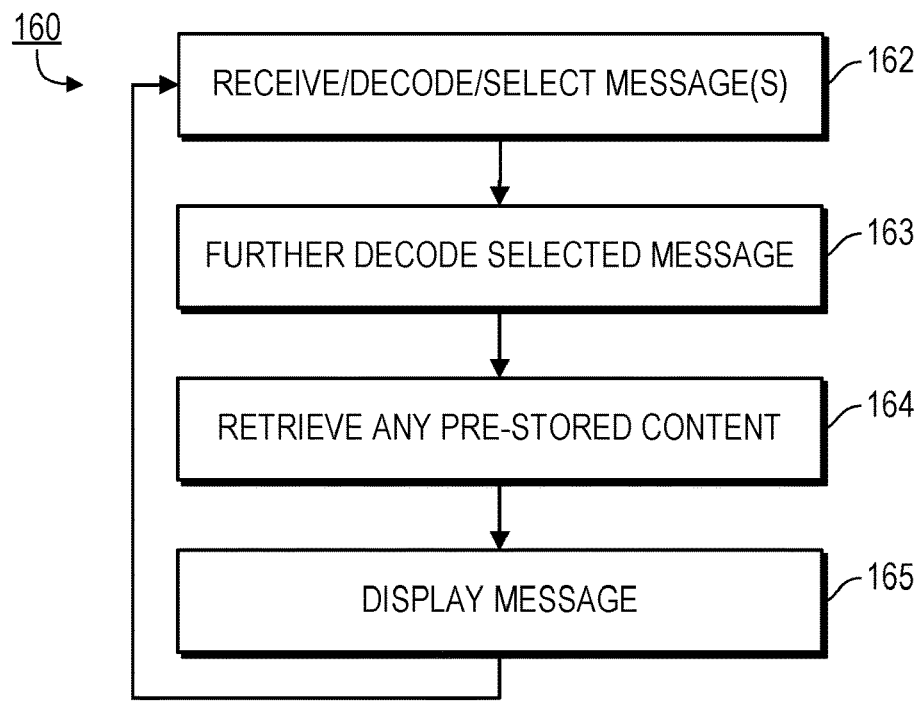
FIG. 7 is a flow diagram illustrating a process, executed by a user device, for receiving and presenting messages.

FIG. 7 illustrates a representative process 160 executed by the user app running on the various user devices 10. Process 160 concerns the receipt and presentation of messages from the various messaging units 52. In addition, the user app may also perform a variety of other functions, e.g., including communications via WiFi or via a wireless Internet connection.

Initially, in step 162 one or more messages is/are received and preliminarily decoded, and then one or more of them is/are selected for further processing. The initial receipt of the messages is via light sensor 12 or 22, which converts the light into an electrical signal. In the case of a camera, the signals from the charge-coupled device (CCD), complementary metal-oxide semiconductor (CMOS) or other individual sensor elements preferably are summed, averaged or otherwise combined together to provide one signal that represents the light intensity received by the sensor 12 at any given moment (or, as discussed in greater detail below, multiple signals, each representing the light received at a different position, and each processed in the same manner as the single-signal example). This signal preferably is digitized and high-pass filtered (not necessarily in that order) in order to remove any relatively slow-changing variations. What results is a relatively high-frequency binary signal representing one or more messages from the nearby messaging unit(s) 52.

In the present embodiment, it is assumed (without loss of generality) that when multiple different messages within system 50 are to be broadcast simultaneously and are capable of being received simultaneously, such messages are time-multiplexed with each other. It is noted that simultaneous broadcast can be either from the same messaging unit 52 or from two or more different messaging units 52 and that simultaneous receipt when two or more messaging units 52 are involved typically is because the light 57 from such messaging units 52 shine on the same spot with intensity levels such that one does not completely overwhelm the other.

The preliminary decoding in this step preferably involves demultiplexing in order to identify the message(s) that are to be selected. In this regard, when messages from two or more messaging units 52 are identified after demultiplexing (e.g., based on messaging-unit identifiers included in the messages' metadata), preferably only the message(s) corresponding to the strongest signal is/are selected. However, to avoid switching back and forth between different messaging units 52, the user app preferably also includes logic that keeps track of the messaging unit 52 from which messages are currently being received (e.g., based on the units' unique identifiers) and only switches to a different messaging units 52 when its signal strength exceeds that of the current unit by at least a specified amount (e.g., at least 20-40%), or employs other logic that tends to stay with the current messaging unit 52 until there is a clear indication that the user device 10 has been moved into an area corresponding to a new unit.

Also, as indicated above, the selection of a message (e.g., from among plural messages received from the same messaging unit 52) in this step may be based on past history of the user device 10 (e.g., the sequence of messages presented prior to the present message). The object for implementing this particular aspect of the selection, when employed, preferably is part of an overall game or game-like interaction sequence implemented by the user app.

In step 163, the message(s) from the selected messaging unit 52 is/are further decoded. This further decoding step preferably is just a straightforward reversal of the encoding mentioned above. What results is the original message (assuming from this point forward that there is just one).

In step 164, any pre-stored content referenced in the message is retrieved from one or more storage media in the controller 56. As noted above, rather than repeatedly embedding the same content in different messages, such content may be pre-stored and then just referenced by its unique identifier in multiple different messages.

In step 165, the user device responds to the message. In some cases, the entire message simply is presented (e.g., shown visually and/or played audibly). Such a step can be implemented, e.g., using conventional players and/or other user interface processes. In other cases, e.g., as discussed in more detail below, the message triggers the instantiation of another process, or is otherwise used in conjunction with another process, such as a process involving Internet or local area network (LAN) communications with server 205 (discussed below) or computer 65 (which could function as, or be part of or in communication with, a local or remote server), e.g., via a wireless network interface of the user device 10 or 20.

The system 50 depicted in FIG. 3 primarily (although not exclusively) contemplates a situation in which the administrator 70 is on site locally. In a system 200 according to an alternate embodiment illustrated in FIG. 8, the administrator 70 is located remotely from the site covered by the messaging units 52, and the computer 65 communicates with a server 205, e.g., via the Internet 207 or another wide-area network 208. Server 205 then relays the messages (preferably wirelessly) to the individual messaging units 52. Also, in this embodiment, the individual user devices 10 can communicate 209 (e.g., via LiFi, Wi-Fi or a wireless Internet connection) directly with the central computer 65 (e.g., to download the user app and/or other content).

Still further, in the present embodiment, in addition to receiving messages broadcast by the messaging units 52, the present user device 10 can transmit messages to such messaging units 52 using its own light source 14. In order to receive these messages, the individual messaging units 52 also include a light sensor 58. In one representative embodiment, the messaging unit 52 initiates the communication and broadcasts synchronization signals. Then, the user device 10 synchronizes or coordinates with the messaging unit 52 so that only one is communicating at any given time.

Any of a variety of different kinds of messages preferably can be transmitted in this way, including, e.g., an identifier for the user device 10, current status information regarding the user device 10, and/or information currently being received by one or more other sensors or user interfaces on user device 10. As a result of these bidirectional communications, the system 200 can provide a more fully interactive experience to the user 60. Such bidirectional communications also can be effected, e.g., via a wireless interface (e.g., a WiFi link to server 205 or a wireless connection 209 to a cellular-based Internet service provider) on user device 10, either alone or in combination with the light-based communications described herein.

As with system 50 depicted in FIG. 3, the present system 200 optionally includes one or more associate devices 72 and/or one or more sensors 75 for obtaining information about the users 60 and/or for any of the other purposes discussed herein. In the illustrated embodiment, an associate device 72 and a sensor 75 communicate with the central computer 65. However, in alternate embodiments they also or instead communicate, either directly or indirectly (e.g., through central computer 65), with server 205 (e.g., via the Internet 207).

Figure 9:
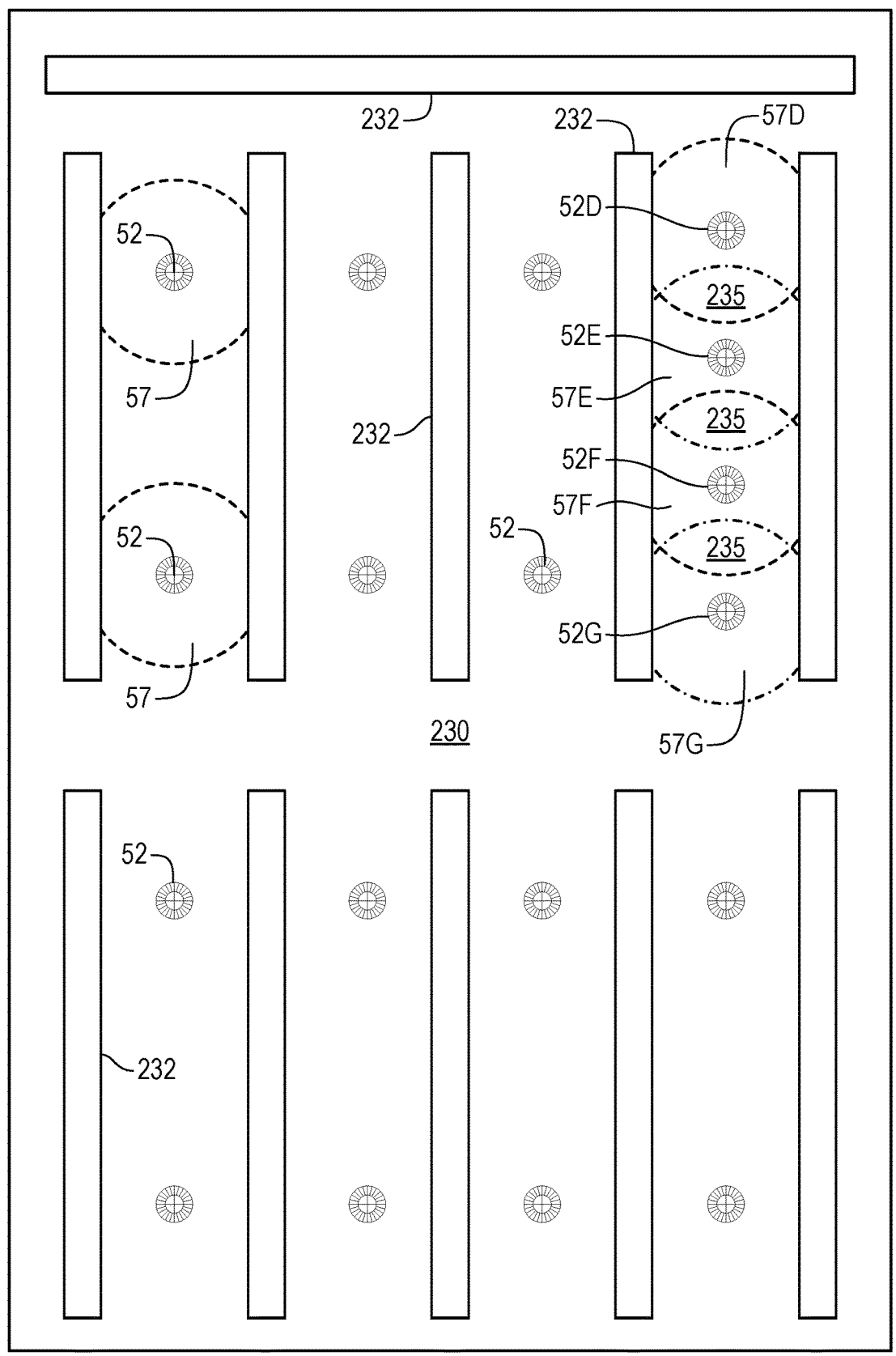
FIG. 9 is a top plan view of a commercial space showing an example of ceiling-based placement of messaging units according to a representative embodiment of the present invention.

A sample layout of a space (or site) 230 covered by a plurality of messaging units 52 is shown in FIG. 9. In this case, the space 230 covered by the messaging units 52 is the interior space of a single retail store, and the messaging units 52 are installed in the ceiling of the aisles between the store's shelves 232 (e.g., replacing conventional light sources), so that the light shines down. However, even the user device 10 (having its light sensor 12 on its back surface)

typically will be able to detect the messages, due to reflection of the light 57 that is emitted from the messaging units 52.

As shown, in most of the space 230, the messaging units 52 are sufficiently far apart that the light 57 emitted from their light sources 55 does not significantly overlap. This may be, for example, because conventional light sources (not shown) are disposed between the messaging units 52, so that although the entire space 230 is illuminated, or because in only certain areas are messages being broadcast. However, messaging units 52D-G are sufficiently close to each other that there are areas of significant overlap 235 between the light 57D-G, respectively, that they emit. As noted above, in these overlap areas 235, multiplexing, color separation and/or other techniques can be used to distinguish the messages broadcast by one messaging unit 52 from the messages broadcast by another.

Figure 10:
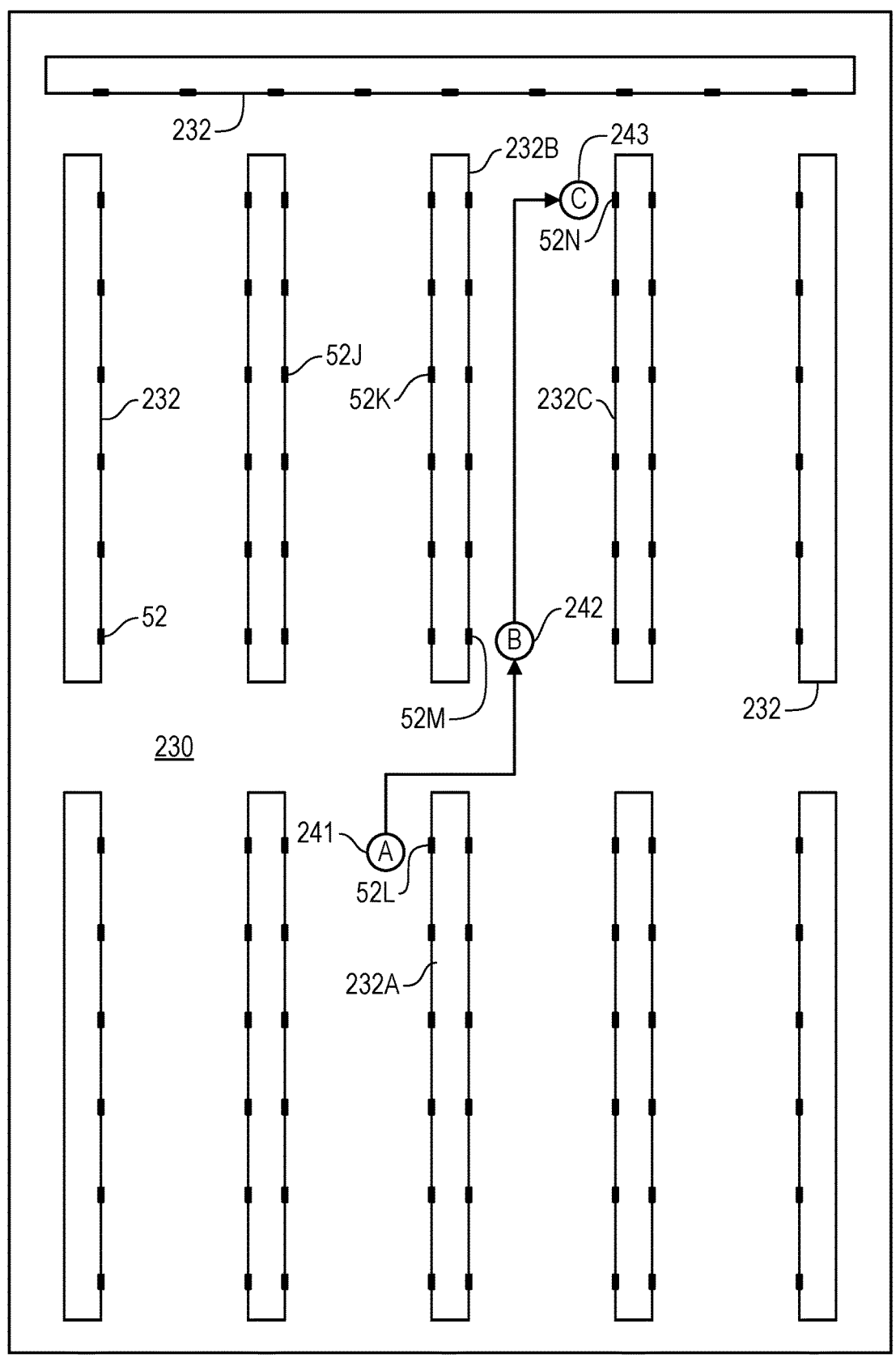
FIG. 10 is a top plan view of a commercial space showing an example of shelf-based placement of messaging units according to an alternate representative embodiment of the present invention, and also illustrating how a user can be guided to different locations within the commercial space.

Another exemplary layout is shown in FIG. 10. Here, messaging units 52 are located on or attached to the shelves 232, e.g., so that the light is emitted primarily or significantly laterally, rather than entirely downwardly. As a result, the particular message received by a user device 10 might depend not only on the location of the user device 10, but also its orientation (e.g., whether its back surface is generally oriented in the direction of messaging unit 52J or messaging unit 52K which is directly across the aisle).

In addition, FIG. 10 illustrates certain messaging patterns. Initially, for example, the user 60 may be browsing items on the shelf 232A at position 241, facing toward messaging unit 52L. There, the user's device 10 receives and presents a message from messaging unit 52L that might be related to a product on the shelf 232 in fairly close proximity to messaging unit 52L (e.g., a promotional message).

Alternatively (or in addition), the user's device 10 receives and presents a message from messaging unit 52L that directs the user 60 to a different position 242 within the overall space 230, at an orientation facing messaging unit 52M. Such a message might be in the form of a promotion for a product located at or near messaging unit 52M or position 242. Alternatively, such a message might be in the form of a clue or other indirect instruction. In this latter case, the user 60 might need to move about within the space 230 until he or she finally finds the correct position 242 and orientation. In that event, the user app might cease receiving messages until it picks up the broadcast from messaging unit 52M. On the other hand, the user app might be configured so as to receive and present messages from other messaging units (e.g., containing additional clues about position 242 and/or a shelf location near messaging unit 52M). As noted above, user device 10 might receive multiple messages from a particular messaging unit 52 and then select the one with the appropriate clue based on the device's previous history. In any event, a messaging pattern is being used to guide a user 60 around the space 230. This use of individual messages to guide the user 60 may be repeated any number of times, causing or encouraging the user 60 to move to any number of different positions (or shelf locations) within the overall space 230. In the present example, at position 242 facing messaging unit 52M, the user device 10 receives and presents a message that directly or indirectly guides the user 60 to position 243 and toward an orientation where the user 60 is facing messaging unit 52N, so that the entire route consists of three different positions (i.e., guidance to two new positions and orientations from a starting position and orientation).

Such a multi-position guidance messaging pattern can be used in connection with a game, such as a scavenger hunt, or can be used as a part of a marketing system, e.g., encouraging the user 60 to make purchases (or at least look at items) related to what the user 60 currently is looking at and/or related to the user 60's current and/or previous (or historical): purchasing habits, location, orientation, in-store browsing, Web browsing, other online activity, or other type of activities. For any of such purposes, in certain embodiments the user device 10 receives multiple messages (either multiplexed as noted above or contained within a single chunk of data) but the user app only causes the one(s) that are most appropriate based on any of the preceding historical information (and/or any other historical information) to be presented.

Alternatively, e.g., when equipped with its own light source 14 or by using its wireless network interface, the user device 10 can transmit any such historical information to a nearby messaging unit 52, the server 205 or the computer 65 (e.g., using any of the communication links described herein). Upon receiving such information, the corresponding device executes computer-executable process steps for selecting an appropriate message to be broadcast based on such information.

In any event, although the guidance path shown in FIG. 10 includes just three positions 241-243 (with the user 60 being guided to two positions 242 and 243 from an initial position 241), in many embodiments there will be at least 3-8 such positions to which the user 60 is guided (starting from an initial position), with any combinations of direct and indirect guidance. Also, in the preceding embodiment, the user 60 is guided to specific locations and orientations. Although a similar guidance pattern can be used in connection with the embodiment illustrated in FIG. 9, in such embodiments the system 50 ordinarily will only guide the user 60 to positions within the overall space 230 and not to any particular orientation at that position.

In the preceding embodiments, the discussion focused mainly on light-based communications between the light sources 55 and the user devices 10. Typically, this light will be visible light because the light sources can then have the dual purposes of providing the necessary illumination within the space (potentially just replacing any existing light sources) and also providing the messaging functionality discussed herein. For this purpose, the messaging units 52 preferably are physically configured to screw into a conventional light bulb socket or otherwise to fit into a conventional light fixture. At the same time, it is noted that in some embodiments the light emitted by some or all of the light sources 55 is non-visible, such as infrared or ultraviolet.

Also, the foregoing embodiments generally contemplate processes in which a given user device 10 or 20 receives and presents messages in real time from the messaging units 52 to which it is exposed. However, in alternate embodiments the user device 10 or 20 receives (or downloads) messages (in whole or in part) in advance from a single messaging unit 52, but initially just stores them and then only presents them when in the presence of another specified messaging unit 52 or upon the occurrence of any other specified condition. That is, such embodiments use conditional messaging, which can be helpful, e.g., when it is known or expected that a future message will need to be presented but when that message includes a large amount of content or for other reasons might take a long time to receive.

In addition to basing the position of a particular user device 10 or 20 on the identifier for the messaging unit 52 embedded within the messages (or the strongest signal(s) containing such messages) received by such device 10 or 20, any other indicia can be used by user device 10 or 20, the messaging units 52, the central computer 65 or any other component of the system 50 to help better or more accurately determine the position and/or orientation of the user 60. Examples of such indicia include the relative strength of the light received from multiple different messaging units 52 (due to overlapping light patterns) and/or information provided by the accelerometer, orientation sensor and/or other sensor(s) within the user device 10 or 20.

In addition to (or in some embodiments, instead of) the position and/or orientation of the user 60, any of a variety of other kinds of information can be generated and used within a system according to the present invention. For instance, sensors on the user device 10 or 20, on a shopping basket that is being used by the user 60, and/or on the shelves, walls, ceilings and/or floors of the commercial space can be employed to determine when specific items have been picked up by the user 60 and/or deposited into his or her shopping basket. Such sensors can include, e.g.: (1) a camera for taking photographs and/or videos of the items, which can then be uploaded (e.g., using any of the techniques described herein) to the central computer 65 and/or server 205 for identification of the items (e.g., using conventional image-recognition techniques); and/or (2) one or more RFID sensors (reading corresponding RFID tags on such items). As a more specific example, a conventional RFID tracking system can be used to determine when any particular item is moved closer to the position of a particular user 60, how long that item remains with the user 60, and whether the user 60 ends up keeping the item (such that their positions subsequently move together) or, alternatively, whether the item is returned to the shelf.

Any or all of this information, especially how long the user 60 studied the item and whether or not the user 60 ultimately decided to keep the item, can be used by the central computer 65 and/or server 205 (e.g., executing any conventional collaborative filtering algorithm) to determine what kinds of messages to send to the user 60. Examples of such messages can include promotions, deals and purchase suggestions. In addition, or instead, such information can be used to guide the user 60 through a multi-position pattern, either by itself or in conjunction with any of the other information mentioned above for that purpose.

In the embodiments discussed above, the administrator 70 directly controls the messaging that is sent through the messaging units 52. However, in alternate embodiments, central computer 65 and/or server 205 also (or instead) is accessible by outside entities that have been granted permission (e.g., subject to any constraints imposed by the administrator 70) to design and/or broadcast messages, or at least to submit message broadcasts to administrator 70 for approval before being broadcast.

For example, in one representative embodiment, the system 200 is implemented within a store, shopping center or other building, and specified manufacturers, wholesalers or other suppliers are granted permission to use the system 200 to promote specific items that they provide. In this embodiment, the supplier signs into system 200 using its provided credentials, references a desired product (e.g., by its UPC code) and submits a promotion with respect to such product. In the preferred implementation, if the promotion and/or the supplier has been preapproved by the administrator 70, the promotion is automatically integrated into the message broadcast schedule of system 200. Otherwise, it is automatically submitted for review by the administrator 70 and, only when approved (e.g., as to content and/or timing), is it integrated into the message broadcast schedule. In either case, such integration often will involve server 205 or computer 65 automatically modifying and/or supplementing the submitted promotion, e.g., based on the location of the product within the retail space and/or other location-specific information.

By providing such access to system 200, suppliers can directly communicate with their end customers, e.g., guiding potential customers to certain areas for them to scan the subject product from their phones 20 (or other user devices). At the same time, by charging a fee for such access, retailers also can benefit. Computer 65 or server 205 preferably is configured to present a user interface to administrator 70, providing administrator 70 with significant flexibility in granting or conditioning access rights (e.g., by supplier, by product and by message) so that the corresponding retailer can have as much or as little involvement in the ongoing message broadcasts as it wants.

Tracking and Location Monitoring.

In the embodiments discussed above, a network of spatially dispersed messaging units 52 is used for delivering spatially relevant communications. A similar network of messaging units can be used for tracking and/or monitoring the locations of one or more people or items. Such a system can be valuable, e.g.: (1) in a workplace setting for helping management to better understand how resources currently are being deployed, in real time, and how they might be deployed in the future to improve efficiency; (2) in a public or semi-public space for efficiently deploying security personnel; or (3) for coordinating the activities of robots and/or other fully or partially automated devices.

In any of these additional embodiments, the messaging units 52 can be arranged, e.g., as illustrated in FIG. 9 or 10. When used for tracking or monitoring people, a user device 10 or 20, as discussed above, often will be used as a receiving unit within a tracking and/or location-monitoring system according to the present embodiments. However, any of a variety of other types of receiving units instead can be used.

Figure 11:
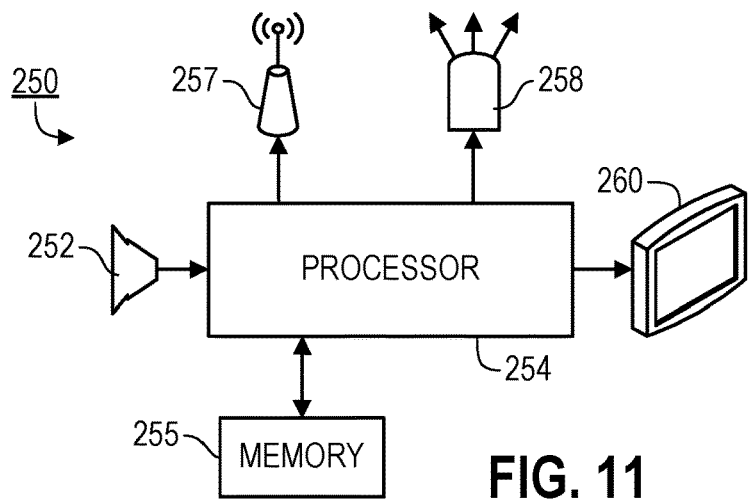
FIG. 11 is a block diagram of a representative receiving unit.

In this regard, FIG. 11 is a block diagram of a representative receiving unit 250 according to the present invention. Included within the receiving unit 250 is one or more sensors 252 for receiving signals broadcast by the messaging units 52 (typically in the form of visible, infrared or ultraviolet light) and converting such received signals into electrical signals. As indicated above, for user devices 10 or 20, one or more built-in cameras can function as sensor(s) 252. Alternatively, e.g., sensor(s) 252 can be implemented as simple light-intensity sensors, such as one or more phototransistors. In any event, the electrical signals output from sensor(s) 252 are provided to a processor 254 which, as discussed in greater detail below, is configured to process such signals in order to obtain more useful information, to store such signals and/or information into memory 255 and/or to cause the transmission of such signals and/or information to one or more other devices, e.g., using a radio transmitter 257 (for radio broadcasts) and/or one or more LEDs or other light sources 258 (for light-based broadcasts). A monitor 260 optionally may be included within, or as part of, receiving unit 250 (e.g., for user devices 10 or 20) for displaying the current location and/or orientation of the receiving unit 250, any other information that is based on such location and/or orientation information, and/or other type of information.

Similar to some of the previous embodiments, each of the messaging units 52 preferably is configured to continually broadcast one or more messages. In certain embodiments the different messaging units broadcast different messages that include different corresponding "location codes", e.g., where each such location code can be used to identify the location of the corresponding messaging unit 52. For this purpose, each such location code can, e.g., either directly specify the location of the messaging unit 52 or can identify the messaging unit 52 so that its location can be determined (e.g., using a lookup table). In certain embodiments, the location code is a CDMA code that the messaging unit 52 utilizes to encode its transmission, thereby allowing the receiving units 250 to distinguish transmissions from different messaging units 52. In addition, or instead, the substance of the message that is broadcast by a messaging unit 52 can include its location code. In certain preferred embodiments, each messaging unit 52 continually and repeatedly broadcasts the same message, such that each essentially serves as a reliable location beacon.

In some embodiments, in order to permit the receiving units 250 to distinguish the different messaging units 52 and/or to provide information that can be used in determining the location of the receiving unit 250, the broadcasts of the different messaging units 52 are coordinated as part of an overall system. For instance, different messaging units 52 might broadcast at different frequencies or otherwise have different pulse patterns, as well as (or instead of) using different CDMA codes. In one set of embodiments, the pulses broadcast by spatially adjacent messaging units 52 are time-division multiplexed.

Figure 12:
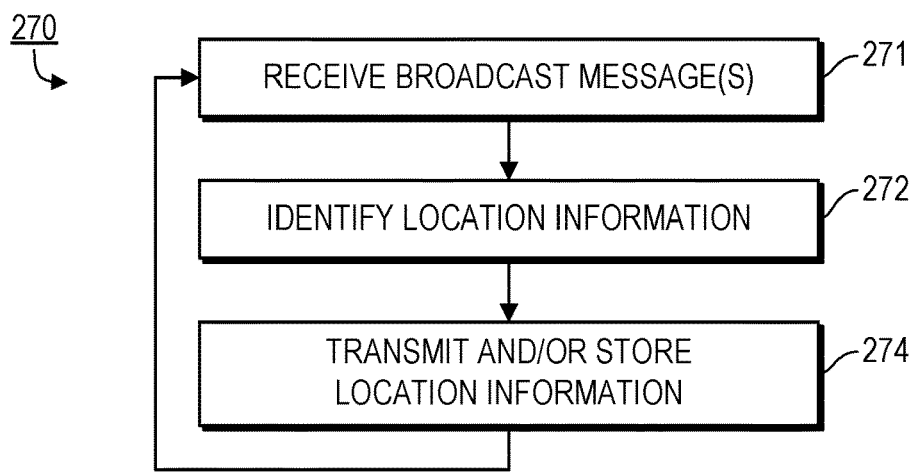
FIG. 12 is a flow diagram illustrating processing performed by a receiving unit according to a representative embodiment of the present invention.

FIG. 12 is a flow diagram illustrating a process 270 performed by a receiving unit 250 within an overall tracking and/or monitoring system according to a representative embodiment of the present invention. Ordinarily, process 270 is performed by processor 254 reading a corresponding set of computer-readable/executable process steps out of memory 255 and then executing them.

Initially, in step 271 the receiving unit 250 receives one or more digital messages that have been broadcast by one or more corresponding messaging units 52 within the network. As noted above, the receiving unit 250 can include just a single omni-directional (at least within a 180° range, e.g., only front-facing or rear-facing) sensor 252 for this purpose, as often would be the case for many user devices 10 or 20, or potentially even plural such sensors 252 (e.g., one on the front and one on the back of such a user device 10 or 20).

Figure 13:
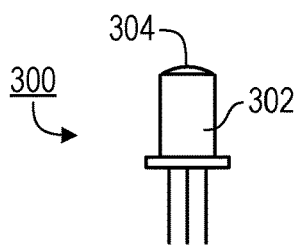
FIG. 13 illustrates a directional sensors for use in certain embodiments of the invention.

Alternatively, the receiving unit 250 can include two or more directional sensors 252, such as directional sensor 300 (shown in FIG. 13). Sensor 300 mainly includes a phototransistor 302 that senses light intensity and also includes at least one lens 304 above its light-sensing element for providing the desired directionality. In alternate embodiments, other optical arrangements, such as mirrors or combinations of lenses and mirrors can be used to provide such desired directionality. In any event, a directional sensor according to the preferred embodiments exhibits its highest signal gain in one particular direction, and its signal gain decreases the more the angle of the light source varies from that maximum-gain direction. Although directional sensor 300 sometimes is used as an example in the following discussion, references to it may be replaced with references to any other type of directional optical sensor.

Figure 14:
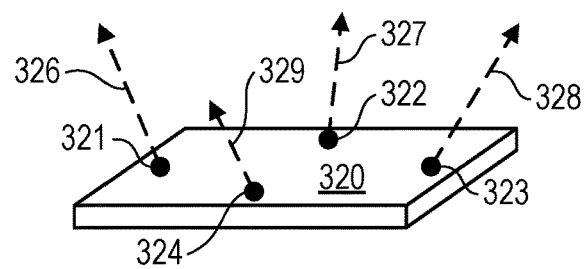
FIG. 14 illustrates a card with four directional sensors.

The use of plural directional sensors 300, pointed in different directions, generally results in two or more distinct electrical signals for each optical signal that is received. One example of such a sensor arrangement is embodied in sensor assembly 320 (shown in FIG. 14), which includes four different sensors 321-324 pointed in four different directions 326-329, respectively. That is, each of the sensors 321-324 has a direction or angle of maximum signal gain (or sensitivity) 326-329, respectively, and as the angle between a light source and the subject sensor diverges from this maximum-sensitivity angle, the gain or sensitivity decreases (i.e., for a given light intensity, the signal level that is detected decreases as this angle increases).

In addition, as noted above but not shown in FIG. 14, sensor assembly 320 preferably includes a processor 254, memory 255 and a transmitter (257 and/or 258), together with a battery, capacitor or other element for storing and then providing electrical energy, so that assembly 320 is an entirely self-contained unit in a relatively small package. In alternate embodiments, in order to power assembly 320, sensors 321-324 can be implemented as photovoltaic cells, separate photovoltaic cells can be included on assembly 320, and/or any other type of electrical-energy-generating device (e.g. generating electricity from motion, changes in temperature, etc.) can be provided on assembly 320, so that assembly 320 can be used continuously without battery replacement or recharging from an external source. It is noted that assembly 320 can be implemented as a single integrated circuit (IC), as a single circuit board, or in any other (preferably small) package.

In many of the embodiments discussed above, a relatively costly multipurpose user device 10 or 20 is used as a receiving unit 250. However, as indicated by the example of assembly 320 above, a simpler special-purpose device instead can be used, e.g., a device that includes just one or more sensors 252, a processor 254 (such as a microcontroller), a small amount of memory 255 (which can be included on the same IC as the processor), and a LED or other type of transmission device 257 or 258. Such a simpler, lower-cost, special-purpose device 320 can be particularly advantageous when tracking or monitoring a large number of people, pets, objects, machines or anything else, and is discussed in greater detail below.

Returning to FIG. 12, in step 272 the receiving unit 250 (e.g., user device 10 or 20, or assembly 320) identifies location information based on the messages received in step 271. This location information can be nothing more than the signal(s) received (e.g., at each of the sensors 321-324). Alternatively, such location information can be generated by processing of the received signals to varying degrees. For example, the receiving unit's processor 254 might identify the messaging unit(s) 52 from which it has received a broadcast message, e.g., in any of the ways discussed above in connection with step 162, such as by using time-division selectivity or code-division selectivity or, even more simply, by detecting an identification code (e.g., a unique code) that has been broadcast by each such messaging unit. Still further, more precise location information (and, potentially, even orientation information) can be generated by: (1) comparing the sensor-generated signals for individual messaging units 52 to determine the angles to such messaging units 52 (as described in greater detail below), and then triangulating to establish a position (or location) for, and/or an orientation of, the receiving unit 250; (2) comparing relative timing of pulses received from multiple different messaging units 52 (particularly where such messaging units 52 have different pulse frequencies or other differences in their pulse characteristics) in order to identify distances to such messaging units 52, and then triangulating; or (3) using any combination of the foregoing techniques and/or any other light-based direction-measuring or distance-measuring technique(s). Generally speaking, the amount of processing used to generate the location information in this step 272 will depend upon the processing-power of the receiving unit 250.

Next, in step 274 the receiving unit 250 transmits (e.g., using transmitter 257 or light source 258) and/or stores (e.g., into memory 255) the location information identified in step 272. Often, the receiving unit 250 will store the location information if it is a multipurpose device (such as a tablet or smart phone) and, therefore, will be able to use its current location in connection with other (e.g., higher-level) processing. On the other hand, for the simpler sensor assembly 320, the receiving unit 250 often will simply transmit the location information on to another device, e.g., for additional processing to identify the location of the receiving unit 250 and/or to use such location information for any of a variety of different purposes. In many cases, transmission will be desirable whether or not the location information is stored for use by the receiving unit 250, so that other systems and/or devices will have access to it. Such transmission, for instance, can be optical (e.g., using its own LED 258) or can use radio waves (e.g., Bluetooth, near-field communications or Wi-Fi).

Thus, in certain embodiments the receiving unit 250 itself identifies its location and/or uses that location information locally for its own processing purposes (e.g., to assist its user or for autonomous navigation). In other embodiments, either or both of such tasks is/are performed by a separate monitoring/tracking device or system, in order to limit the processing load on the receiving unit 250. In either event, at some point the location of the receiving unit 250 is identified (e.g., using any of the techniques discussed above in connection with step 272) based on the location information collected or generated by the receiving unit 250.

The simplest way to determine location is to identify the messaging unit(s) 52 from which messages were received in step 271 and then retrieve the location(s) of such messaging unit(s) 52, e.g., using a lookup table. If messages were received from more than one messaging unit 52, a simple average of their positions can be calculated to determine a coarse location. Alternatively, a weighted average, e.g., based on the signal strength received from each, can be calculated, and in many cases will provide a better estimation of location.

On the other hand, if plural directional sensors were used by the receiving unit 250, then a corresponding plurality of signals will be received for each messaging unit 52, and the broadcast from each messaging unit 52 ordinarily will be received at a different signal strength at each such sensor (assuming the sensors have different directionalities). Comparing and/or processing these differing signal strengths, e.g., using known techniques, can provide a more precise location.

Figure 15:
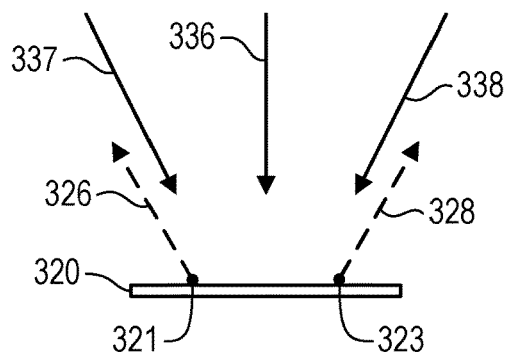
FIG. 15 illustrates overlapping reception patterns forward to directional sensors on a single card.

FIG. 15 illustrates this concept, showing a sensor assembly 320 with two sensors 321 and 323 and their respective reception beam center directions 326 and 328. Light coming from a direction 336 that is directly perpendicular to sensor assembly 320 is approximately 30° offset from each of the beam center directions 326 and 328. Accordingly, sensors 321 and 323 would detect such light at approximately the same signal level. On the other hand, light coming from the direction 337, which roughly coincides with direction 326 and is approximately 60° offset from directions 328, would be detected at a much stronger level by sensor 321 then by sensor 323. Similarly, light coming from the direction 338, which roughly coincides with direction 328 and is approximately 60° offset from directions 326, would be detected at a much stronger level by sensor 323 then by sensor 321.

In other words, by comparing the signal strengths detected at sensors 321 and 323 (e.g., using a lookup table or a pre-stored formula for that models the gain profiles of the sensors 321 and 323) from a single source, it is possible to fairly accurately identify the position of the source relative to the sensor assembly 320. One way to compare such signal strengths is to calculate a ratio of their magnitudes; then that ratio can be mapped directly (e.g., using a lookup table or a formula) to an angle at which the light is incident upon the sensor assembly 320. One advantage of employing such a ratio is that doing so eliminates any effects of intensity variation from the source (i.e., messaging units 52). However, other ratios (e.g., power ratios or the like) or other comparison metrics instead (or also) can be used. Also, the mapping of the comparison metric value to an angle can be predetermined based on the physics of the sensor assembly 320 or can be determined empirically (e.g., calibrated). Use of additional sensors (resulting in additional signals for characterizing each messaging unit 52 or other source) and/or generating and then processing signals based on the broadcasts received from different messaging units 52 (e.g., resulting in angles to other known points) can provide additional information that can be used to more precisely determine the location and/or orientation of the sensor assembly 320, as well as to identify and correct potential errors (e.g., caused by differential shading of different portions of the sensor assembly 320).

Another technique referenced above involves the calculation of distances based on differences in the pulse characteristics for different messaging units 52. For instance, if two messaging units 52 transmit pulses at different frequencies, then the phase shift between their corresponding signals received by a given sensor 252 will provide an indication of their relative distances. By using coordinated sequences of different frequencies for two or more different messaging units 52, and then calculating phase-shift information from multiple different messaging units 52, actual distances (to these known points) can be determined by taking into account the speed of light and using straightforward mathematics. Then, the location and/or orientation of the receiving unit 250 can be calculated using triangulation.

As noted above, each individual source (i.e., messaging units 52) might be identified, e.g., by decoding the received signals using different CDMA codes for the different sources (in which case the CDMA codes themselves function as identification codes that can be used to determine the locations of the corresponding messaging units 52) or in any other manner in which the individual messaging units 52 broadcast different identification (or, equivalently, location) codes. As indicated in the preceding sentence, a unique identification code, or a non-unique identification code in combination with other information (e.g., past location history that indicates a general current location) that together uniquely identify a messaging unit 52, can be easily mapped to the known location of the messaging unit, so that the terms "identification code" and "location code" often can be used interchangeably. By using multiple directional sensors 300 and/or identifying the positions of multiple signal sources (e.g., messaging units 52), it can be possible to very precisely identify the location and the orientation of the sensor assembly 320 (or other receiving unit 250).

Figure 16:
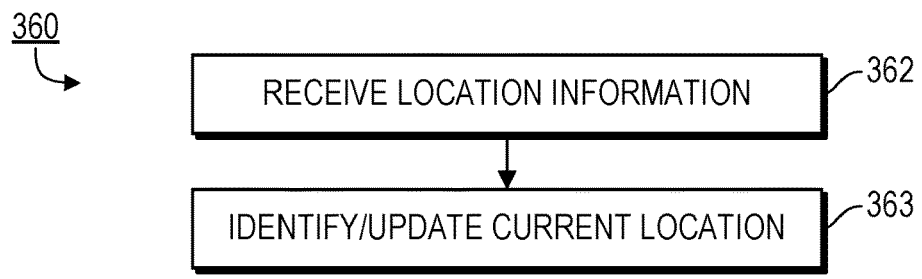
FIG. 16 is a flow diagram illustrating processing performed by a location-monitoring and/or tracking device according to a representative embodiment of the present invention.

FIG. 16 is a flow diagram illustrating a representative process 360 performed by a location-monitoring and/or location-tracking device in response to the transmission of location information in step 274. As indicated above, in certain embodiments, such a device is included in the overall system. For example, with reference to system 50 or system 200, described above, this device might be central computer 65 or server 205. In any event, the following process steps preferably are implemented as computer-executable process steps, which are read out of memory or any other storage device and then executed by one or more computer processors.

Initially, in step 362 the location information that was transmitted by the receiving unit 250 is received. This step can be accomplished in a variety of different ways, typically depending upon the manner in which the location information has been transmitted. For instance, if the message had been transmitted by the receiving unit 250 flashing a LED or other light source 258, it might initially be received by a sensor 58 and then forwarded to the subject monitoring and/or tracking device (e.g., over Wi-Fi, over a LAN or using a direct hardwired connection). On the other hand, if the message had been transmitted via a radio signal, it might initially be received by a nearby messaging unit 52 via its antenna 54, and then forwarded to the subject monitoring and/or tracking device (e.g., over Wi-Fi, over a LAN or using a direct hardwired connection). In any event, the corresponding signal is coupled to the processor for the monitoring and/or tracking device (e.g., either directly or placed in storage for subsequent access by such device).

In step 363, the current location of the receiving unit 250 is identified and/or updated, e.g., in a stored database associated with the subject monitoring and/or tracking device. The processing performed in this step 363 preferably depends upon the format of the received location information. For instance, if the received location information already identifies the location of the subject receiving unit 250, then ordinarily that information is simply stored and/or used (e.g., by another application running on the monitoring and/or tracking device or on any other device coupled to it). On the other hand, in many cases, particularly where the receiving unit 250 has limited processing capacity and/or limited energy resources for performing processing, the location information provided by the receiving unit 250 will include just exactly or essentially what was received by it from the messaging unit(s) 52. In these latter cases, additional processing is first performed in this step 363, e.g., as described above in connection with step 272 and elsewhere, in order to identify an actual physical location for the messaging unit 250.

Depending upon the particular embodiment, just the current location of the receiving unit 250 is stored and/or used, or a history of where the receiving unit 250 has been over some period of time (e.g., during at least the past 5 minutes, 15 minutes, 30 minutes, one hour, two hours, four hours, eight hours, one day, three days or one week) is stored and/or used. Similarly, although a single receiving unit 250 is referenced above, in many embodiments the physical locations for a plurality of such receiving units are monitored, tracked, stored and/or used, such as at least 25, 50, 100, 200, 500, 1,000, 5,000 or 10,000 such receiving units. The more data points that are collected and stored, the more useful information that can be generated. For example, by tracking multiple receiving units 250, it can be possible to identify foot traffic patterns and/or bottlenecks and, as a result, to design more efficient floor plans and/or business processes.
Security Systems.

Figure 17:
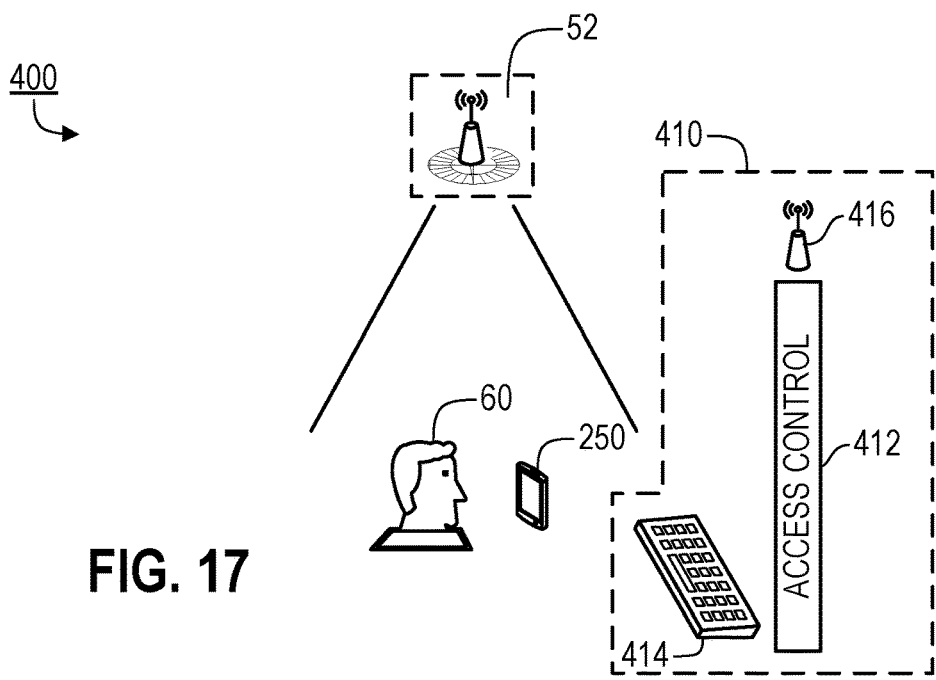
FIG. 17 is a block diagram illustrating a security system according to a representative embodiment of the present invention.

As noted above, a system according to the present invention can be implemented in a variety of different kinds of spaces and for a variety of different purposes. One set of embodiments includes security-system and/or access-control functionality. A block diagram of one such exemplary system 400 is illustrated in FIG. 17. As shown, system 400 includes a messaging unit 52, a receiving unit 250 and an access-control unit 410. Examples of hardware configurations for the messaging unit 52 and the receiving unit 250 have been described above. However, as discussed in greater detail below, in the present embodiments, these components are again configured somewhat differently from the other sets of embodiments discussed above, e.g., using different sets of computer-executable process steps (or software).

In the preferred embodiments, access-control unit 410 functions as, or at least controls, a gateway to a resource, such as stored information, one or more physical items or a physical space. Preferably, access-control unit 410 includes two main subcomponents: (1) an access-control component 412, which typically includes a processor, memory and/or other type of storage device, and which is the main processing component of access-control unit 410, performing the processing steps ascribed to access-control unit 410 below; and (2) one or more user interfaces, such as (a) a keyboard 414, a keypad (not shown), a touchscreen (not shown) or any other interface for entering information manually, (b) a radio receiver 416, an optical sensor (not shown) for receiving light-based communications, or any other interface for receiving information wirelessly, and/or (c) a physical port (not shown) for receiving a wired connection with receiving unit 250. In the discussion below, references to keyboard 414 can be replaced with references to any other interface(s) for entering information manually, and references to radio receiver 416 can be replaced with references to any other interface(s) for receiving information wirelessly.

Figure 18:
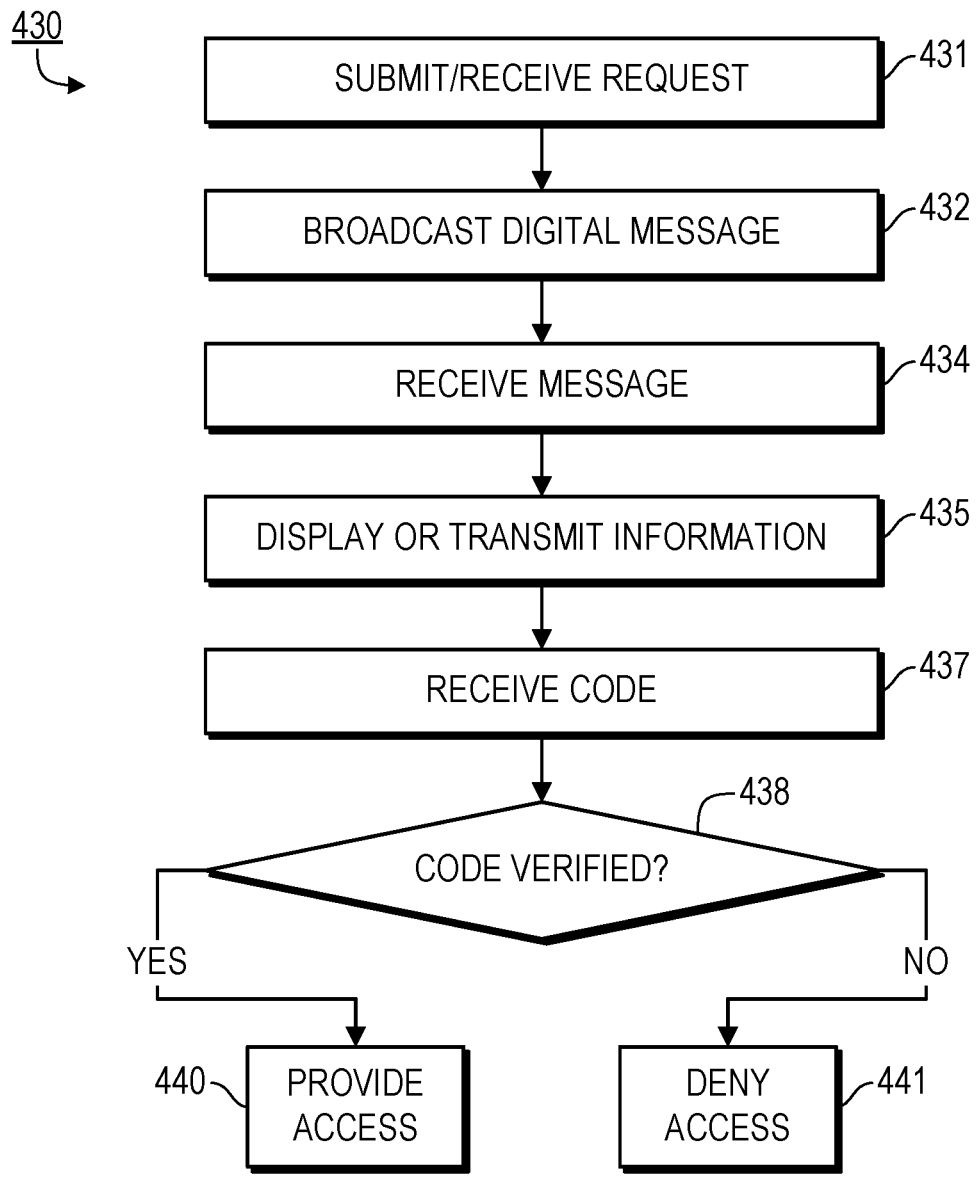
FIG. 18 is a flow diagram illustrating processing performed within a security system according to a representative embodiment of the present invention.

A description of how the foregoing components interact with each other within a system 400 according to certain representative embodiments of the present invention is now described with reference to FIG. 18. More specifically, FIG. 18 shows an overall process 430 in which some of the individual process steps are executed by the messaging unit 52, some are executed by the receiving unit 250, and some are executed by the access-control unit 410, as described in greater detail below. As will become apparent, although in some cases the individual process steps may be based on, or triggered by, manual input, such process steps preferably are mainly or substantially automated, being stored as computer-executable process steps, and executed by the processor associated with the corresponding device.

Initially, in step 431 a request is submitted by the receiving unit 250 and then received by the messaging unit 52 or by any other device that is in communication with access-control unit 410. In the preferred embodiments, this request signals a desire by the user 60 or the receiving unit 250 to have access to a protected resource. It can, for example, be transmitted wirelessly (e.g., via radio signals using radio transmitter 257 or via modulated broadcasts of light using LEDs or other light sources 258), entered manually (e.g., via keyboard interface 414), or submitted via a wire or cable connection. In any event, the request can be generic and/or can include information identifying the user 60 and/or the receiving unit 250. However, as discussed below, in certain embodiments, this step 431 is omitted.

In step 432, a digital message is broadcast by messaging unit 52. This step 432 can be triggered by the receipt of a request in step 431 or else, e.g., where step 431 is omitted, it can be performed periodically (e.g., continuously at intervals not greater than 1, 5 or 10 seconds), or it can be performed based on any other triggering condition (e.g., attempted access of the certain webpage, physical motion within a particular space, detection of a person in a particular location, and/or detection of a particular type of electronic device in a particular location). In any event, the digital message preferably is broadcast by flashing the light source 55 on and off, e.g., in any manner described above, and includes a secret (e.g., randomly or pseudo-randomly generated) code. Such a code can be generated independently or can be generated (e.g., using encryption and/or hashing) based on information (if any) within the request received in step 431 (e.g., information identifying the user 60 and/or the receiving unit 250).

In step 434, the receiving unit 250 receives the digital message that was broadcast in step 432 via its sensor(s) 252, which typically converts the light-based signal into an electrical signal. This electrical signal is then coupled to the processor 254 of the receiving unit 250.

In step 435, based on the message received in step 434, receiving unit 250 transmits or displays certain related information. In certain embodiments, the information transmitted or displayed in this step 435 is just the same information (e.g., code) received in step 434. In other embodiments, the received information is supplemented with information associated with the user 60 or the receiving unit 250, such as a personal password of the user 60, a code generated from a biometric scan of user 60 (e.g., a fingerprint or thumbprint, or a photograph of the user 60 or some feature of the user 60), a unique identification code for receiving unit 250, or any combination of the foregoing. Preferably, one or more of such codes is used as, or is used as the basis for, an encryption code to encrypt one or more of such other codes. In any event, the result preferably is a code indicating that the user 60 and/or the user's receiving unit 250 currently is in the vicinity of messaging unit 52. Such information can be transmitted, e.g., by modulating one or more light sources 258 or via a radio transmitter 257. Alternatively, such information can be simply displayed on a monitor 260 (e.g., in alphanumeric form or other format that is easily readable by a human, or in a more computer-friendly format, such as a QR code).

In step 437, an access code is received by access-control unit 410. If the information in step 435 had been transmitted, and then such information is received by an appropriate sensor or receiver (e.g., radio receiver 416) and the access code is derived therefrom in this step 437. Alternatively, if the information had been displayed in step 435, then, e.g., in this step 437: (1) it could be read optically (e.g., by having an optical sensor directly read the display from monitor 260); or (2) it could have been read by the user 60 who then inputs it (or a code based on the displayed information) manually (e.g., via keyboard 414).

In step 438, access-control unit 410 determines whether the received access code is correct (e.g., corresponds to a reference code that is based on the digital message broadcast by the messaging/modulation controller and/or matches an expected code for an authorized user 60 or an authorized receiving unit 250). If so, then processing proceeds to step 440 in which access to the desired resource is granted. If not, then processing proceeds to step 441 in which access is denied. In this regard, the granting of access may involve, e.g., providing access to restricted portions of a website, providing access (e.g., read, write or both) to any other restricted data, opening an electromechanical lock to permit access to a restricted location or space, making available certain restricted electronically-implemented or electronically-controlled functionality, opening restricted communication channels, or providing access to any other restricted physical, virtual or intangible resource.

Light-Based Communications Based on Characterization Information.

Generally speaking, the embodiments discussed above concern systems, methods and techniques for communicating with a variety of users 60 within a particular space, such as customers within a retail or other commercial space. Such communications can be based on any of a variety of different factors. For example, in most of the previous embodiments, the communications are based on the current locations of the individual users 60 and, in some cases, based on the previous locations or movements of such users 60. Furthermore, in some of the previously discussed embodiments, the communications also (or instead) are based on individual characteristics or other previous activities of the users 60 and/or other individuals within the covered space. The present embodiments include additional options for providing user-specific communications, particularly for communicating based on the end-user's, the recipient's and/or their companions' individual characteristics.

Figure 19:
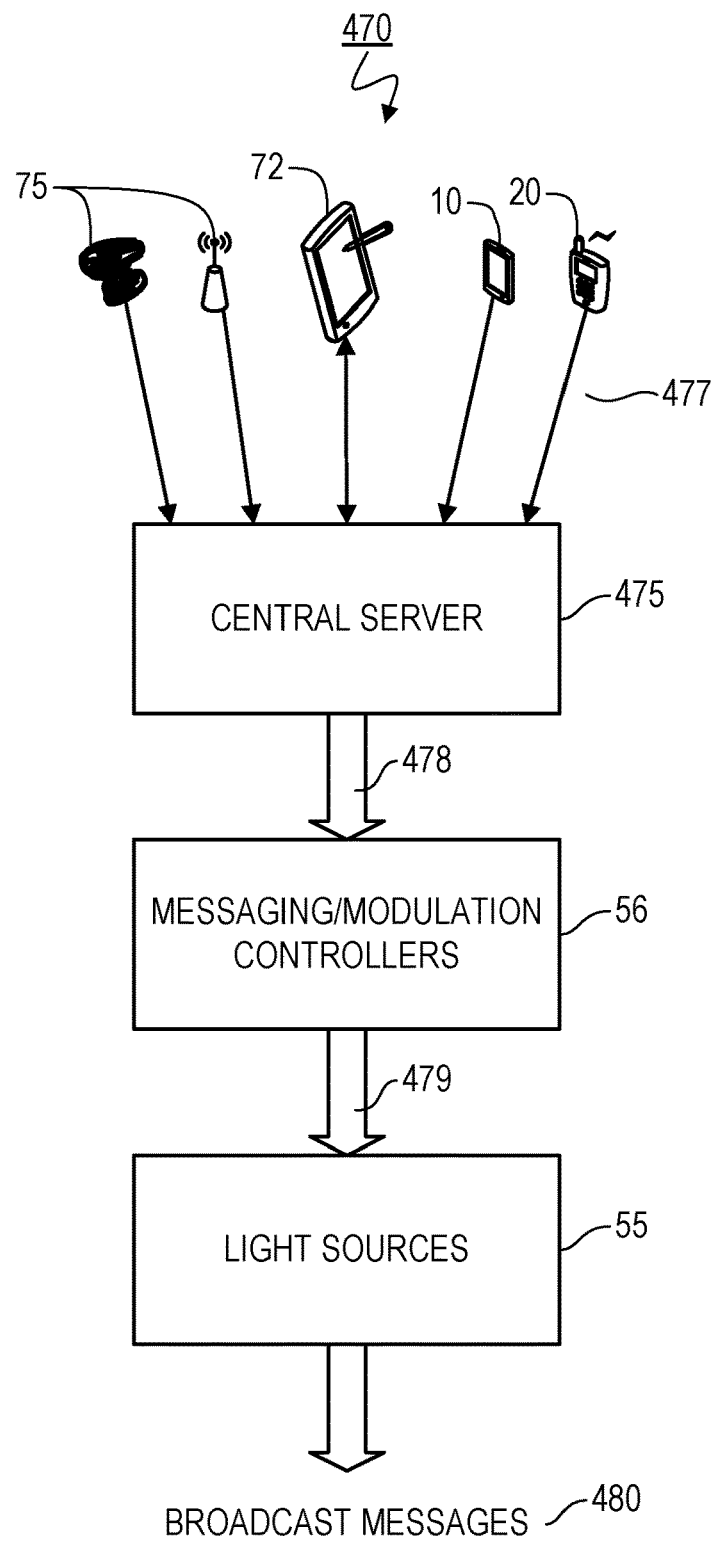
FIG. 19 is a block diagram illustrating a system for delivering messages based on user characteristics according to a representative embodiment of the present invention.

The present embodiments can operate within the context of a variety of different systems, such as system 50 or system 200, described above. One such system 470 (which otherwise could have structure of system 50 or system 200) is illustrated in FIG. 19. As shown, system 470 has a central server 475 which can include, e.g., computer 65, server 205 or a combination of the two. Central server 475 preferably receives information 477 from various sources (such as those noted below) and then processes such information 477 to create or identify messages 478 to be broadcast or otherwise sent (and subsequently received and displayed by the user devices 10 or 20 of individual users 60) based on such information 477. More preferably, central server 475 causes the identified messages 478 to be distributed to the appropriate messaging/modulation controllers (e.g., controllers 56), which in turn output control signals 479 to the light sources 55, causing them to broadcast such messages 478 by modulating their light output 480 (e.g., using a selected encoding technique so that they can be received by the appropriate user devices 10 or 20).

Information 477 preferably pertains to the individual users 60 and, in some cases, also pertains to other people within the covered space (e.g., as described in greater detail below). As noted above, such information 477 can be collected in any of a variety of different ways, using a variety of different system components. For example, the user 60 might submit information about, or a profile of, himself or herself through a user device 10 or 20, or through a different computer or device. In addition, or instead, one or more sensors (e.g., sensors 75 or sensors on the user devices 10 or 20) can be used to automatically collect information regarding the users 60 and/or such other people. Still further, information 477 may be manually input by a different person, such as an associate 73 using a device 72. Generally speaking, such information-collection approaches can be divided into substantially automated approaches using sensors or substantially manual approaches using input devices, although hybrid devices that permit a combination of such approaches also (or instead) may be employed.

As to the use of automated sensors 75, many options are available. For example, cameras can be used to capture still images or video, which can then be stored for future reference and also manually examined and/or automatically processed using available algorithms to identify any desired information, such as approximate age and gender, height, facial characteristics, or other biometric information, which then can be used to recognize, or to confirm the identities of, individual people. RFID sensors, operating in conjunction with RFID tags on individual items, can be used to determine, e.g., what objects an individual picks up and/or how long he/she holds them. Infrared sensors can be used to detect individual people. Laser range finders can be used in conjunction with cameras or other sensors to identify locations of people. Radio receivers (e.g., having scanning directional antennas) can be used to locate individuals using wireless devices, e.g., including those who are not communicating within a system according to the present invention. Information 477 from multiple different sensors 75 (e.g., any of the foregoing sensors) can be used by central server 475 to triangulate the locations of individual people. In certain embodiments, e.g., using any of the techniques described herein, the central server 475 tracks the locations of the users 60 and, in some cases, other individuals as well.

Sensors on the user 60's device 10 or 20 (e.g., under control of a user app for communicating within the present system 470) can obtain information regarding, e.g., movements made by the user 60, Web browsing history, texting history, e-mailing history, telephone use history and various other previous explicit uses of the device 10 or 20 by the user 60, as well as the times and locations of such uses. Then, the user app causes such information (or information derived from such information, e.g., to protect the user 60's privacy) to be transmitted along with the other information 477 to the central server 475.

As noted above, the central server 475 preferably implements a tracking system that tracks locations of users 60 and, in some cases, of the people within the covered space. Typically, such a tracking system inputs sensor data (discussed above) and then combines such data using available techniques (such as triangulation, Kalman filtering, etc.) to generate the tracking information.

Such tracking information is then combined with all of the other collected information 477 to identify or obtain the messages 478 that are directed to individual users 60, e.g., using collaborative filtering, neural-network processing, clustering algorithms and/or any of the other techniques described herein or otherwise available for identifying effective messages, particularly available techniques for targeting advertising messages. The combination of long-term data (such as gender and age) and temporary data (such as an assessment of the user 60's current mood) often can provide for much better message targeting that is available conventionally. In addition, the combination of automatically collected data and real-time input from human observers can further improve such targeting. Still further, use of current information regarding a user 60's companions, as well as information regarding the user 60 himself or herself, often can provide even more relevant message targeting, e.g., by taking into account any influences such companions are likely to have on the user 60's purchasing decisions and/or any distractions such companions are causing user 60.

With respect to manual input, clustering, machine-learning and other statistical techniques can be used to evaluate and weight the inputs from different associates 73, either on an overall basis or on a characteristic-by-characteristic basis. For example, one associate 73 might be very good at estimating the ages of users 60, while another might be good at assessing a user 60's current mood. By statistically correlating such assessments over a large number of characteristics and individual users 60, correlation strengths can be determined so that future assessments can be weighted more or less heavily based on who the associate 73 is and what the specific characteristic is.

For the foregoing purposes, the raw information 477 provided by sensors 75, provided by sensors on the user devices 10 or 20, input by the users 60 themselves, input by an associate 73, or obtained in any other way may be directly used by the central server 475 or may be first processed to obtain more relevant derivative information that is then used in constructing or identifying effective messages. In the preferred embodiments, the particular information to use is identified based on statistical evaluations of the types of information that are most relevant to achieving a particular defined goal or subgoal.

In this regard, the goals sought to be achieved by a system 470 according to the present embodiments can include, e.g., motivating the user 60 to: move to a different location within the covered space, purchase or at least examine or consider a particular item, engage in a game or contest, participate in some other group activity, or communicate with friends or family by telephone or electronic messaging. Once a particular goal has been identified (e.g., by a manager or other individual associated with the system 470), the particular messages 478 preferably are selected by the central server 475 so as to maximize the likelihood that the users 60 will take the corresponding action. In addition, the same user-specific information-based approach can be used to first identify subgoal(s) that are likely to cause individual users 60 to take the action associated with the main goal and then to communicate messages 478 that are likely to cause the individual users 60 to engage in the action(s) corresponding to such subgoal(s).

Figure 21:
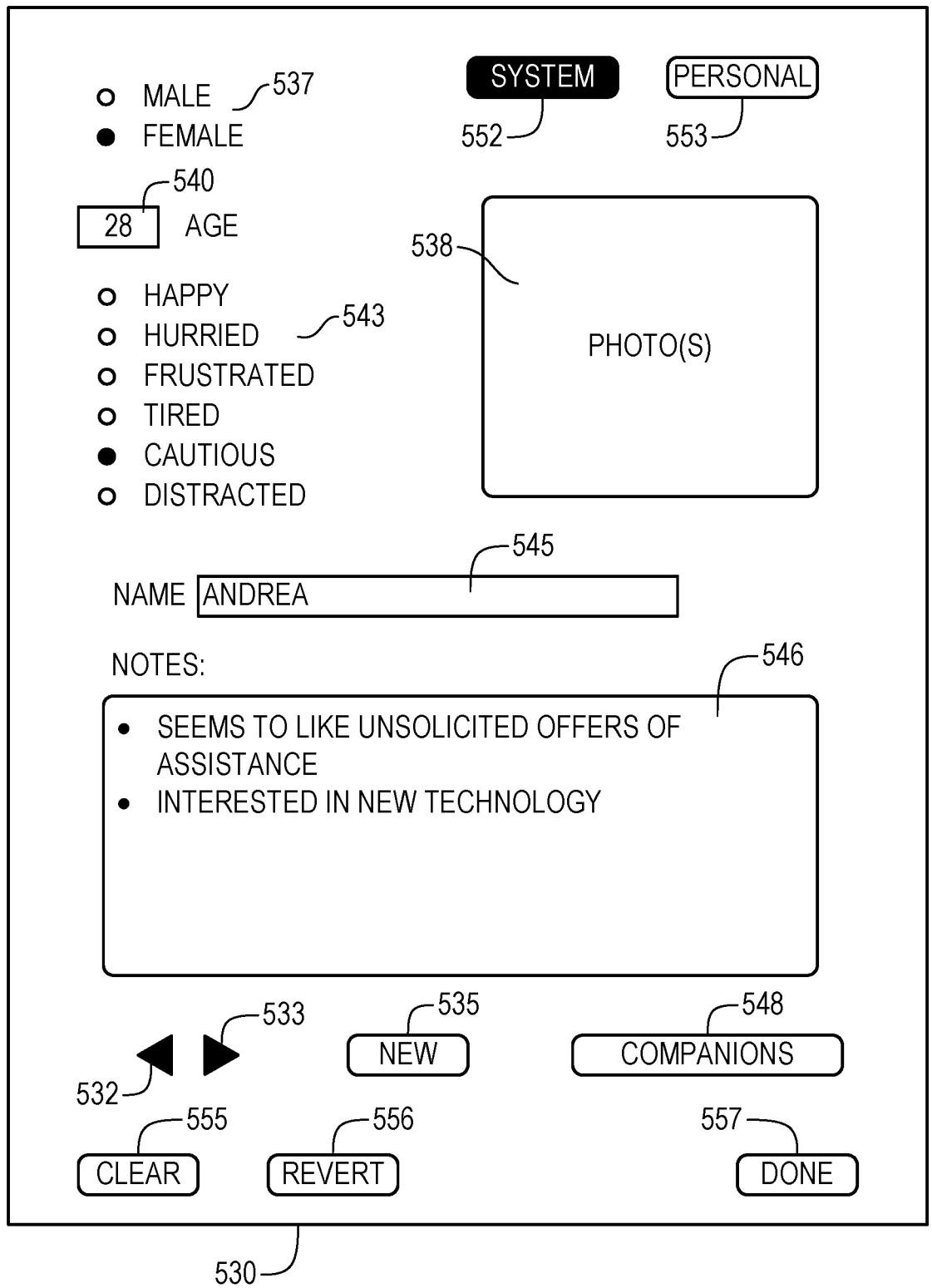
FIG. 21 is an exemplary page of a user interface for inputting and displaying information regarding a user or other individual.
Figure 22:
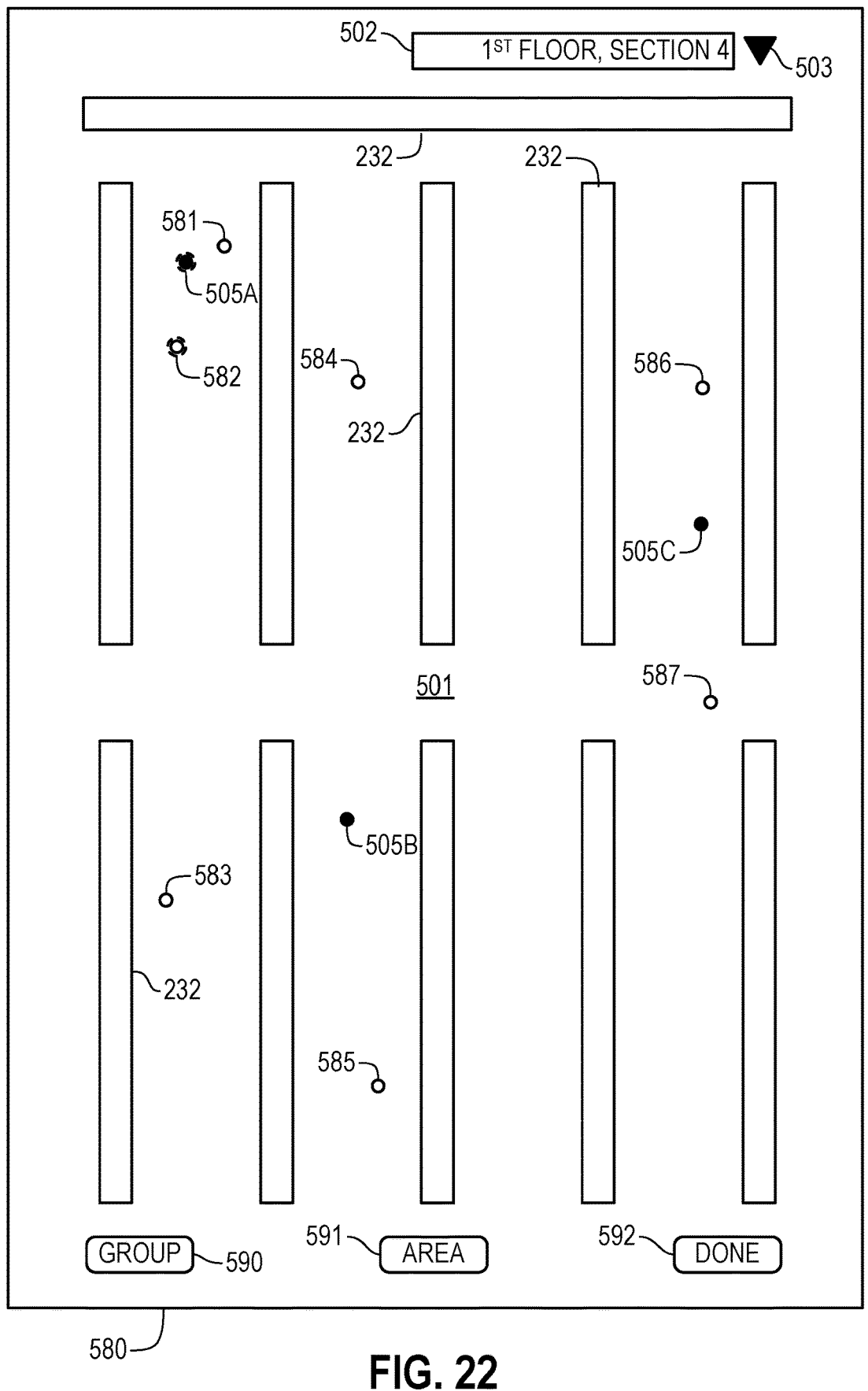
FIG. 22 is an exemplary page of a user interface showing the layout of a portion of a covered space and the locations of registered, active users and other individuals.

As noted above, the information 477 also can be input manually, either by the user 60 or by other individuals, such as one or more associates 73. In the former case, the information 477 generally is input when the user 60 manually creates a profile, which is then transmitted to central server 475. In the latter case, associate device 72 preferably provides a dedicated user interface for inputting information regarding the user 60 and, in certain cases, other individuals as well. Pages 500, 530 and 580, taken from one example of such a user interface, are illustrated in FIGS. 20-22, respectively.

Figure 20:
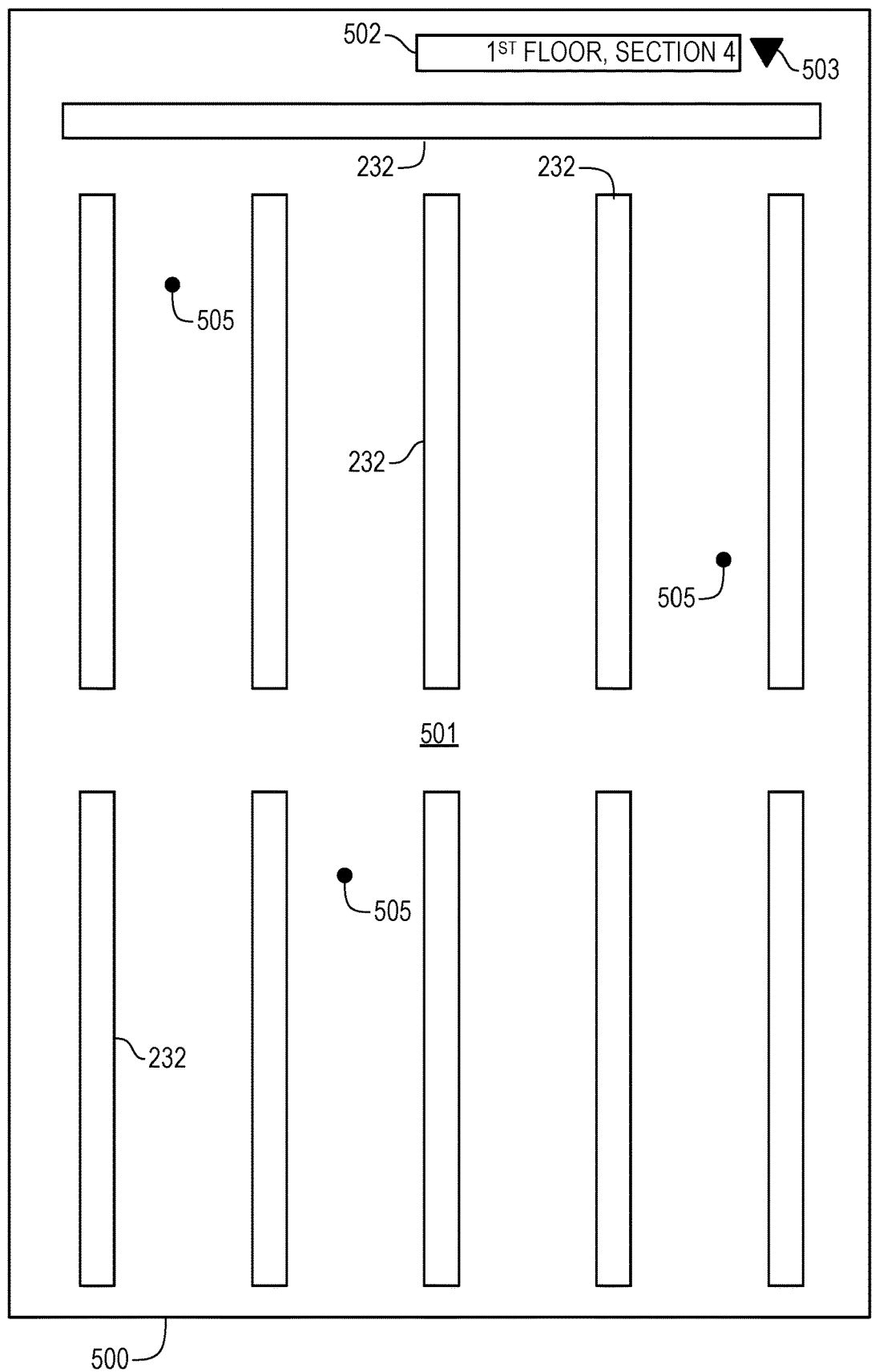
FIG. 20 is an exemplary page of a user interface showing the layout of a portion of a covered space and the locations of registered, active users.

Interface page 500, shown in FIG. 20, displays a section 501 of the space covered by a LiFi system 470 (e.g., configured as system 50 or 200) according to the present invention. The particular section 501 illustrated on page 500 is identified in box 502. When the down arrow 503 is touched or clicked, a drop-down list is displayed and a different section of the covered space may be selected for illustration. Alternatively, a graphical user interface page that displays the entire covered space, divided into sections, may be displayed so that the associate 73 has the ability to select or designate the section that is desired to be displayed. In fact, such an overall map of the entire covered space may be presented initially for the associate 73 to select the desired section to view. However, in the preferred embodiments, the current location of associate 73 is tracked by central server 475 and the section corresponding to associate 73's current location is displayed by default, with the displayed section automatically changing as associate 73 moves through the covered space, using either predefined sections or ad hoc sections, based on associate 73's current location (as to the latter, e.g., with the currently displayed section being centered at associate 73's location).

In the present example, the covered space is a commercial space, such as a retail store or a mall, and the illustrated section 501 includes shelves 232. To further assist the associate 73 (in this example, typically a salesperson or sales associate), the shelves or any other areas of the displayed section 501 optionally are labeled with the types of items that are located in that subsection or with any other information that can provide the associate 73 with visual context.

In any event, the locations of some or all of the users 60 are designated by icons 505 (in the present example, black dots). In the present embodiment, the icons 505 are displayed only for registered users 60 whose user devices 10 or 20 are on and are in bidirectional communication with the system 470 (e.g., those transmitting signals from their user devices 10 or 20 to the central server 475 through the LiFi network, a Wi-Fi network or in any other manner). As a result, e.g., using any of the techniques discussed herein, a fairly precise location of each such user 60 typically can be obtained. By displaying such locations in this way, it is possible for an associate 73, operating an associate device 72, to easily match up individuals he or she sees within section 501 with the icons 505 that are displayed on interface page 500. Optionally, the location of associate device 72 also is displayed on page 500, e.g., to even better assist associate 73 in matching customers or other users 60 to the displayed icons 505.

Then, touching or clicking on one of the icons 505 preferably causes a new user-interface page to be displayed, e.g., one that permits information about the corresponding user 60 to be input and/or that displays information already known about such user 60. An example is page 530, shown in FIG. 21.

In the preferred embodiments, page 530 is pre-populated by the central server 475 with information it has previously obtained. More preferably, information that has been previously input by the current associate 73 (e.g., the logged-in user on the device 72 on which page 530 currently is being displayed) is highlighted (e.g., displayed in bold, in a different color, or in some other distinguishing manner) as compared to information obtained by central server 475 in other ways. In the current embodiment, the associate 73 has the ability to modify (e.g., update) or supplement any of the displayed (e.g., pre-populated) information.

In addition, in some cases it will be apparent that the information previously obtained does not correspond to the actual user 60 that the associate 73 is observing. This might be because, e.g., a single user device 10 or 20 is shared by two or more people (such as a husband and a wife). In that case, arrow buttons 532 and 533 can be used to navigate backward or forward, respectively, among the various individuals who previously have been associated with the current user device 10 or 20 or with the current login information for the user 60, e.g., with each click or touch of one of the arrow buttons 532 or 533 bringing up a page 530 that has been pre-populated with personal characteristic information corresponding to a different individual who has previously been observed in connection with the present user device 10 or 20 or the present login information, as applicable. If none of these previously observed individuals seem to match the present individual, "New" button 535 can be touched or clicked to bring up a blank page 530 for inputting information about the current individual.

A variety of different types of information can be input and/or can be pre-populated and displayed within page 530. In addition, although only a single such page is discussed, multiple different information pages can be provided for each individual. The specific information shown on page 530 includes a designation of gender (selectable by clicking on one of the radio buttons 537), one or more photographs that are displayed in region 538, age field 540, name field 545 and a field 546 for any additional notes. However, these types of information are merely exemplary. Fields, buttons or any other user interface elements for any of a variety of other kinds of information about the user 60 may also (or instead) be included, typically depending upon what information is deemed most useful for the desired purposes. Examples include: current manner of dress (e.g., business professional, business casual, recreational, trendy or urban), ZIP code or other indication of the user's neighborhood of residence, interests, social media friends or contacts, or any other personal or demographic information.

On the other hand, a great deal of information 477 may be collected by the central server 475, while only a portion of it is displayed on page 530. Typically, it will be most desirable to include on page 530 information types that either: (1) are only (or at least best) capable of being personally observed and/or (2) would be useful to an associate 73 in talking to or otherwise personally interacting with the corresponding user 60. Also, in certain embodiments the fields and/or choices displayed on page 530 are varied dynamically based on previously input or otherwise obtained information, such as different choices for mood buttons 543 depending upon the user 60's age and gender.

Generally, unless there is an indication that the determination was made by an automated process, once one of the male/female radio buttons 537 has been selected it will not be subsequently changed by the current associate 73. However, in certain cases, e.g., where gender has been machine-designated based on captured video(s) or image(s), the associate 73 might change the initial designation.

In any event, to assist the associate 73 in confirming that the current user 60 is the same individual whose information is being presented on the current page 530, in certain embodiments previously taken photographs are displayed in region 538 (e.g., along with navigation arrows if more than one).

Once an estimated age has been entered into the field 540 (or subsequently updated), the central server 475 preferably automatically updates it in response to the passage of time. Also, multiple different age estimates (e.g., from different associates 73 or input at different times) may be combined (e.g., averaged) together, for purposes of pre-populating field 540 on this page 530 and/or for use in other ways by the central server 475.

A set of buttons 543 permits the associate 73 to select the currently perceived mood of the user 60. In the preferred embodiments, any number of applicable labels may be selected. However, in alternate embodiments, buttons 543 are radio buttons so that only one may be selected. As discussed in greater detail below, this information can be particularly useful in directing messages to the user 60, and it is the type of information that is typically very difficult to determine through automated analysis.

Field 545 displays the name of the user 60, if previously obtained, or allows the associate 73 to enter a name, e.g., if he or she learns it during a conversation with user 60. Again, this information preferably is highlighted to indicate whether the current associate 73 previously was told the user's name or whether it was obtained in some other manner. Alternatively, such information might not even be displayed to the current associate 73 unless the same individual previously entered it. The main reason for these displays features is that many users 60 (e.g., customers) might feel uncomfortable if someone he or she has not previously spoken with addresses him or her by name.

Field 546 permits entry and display of additional information (e.g., arbitrary or unformatted notes) about the user 60. Similar to buttons 543, field 546 permits inputting of personal observations about the user 60. However, the information in notes field 546 typically will be most useful to the associates 73 themselves, e.g., in providing cues about how to approach the user 60 and/or about what to say to user 60. At the same time, available automated tools often will be able to extract meaning from these notes 546 and then use such information in directing messages or other communications to the user 60 (or at least suggesting such messages).

Once again, for reasons similar to those mentioned above, the notes 546 that previously have been input by the current associate 73 preferably are highlighted. In the particular illustrated example of field 546, each individual note is designated by a separate bullet. In addition, each note could be accompanied by metadata, indicating, e.g., who input it and/or the date and time it was entered.

For any of the fields displayed on page 530 (e.g., any of fields 540, 545 or 546), information preferably can be entered or altered using any available user interface mechanisms, such as clicking or touching within the field and then typing in order dictating the information. For tablets and similar touchscreen devices, touching within any such field preferably results in the display of a pop-up numeric keypad or alphanumeric keyboard, as applicable, for entering the corresponding information.

As discussed above, user-interface elements 532, 533 and 535 are for associating different individuals with a single user login and for navigating among those different individuals. In addition, the user 60 often will have other individuals with him or her, such as family members, friends or other companions. For those situations, in the present embodiment, clicking or touching the Companions button 548 causes a new page to be displayed, preferably identical to page 530 but for specifying and viewing information pertaining to the main user 60's individual companions. In this new page: arrow buttons 532 and 533 can be used for selecting from among different individuals who previously were identified as companions for user 60; button 535 can be used to create a new record for, and input information regarding, a new companion; and button 548 (preferably now labeled "Back", "Device Owner" or "Registered User") returns the associate 73 back to page 530, showing information for the user 60.

The preceding discussion generally describes an embodiment in which information presented to the associate 73 can include, in addition to information originally input by that particular associate 73 himself or herself, other information that was input by other associates 73 and/or obtained in other ways. This ordinarily will be the preferred mode, so that each associate 73 has access to all or almost all available information that either would be useful to him/her in his/her interactions with the users 60 or would allow him/her to avoid having to input information that has already been input by another associate or obtained in some other way. However, in the current embodiment, the associate 73 has the option of selecting button 552 to display information in the "system" mode (in which such information is displayed irrespective of how it was obtained, as generally discussed above) or button 553 for the "personal" mode (in which only information previously input by the present associate 73 is displayed). In alternate embodiments, only the personal mode is available (i.e., so that the associate 73 does not have a choice).

Finally, clicking or touching the "clear" button 555 clears all information from page 530, clicking or touching the "revert" button 556 reverses the last change made by associate 73, and clicking or touching the "done" button 557 saves the current information to the central server 475 and returns the user interface to page 500.

In addition to displaying other information about the user 60, page 530 (or any other page of the user interface) optionally can display a variety of different kinds of messaging information. For instance, it could display any or all of: proposed messages for sending to this particular user 60, which the associate 73 can then accept, reject or modify; or messages that were previously sent to the user 60, e.g., together with the date and time they were sent, so that the associate 73 can be better informed when speaking with or otherwise interacting with the user 60.

In the preceding embodiments, the central server 475 only tracks the positions of registered users 60 whose user devices 10 or 20 are on and are in bidirectional communication within the system 470. However, in alternate embodiments sensors 75 (e.g., cameras or infrared sensors to detect the individuals themselves or radio receivers to obtain locations based on the transmissions from people's wireless devices) are used to track the locations of other individuals within the covered space, i.e., those were not communicating within the system 470. As result, it often will be the case that less is known about these individuals.

For such an embodiment, rather than using page 500, page 580 (shown in FIG. 22) is used to display a selected portion 501 of the covered space. In page 580, the users 60 who are in bidirectional communication with the system are designated with black dots 505A-C and the other detected individuals within the space are designated with open circles 581-587. In addition to the functionality described above in connection with page 500, page 580 also provides the following functionality. Touching or clicking on any of the open circles 581-587 causes an information page 530 for that individual to be displayed, although in many cases, without some ability to store identifying information for such individuals, it might be difficult to store and retrieve information for a single individual from one visit to the next. Facial recognition or other biometrics may be used for this purpose. Also, or instead, as indicated above, previous designations as a companion of a user 60 can be used in maintaining the identity of such non-registered individuals.

In this regard, page 580 provides the associate 73 with the ability to designate which of the other detected individuals appears to be with a particular user 60. Such functionality is initiated by touching or clicking on the "group" button 590. Once this has been done, touching or clicking individual icons (e.g., any of icons 505A-C and/or icons 581-587), rather than bringing up information pages 530, instead causes such icons to be highlighted indicating that they are a group of people who are together. Thus, for example, in FIG. 22, the associate 73 has touched icons 505A and 582 (as indicated by the fact that they are now highlighted), meaning that associate 73 believes them to be together. At the same time, the individual corresponding to icon 581, although in close proximity to this group, has not been highlighted as being with them. Alternatively, rather than (or in addition to) designating companions individually, associate 73 can click or touch "area" button 591 and then draw an area, causing all icons within that area to be highlighted as being together. Once all members of a particular group have been highlighted in either manner, the "done" button 592 is touched or clicked to save the information to the central server 475 and return page 580 to its default state (i.e., no highlighting of the icons). This procedure can be repeated as many times as desired, in order to identify any number of groups of people who appear to be together.

Other Exemplary Embodiments Using Light-Based Communications

As will be readily apparent, the present invention is ideally suited to any environment in which a high level of spatially dependent messaging is desired. In addition, because the systems of the present invention can integrate with, and use much of the same infrastructure as, energy-efficient LED and other lighting, such systems can be extremely cost-efficient as well as energy-efficient.

One application of a system according to the present invention is in education, such as primary-level and secondary-level classrooms (e.g., elementary schools, middle schools and high schools). However, any other educational setting could benefit from such a system. For example, with such a system an instructor can divide the class into different groups, e.g., with each group learning different material, or learning the same material but at different speeds. Then, messaging units 52 in the different locations, corresponding to the different groups, can be used to communicate different content that is relevant to each individual group's particular focus. Such groups can be made as large or as small as desired, even to the point that each "group" can consist of just a single student (e.g., by using desk lamps as the light sources 55 for the messaging units 52), so that individualized communications are possible. In addition, or instead, each classroom can be designated as a different group, receiving different messages than the other classrooms. Also, rather than designating groups, an instructor can designate different "learning stations" where different material is taught, explored or practiced, with the students moving among such different stations.

Similar communications/messaging can be used in connection with less-formal educational settings, such as museums, galleries, displays, exhibitions or tourist sites. Here, the same light source that is used to illuminate a particular exhibit or other item of interest also can be used to communicate information regarding that exhibit or item and/or to communicate information about any similar or related exhibits or items.

Other locations in which systems according to the present invention can be beneficial include hospitals, urgent-care centers and other medical facilities. Here, the messaging units 52 preferably broadcast information that is relevant to their corresponding physical locations, such as information (e.g., medical history, current medical condition, personal preferences or other personal information) regarding a patient within that patient's room or within an operating room into which a patient has been or will be moved.

Still further, a system according to the present invention can utilize (e.g., work in conjunction with) any existing or future public, municipal, commercial or other lighting system or set of individually controlled lights. In one embodiment, traffic lights are used to broadcast information, such as information pertaining to events or conditions within the local vicinity (e.g., traffic, road conditions, detours, local events or traffic-light timing) or even information pertaining to businesses or other commercial activities (e.g., to generate revenues for the corresponding municipality). In more-specific embodiments, a sensor within a smartphone or within a user's automobile receives traffic-light timing information in this manner, and then an associated processor retrieves and uses GPS, traffic and/or vehicle speedometer information, in conjunction with such traffic-light timing information, to generate messages that advise the driver: whether he/she is safe to proceed, whether to speed up in order to make it through the intersection before the light turns red, or whether to prepare to stop because it is not possible to make it through the intersection safely or legally. Because traffic signals are directional, different information can be broadcast to drivers based on the direction in which they currently are traveling. In addition, through integration with the vehicle's or smartphone's GPS, the incoming information from the traffic light can be filtered and/or used based on relevance to the user's current route or relevance to the user in any other way. Still further, streetlights and/or illuminated commercial signs can be configured to broadcast any desired information to drivers, bicyclists, pedestrians, etc.

In most of the embodiments described above, the messaging units 52 are in fixed locations. However, in certain embodiments messaging units 52 are mobile. For example, in one alternate embodiment one or more automobiles (and/or other transportation vehicles, such as trucks, buses, streetcars, other modes of public transit, motorcycles or bicycles) are configured so as to provide the functionality of messaging units 52, e.g., with their headlights, taillights and/or any other already-existing or additional add-on lights functioning as the light sources 55. In these embodiments, the vehicles preferably broadcast information regarding themselves, such as their current route information (e.g., obtained from an onboard GPS system or via a Bluetooth or other wireless connection to a smartphone implementing a navigation system), their current speed or location, whether they are about to brake or accelerate (e.g., when coupled to an automated driving system), whether the driver's foot is positioned on or above the accelerator or the brake, and/or even vehicle or driver identification information (e.g., for reception and use by police cars). Any or all of this information can be received by other vehicles for use in automatically controlling the driving or operation of such other vehicles and/or for providing alerts to the drivers of such other vehicles. In addition, or instead, such information can be received by traffic sensors for use in controlling or guiding overall traffic flow and/or by any other sensors for any other purposes.

In still further embodiments, mobile messaging units 52 are implemented as flashlights, cellphone lights (e.g., light sources 14), keychain lights or any other portable lights. In the preferred embodiments, such mobile messaging units 52 are configured to broadcast information about the corresponding user, which information is then received and used for any of a variety of purposes, such as security, identification and/or team coordination. For instance, a properly configured keychain light or other flashlight can be used, not only to provide illumination, but also to broadcast a code that unlocks a home or automobile lock. A police or firefighter's flashlight can be configured to also broadcast a code identifying the officer or firefighter to his or her colleagues and/or to provide other immediately relevant information, such as a live video from the individual's helmet cam for coordinating the activities of multiple individuals. Similar light-based messaging also can be employed by automated and/or robotic devices at an emergency scene, e.g., for similar purposes.

Also, in the embodiments discussed above, the user device 10 or 20 generally is a smartphone, tablet or other portable handheld electronic device. However, user device 10 or 20 instead could be implemented as any other kind of device, or any combination of devices. For instance, the sensor portion 12 for receiving light-based messages can be implemented as an eyeglass camera, such as currently is implemented in the Google Glass product, or any other type of wearable sensor. The light source portion 14 for broadcasting light-based messages can be implemented as a light on a handheld device, a wearable light source or any other kind of light. Still further, the sensor 12, light source 14 and processor 254 can be included within a single device or provided within multiple different devices that are coupled to each other.

In short, communication systems according to the present invention can involve any mixture of fixed and mobile messaging units 52 and user devices 10 or 20. Both the messaging units 52 and the user devices 10 or 20 can take on any of a variety of different forms, for any of a variety of different purposes.

In each of the foregoing embodiments, not only are highly specific location-based communications facilitated, but such communications can be very secure. On that basis, systems of the present invention can be distinguished from Wi-Fi networks and other radio-frequency-based communications in which the communications signals penetrate walls and other structures and are, therefore, more easily monitored by others than are light-based communications according to the present invention.

Finally, in any of the embodiments discussed herein that refer to light-based or LiFi communications, it should be understood that the referenced communications can be performed exclusively using such light-based or LiFi approaches. Alternatively, any of such communications instead can be performed in part using such light-based or LiFi approaches and in part using any other (preferably wireless) communications systems, such as Wi-Fi, cellular-based, Bluetooth or near-field communications. Similarly, in any embodiment according to the present invention, the referenced light-based or LiFi approaches can be used in conjunction with one or more other communications systems, such as where the light-based or LiFi approach is used for the final link in communicating with an end user and one or more other additional communications systems are used to reach a desired server.

Other Retail Embodiments

The foregoing embodiments often can provide an enhanced retail shopping experience, e.g., including unique combinations of in-store and online shopping benefits. The following embodiments provide, among other things, communications systems that often can even further improve a customer's shopping experience.

Figure 23:
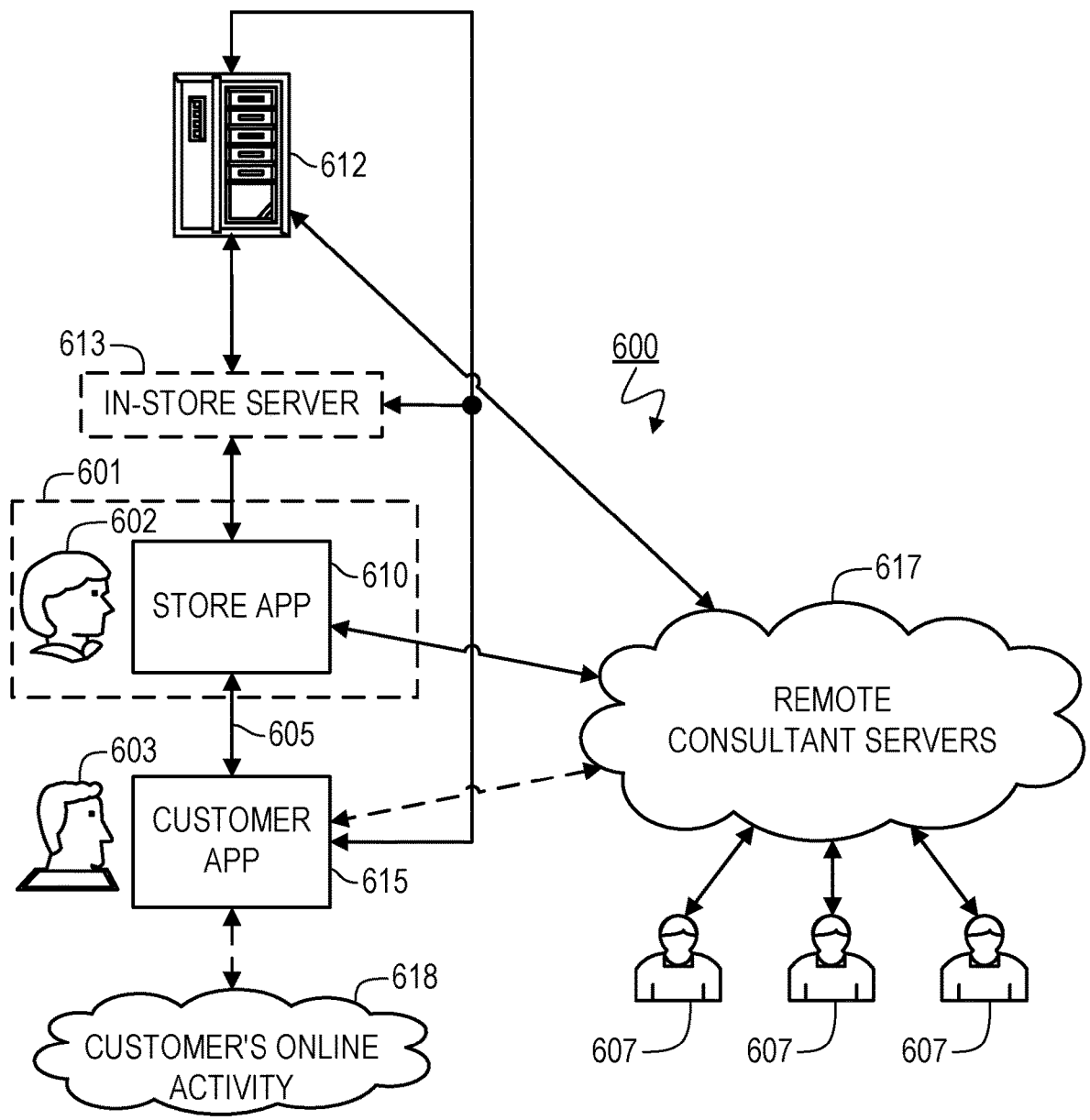
FIG. 23 is a block diagram of a communication system according to a representative embodiment of the present invention.

One such embodiment, illustrated in FIG. 23, employs a communications system 600. System 600 can link a number of different individuals, such as: (a) a retailer's employee or other representative (just referred to herein as the "retail employee" or the "store employee") 602, who typically is present within one of the retailer's physical locations (e.g., a physical store) 601; (b) the retailer's customer 603, who might or might not be present within the store 601; and (c) any of a number of different remote consultants 607. One significant feature of system 600, in particular, is the provision of a communication link 605 between the store employee 602 and the customer 603. To provide for such a link 605, the retail employee 602 has access to, and uses, a software application (or "app") 610 that executes the automated functionality described herein for the retail employee 602, and the customer 603 has access to, and uses, an app 615 that executes the automated functionality described herein for the customer 603. The communication link 605 itself can be provided in different ways at different times and/or when the customer 603 is in different locations, as discussed in greater detail below.

The retailer or store app 610 preferably is implemented on each of one or more device(s) 72 (e.g., tablet computers, smart phones, laptops or other computers) within the retailer's store(s), showroom(s) or other physical location(s). Typically, one or more store employees 602 have access to such device(s) 72 for use in their interactions with various customers 603. Each such store app 610 preferably is configured to communicate (e.g., over a local area network, a wide area network and/or the Internet) with a central server 612, which updates the store apps 610 and provides access to shared customer and/or other retail information, e.g., as described in greater detail below. In addition, or instead, in certain embodiments store app 610 is implemented on the store employee 602's dedicated smartphone or other device, e.g., so that the store employee 602 can have access to store app 610 (and, thus, the ability to communicate with her various customers) when she is not physically within the store 601.

For larger retailers, or individual retailers affiliated with a network of other (e.g., independent) retailers, the use of a central server 612 often can provide for the efficient sharing of resources across different individual physical locations. However, as also discussed in greater detail below, the extent of such sharing typically depends upon how closely affiliated with each other the individual physical locations are. For example, when the different physical locations are owned or franchised by the same retailer, all product and customer information preferably is shared across all such stores, potentially subject to restrictions to safeguard the customers' privacy. However, for stores that are independent from each other, preferably only the product information is shared except to the extent that there is a commission-sharing agreement among some of such independent stores.

Often, a single retailer with many different stores (owned and/or franchised) will obtain significant benefits from a system 600 because the goodwill generated from using system 600 can then accrue entirely to a single entity. However, it is noted that a variety of different arrangements can be accommodated, in terms of sharing resources, using a system 600 according to the present invention. For instance: (a) just a subset of the franchisees for a given retailer (e.g., those in one geographic area); and/or (b) franchisees from different (e.g., competing) retailers may agree to share resources using system 600, to the extent mutually acceptable. Although the present discussion mainly refers to a "retailer", it should be understood that, whenever used herein, the term "retailer" can be replaced with a reference to any conceivable network of cooperating stores or other businesses or types of entities.

In certain embodiments, the store app 610 communicates directly with central server 612. In others, it communicates with central server 612 through an optional in-store server 613, which (if provided) preferably handles much or all of the store-specific processing described below, thereby easing some of the processing and communications burdens on central server 612.

The customer app 615 typically is implemented on the customer 603's smart phone 20 (which generally is assumed in the present disclosure), but might instead be implemented on any other device used by the customer 603 (so references to smart phone 20 herein may be replaced by references to any other, preferably mobile, device). Preferably, the customer 603 owns the device 20 that is used, so that communications can occur, if desired, even after the customer 603 leaves the store 601. The communication link 605 between the customer 603's device 20 and the store employee 602's device 72 preferably uses the Internet, once again, so that communications can continue after the customer 603 leaves the store 601. However, it should be noted that link 605 can also, or instead, use Wi-Fi, Li-Fi, Bluetooth, NFC, or any other wireless communication and/or networking technique or protocol. In some cases different communications protocols and/or networks are used when the customer 603 is in different locations.

As a result of the communication link 605, while the customer 603 is in the retailer's store 601, he or she is able to communicate with the store employee 602, not just face-to-face, but also by receiving content and other information from, or under the control of, the store employee 602's device 72, e.g., as discussed herein. In addition, in the course of their communications, one or more additional remote consultants 607 (often, but not limited to, representatives of manufacturers or suppliers of products that the customer 603 is considering purchasing), communicating through corresponding servers 617, can be brought into the conversation, in order to provide additional expertise.

Still further, because of the unique configuration of system 600, it frequently is possible for the customer 603 to review previously transferred information (e.g., received through the customer app 615 while the customer 603 was in the store 601) after the fact (e.g., while the customer 603 is at home and still considering a potential purchase). Similarly, in the preferred embodiments, the customer 603 also has the ability to reconnect with the store employee 602 and/or any of the consultants 607 (e.g., manufacturer, supplier or distributor representatives) with whom he or she previously communicated, after the customer 603 leaves the store 601. In short, system 600 often can enhance and extend a customer 603's overall shopping and/or purchasing experience by permitting access to additional information and consultants, both in-store and otherwise.

Figure 24:
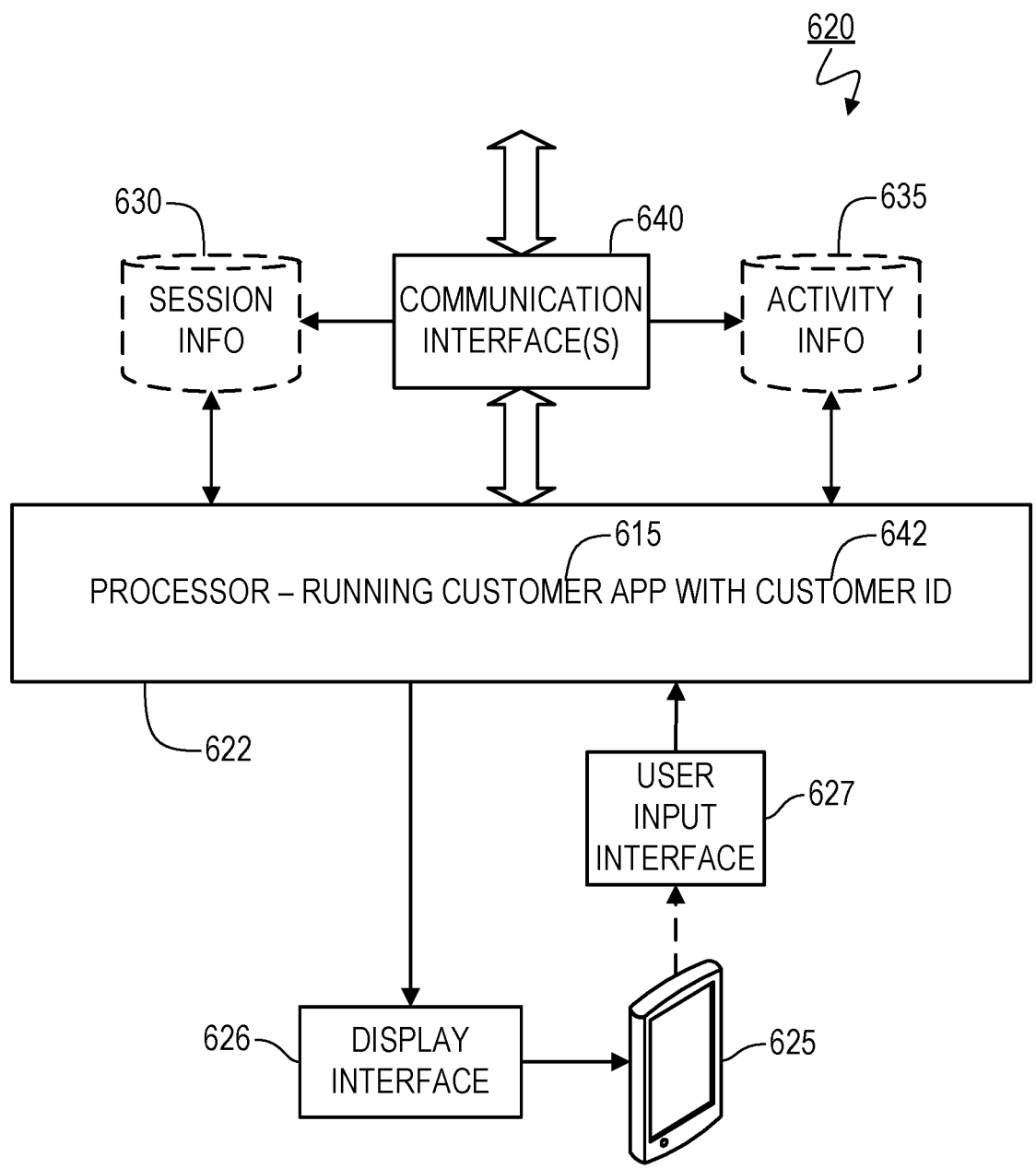
FIG. 24 is a block diagram showing a customer's device, as configured by a customer app according to a representative embodiment of the present invention.

FIG. 24 shows customer device 20 as configured by the customer app 615, resulting in configured customer device 620. A processor 622 executes the software (or process steps) of the customer app 615. The main output of the customer app 615 preferably is through a display screen 625, which is driven by display interface 626 (e.g., to provide a graphical user interface, or GUI, for providing information to the user and, typically, for allowing the user to interact with such GUI in order to provide user input). However, the device 620's output also (or instead) can include audio, tactile or any other kind of output. In the current embodiment, the main form of user input 627 also is through display screen 625 which, in the current embodiment, is a touchscreen. However, the user input interface 627 also (or instead) can include a physical keyboard, touchpad, trackball, microphone (for inputting voice commands or other information via speech), camera (for detecting user gestures and/or expressions), wearable sensor, and/or any other kind of input device, whether physically connected to the customer device 620 or connected via a wireless link (such as Bluetooth, NFC, Wi-Fi or Li-Fi).

Processor 622 preferably also creates, accesses and/or at least partially maintains a database 630 of session information and a database 635 of information pertaining to the user 603's activity, as discussed in greater detail below. Although shown as separate databases, databases 630 and 635 may in fact be linked to each other or even combined into a single database, as will readily be understood by those of ordinary skill in the art, particularly in view of the following discussion. Also, depending upon the specific embodiment: databases 630 and 635 are stored locally within device 620; databases 630 and 635 are only maintained within server 612 and accessed and/or updated on an as-needed basis by device 620; or a hybrid approach is adopted, e.g., in which the local and server databases are synched with each other, or in which temporary local copies of relevant information are created within device 620 by copying such information from the main databases 630 and 635 which are located within server 612. In other words, such databases 630 and 635 can be entirely remote from configured customer device 620, entirely local within device 620 itself, or any hybrid approach (e.g., synched with corresponding databases in server 612, or with information for a particular session downloaded into the device 620 while that session is active, modified during such session, and then the updated information uploaded to central server 612 and purged from the local device 620 after the session has ended).

Processor 622 uses communication interface(s) 640 for communicating with other (external) devices, e.g., in any of the ways described herein. Typically, communication interface(s) 640 mainly will include wireless interfaces for communicating through any of a variety of different wireless networks and/or protocols. However, in some cases, interface(s) 640 also will include one or more interfaces for communicating through hardwired networks and/or systems (e.g., ethernet or a landline phone system).

In the preferred embodiments, session information database 630 includes one or more records, each corresponding to a session that has been conducted between the customer 603 and an employee of the retailer (potentially different employees for different sessions). More preferably, each such session record includes: (a) a unique session identifier (ID); (b) an identification code for the store employee 602 who participated in the session (referred to herein as the employee ID 677); and (c) a code or other information identifying the particular product, type of product or need of the customer 603 (each of the foregoing referred to herein as the session "topic" and the corresponding code being referred to herein as the topic ID) that is the subject of the session.

While the first two items often are specified upon creation of the record, the topic might be added into the session record later, e.g., after the store employee 602 begins to understand the interests and/or needs of the customer 603. In the preferred embodiments, a session can be opened (and its corresponding record created) without a topic ID, but cannot be thereafter closed until a topic ID has been specified and included within its record. For purposes of assigning a topic ID, any of the product or category names used in the hierarchical arrangement of product information in database 673 (discussed below) preferably can be used. Also, once a session has been created, other information may be added into the corresponding record over time, as also discussed in greater detail below.

Activity information database 635 preferably includes information regarding the customer 603's online activity. More preferably, such information is limited to online activity that is not related to an existing session (i.e., one for which a record is present in database 630). The activity information database 635 is described in more detail below in connection with the description of the Session-Independent Online Activity Monitoring process.

Upon initial installation of the customer app 615, a registration process preferably is automatically initiated (e.g., similar or identical to conventional registration processes), in which the customer 603 is assigned a unique customer ID 642. Alternatively, if the customer 603 previously has installed the app 615 (e.g., on a different device), the customer 603 can sign into the existing account, in which case, in the preferred embodiments: the unique customer ID 642 previously assigned also is associated with any activities and/or communications performed through the app 615 on the present device 620, and the databases 630 and 635 used by the app 615 are shared (e.g., by synching or by accessing the same online databases) across all devices using the same unique customer ID 642. It also should be understood that the foregoing registration process, while preferred because it allows use of a single unique customer ID 642 across multiple devices, can be omitted in alternate embodiments of the invention. Instead, in such embodiments, installation of the customer app 615 preferably results in automatic (e.g., random or pseudorandom) assignment of a unique customer ID 642, so that activities, interactions and the like can be tracked with respect to the customer 603 at least across that one particular device 620.

Figure 25:
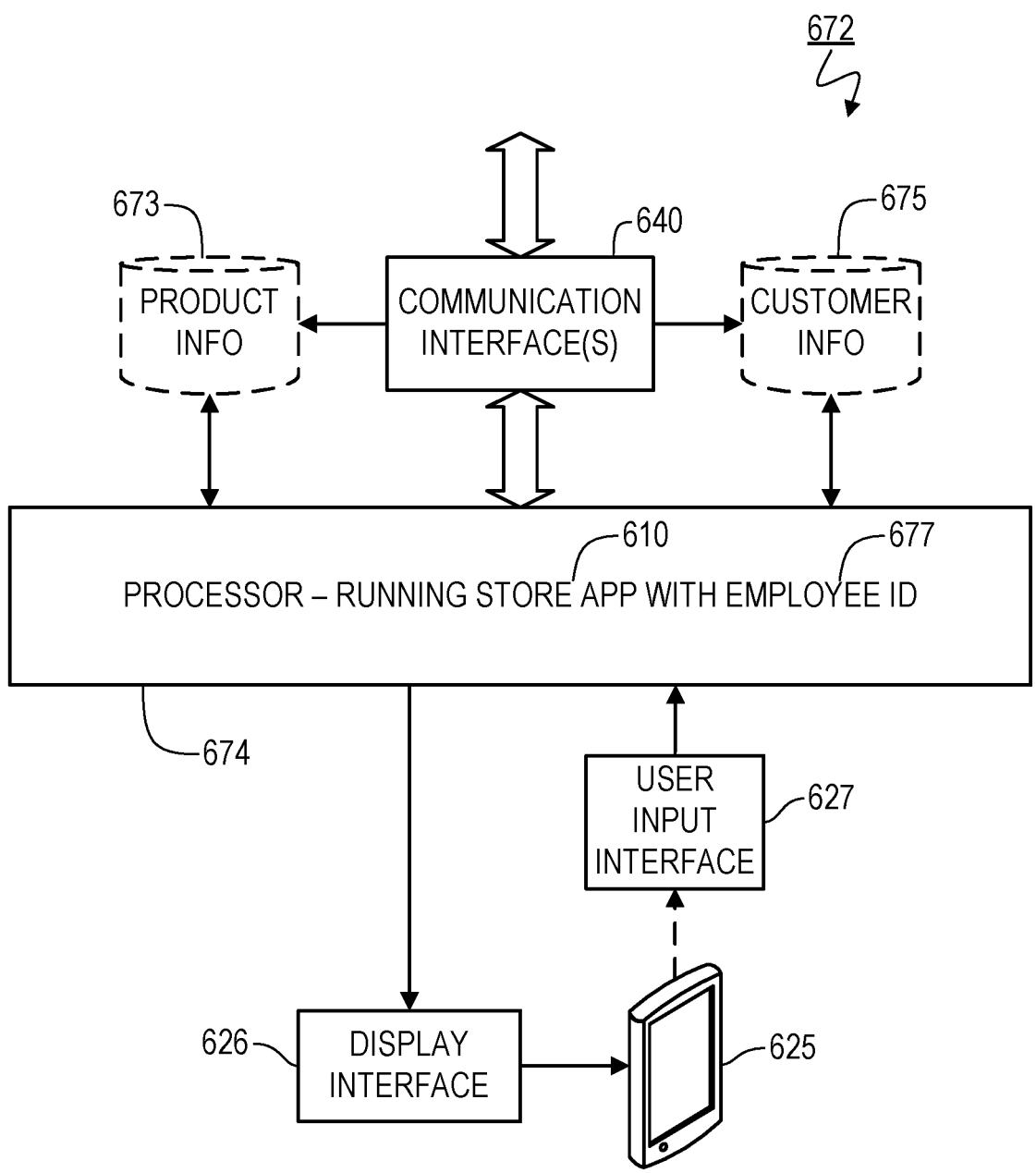
FIG. 25 is a block diagram showing a retailer's device, as configured by a store app according to a representative embodiment of the present invention.

When a store's device 72 is configured with the store app 610, resulting in what is referred to herein as configured store device 672, a somewhat similar configuration results, as shown in FIG. 25. However, the databases used by configured store device 672 are different than those used by configured customer device 620, and the processes performed by configured store processor 674 are different than those performed by configured customer processor 622. As to the former, configured store device 672 contributes to, at least partially maintains, and accesses a product information database 673 and a database 675 of customer information. Distinctions between the store processes and the customer processes are discussed below.

As indicated, each of the configured customer device 620 and the configured store device 672 includes one or more communication interfaces 640. All communications described is occurring between such devices, or between the corresponding apps 615 and 610, and all other external communications involving any one of the foregoing devices or apps preferably occurs via the corresponding communication interface(s) 640.

Unlike the customer app 615, the store app 610 typically will be configured to operate within a larger network of similar or identical cooperating apps 610. This structure can allow a customer 603 to have a more consistent experience when dealing with different employees of a retailer, even different employees located at different ones of the retailer's stores. To permit such cooperation, in the preferred embodiments, databases 673 and 675 primarily are only maintained within server 612, e.g., with the corresponding information accessed on an as-needed basis by any given device 672. However, in other embodiments, any other structure for implementing such databases 673 and 675 instead may be used (such as any of the structures discussed above in relation to databases 630 and 635).

The product information database 673 preferably includes a hierarchical arrangement of product information records, with each such record including information about a particular product, and with all such records arranged by category, subcategory, etc. All such information preferably is indexed for easy access and cross-referencing. In addition, each product record preferably includes one or more indications (which may be implemented as a reference to an inventory database) as to: (a) whether the subject product is in stock at each given store, (b) whether the product is carried by the retailer at all, and in some embodiments (c) if not, where it can be obtained.

Customer information database 675 preferably includes the session records for all of its customers (e.g., the session information records from the databases 630 of all of its customers), but with each such session record also supplemented with the customer ID 642 for the customer 603 to which it pertains. In addition, the store employee 602 preferably can add additional information (e.g., notes or other types of content) to any given session record during the course of the corresponding session (or afterward), e.g., regarding the customer 603's needs and/or preferences with respect to the subject topic, e.g., as discussed in greater detail below. In addition, customer information database 675 preferably includes a general record for each customer 603, including information regarding the customer 603 that is not tied to any particular session or topic, such as the customer's occupation, general interests, family information, education, demographics, etc. See e.g., the description of the Customer Information Annotation process below.

Although, as noted above, a configured store device 672 can be dedicated to an individual employee 602 for use outside of the store 601, most of the store devices 672 typically will be shared among different employees. Accordingly, when a particular employee 602 begins her shift, she preferably logs into her own account, with her unique employee ID 677, on the device 672, so that all activity on such device 672, from that point forward, will be associated with her employee ID 677. At the end of her shift, the store employee 602 preferably logs off, so that the device 672 is ready for the next employee to login.

Each of the store app 610 and the customer app 615 preferably is comprised of a number of largely independent event-triggered processes. Examples of such processes are discussed below. For each, following the name of the process, a letter in parentheses indicates whether the process exists on, and therefore can be executed by, the customer device 620 (C), the employee's device 672 (E) or both (B). For any process that can be executed by either device 620 or 672, there typically are differences in the processing performed, depending upon whether it is executed on the customer device 620 or the employee's device 672, e.g., as described in greater detail below. Also, it is noted that certain processes are described in subparagraphs, beneath other processes with which they often will be associated, or otherwise are described in connection with other processes. However, neither that structure nor anything else is intended to be limiting. Instead, any or all of the following processes generally can be used independently or in combination with any other of such processes.

(a) In-Store Registration (C): In the preferred embodiments, this process is instantiated when the customer app 615 is, and then periodically thereafter. When active, it attempts, through one of its communication interfaces 640, to find a wireless system (e.g., Li-Fi, Wi-Fi or other wireless network), corresponding to the retailer that provided the app 615, with which to communicate. Upon finding such a wireless system, the app registers with the store's server (e.g., central server 612 or local in-store server 613). As a result, the presence of the customer 603 within the store 601 is established. In addition, in certain embodiments an even-more-precise location of the customer 603 within the store 601 also is established (e.g., using one of the Li-Fi techniques described herein, using a similar Wi-Fi technique or using an indoor GPS technique). In response to the detection of the customer 603, the subject server 612 or 613 preferably supplements a list of all currently registered customers within the store 601 with the customer ID 642 for the newly registered customer 603. Depending upon the particular embodiment, such information can be immediately provided to all of the devices 672 within the store 601, so that each such device 672 maintains the list, and/or can simply be made available to such devices 672, e.g., with only the server 612 or 613 maintaining the list. In addition, in certain embodiments in which more-precise locations for the registered customers within the store 601 are determined, such locations preferably also are included within and updated over time into the list, e.g., so that a map of the locations of all registered customers currently in the store 601 can be generated when desired.

(b) Customer Information Review and Retrieval (E): In this process, the configured store device 672 displays, among other things, the currently registered customer information obtained by the server 612 or 613 through the various customers' In-Store Registration processes. If the specific locations of such customers have been obtained, then icons or other indicators for such customers preferably are indicated on a store map shown on the display 625 of the store device 672, so that the store employee 602 can simply select the desired indicator to bring up the subject customer 603's information. Alternatively, a list showing such customers' names preferably is presented and, upon engaging in a conversation with a customer 603, the store employee 602 learns the name of such customer 603 and selects that name from within list in order to bring up such customer 603's information. In either case, such information displayed than the employee device 672 preferably is retrieved from customer information database 675 and includes the general information pertaining to the customer 603 and any sessions (preferably identified by topic) in which the customer 603 previously participated.

(c) In-Store Session Initiation (B): This process typically is initiated after a customer 603 has registered within a store 601, using the In-Store Registration process, and has begun a conversation with a store employee 602. The request to initiate a session preferably can be made by either the customer 603 or the store employee 602, and then, e.g., upon acceptance of the request by the other (through their respective user input interfaces 627), the session is initiated. At this point, customer app 615 preferably creates a new record for the session in its session information database 630, including within it: a session ID (e.g., assigned by the store app 610, the central server 612 or some other store-affiliated app or entity) and the employee ID 677 (e.g., both transmitted from the store's device 672 to the customer's device 620 via their communication interfaces 640). Similarly, initiation of the new session preferably causes the store app 610 to create a new record within its customer information database 675, including within it the customer ID 642 (e.g., transmitted from the customer's device 620 to the store's device 672 via their communication interfaces 640) and the generated session ID. In the preferred embodiments, the initiation of a session according to the present process is performed by, or at least under the control of, the store employee 602. In any event, prior to starting a new session, a list of the existing sessions preferably is displayed in order to allow the individual to assess whether an existing session should be resumed, rather than starting an entirely new one. If the employee 60 or customer 603, as applicable, designates a listed the existing session, then the In-Store Session Resumption process is instantiated. Otherwise, the employee 60 or customer 603 confirmed that a new session is in fact to be started, and the corresponding new record created within each of database 630 and 675. Once open, the session preferably then remains open (e.g., with a persistent communication link between the two devices 620 and 672, e.g., permitting additional information to be populated into each's session record) until the session is closed by either the store employee 602 or the customer 603 (e.g., by clicking on a "Close Session" button on the subject user's input interface 627).

i. Store Employee Data Retrieval (E): In the course of talking to the customer 603, the store employee 602 might decide to retrieve additional information related to the topic that they are discussing. For this purpose, product information database 673 preferably is both field and natural-language searchable, the former, e.g., permitting the store employee 602 to search by specific product, product type, product characteristics (e.g., manufacturer and/or features) and/or related or similar products. In addition, database 673 preferably is arranged hierarchically, e.g., allowing the store employee 602 to drill down on any desired information, broaden out to review related-product records, or review records of other products in the same category as the one currently being discussed. The results from such searching and/or browsing may be used to aid the store employee 602 in her conversation with the customer 603 or may be provided to the customer 603 for subsequent consideration (as discussed below).

ii. Store-To-Customer Data Transfer (E): Upon retrieval of information using the Store Employee Data Retrieval process, discussed above, user interface 627 on device 672 preferably permits the store employee 602 to designate any information record, in whole or in part to be transmitted to the customer 603's device 620. More preferably, the store employee 602 simply clicks a "Send" button on her user interface 627 in order to transmit the entire page or record she currently is viewing. Alternatively, the store employee 602 first selects just a desired portion of a page or record and then clicks a "Send", resulting in the transmission of that portion along with the page's header, footer and/or other identifying information, in order to provide context for the selection that is being sent. In the preferred embodiments, an indication is stored into the session record within customer information database 675 that the subject information was sent to the customer 603, thereby helping the store employee 602 to maintain a more-complete record of the session.

iii. Customer Data Receipt (C): Upon receipt of information transmitted via the Store-To-Customer Data Transfer process, the customer's device 620 preferably immediately displays such information and, either automatically or upon designation by the customer 603, also saves it into the current session record in the device 620's session information database 630 (e.g., for the customer 603 to review later). As to the current display of such information, the customer's user interface 627 preferably includes display elements that may be selected: to clear such information display for the time being, or to at least temporarily navigate away from such displayed information (e.g., allowing the customer 603 to return to other information he had been reviewing or to navigate to a homepage or main menu).

iv. Conference Call (B): In some cases (such as where the product information 673 is insufficient in some particular respect), it might be desirable for the store employee 602 and the customer 603 to bring one or more additional people into their conversation (e.g., someone with additional expertise). Accordingly, both of devices 620 and 672 preferably include the present process for initiating and/or conducting a conference call with an outside expert or other individual 607. In the preferred embodiments, at least when an active communication link already exists between the customer's device 620 and the store employee's device 672, the store app 610 controls how and when such conference calls are established. In this regard, along with static product information, product information database 673 preferably also includes associated links to the consultant servers 617, so that an appropriate consultant 607 can be contacted when additional information is desired. For example, information regarding a particular product preferably is supplemented with the link to a helpline for the manufacturer or supplier of that product. General product category information preferably is supplemented with a link to a centralized helpline (e.g., associated with the corporate offices of a large retailer or associated with a third-party consulting or advisory service), having access to consultants with specialized knowledge regarding that product category. In any event, when the corresponding server 617 is reached, that server 617 preferably selects and completes the communication link with the appropriate individual 607. Thereafter, all of the parties can communicate with each other via their individual devices, using audio only or both audio and video, depending upon the embodiment and/or the selections made when establishing the call, similar to a Skype™ or FaceTime™ call. In this particular (i.e., in-store) scenario, the Conference Call process on device 620 preferably mainly enables the customer 603 to participate in the call, with the store employee 602 preferably assuming primary responsibility for initiating the call. In the course of such call, the participating consultant 607 preferably has access to an app for sending information to the customer's device 620, similar to the Store-To-Customer Data Transfer process discussed above. Upon receipt, the customer's device 620 preferably executes the Customer Data Receipt (or similar) process, discussed above. In certain embodiments, a recording (audio and/or video) of the call is stored into the session record in the session information database 630 and/or the customer information database 675, allowing it to be played back later, if desired.

v. Customer Information Annotation (E): During the course of a session, or even afterward, the store employee 602 can instantiate this process through her user input interface 627 to insert information related to that particular session (e.g., notes regarding the customer's preferences and/or needs in relation to the session's topic) into the session record, or to insert information related to the customer 603 generally (e.g., notes pertaining to the customer 603 himself) into the customer record, both in the customer information database 675. In the preferred embodiments, upon instantiation, a document is opened for this purpose. Such a document can include, e.g., space for free-form notes to be entered and/or pre-specified fields, checkboxes or selecting among presented options, sliders for providing ratings within a specified scale, and/or other user-input elements for inputting information in structured or unstructured ways.

vi. Request for In-Store Assistance (C): This process is activated in response to the customer 603 selecting a corresponding user interface element (e.g., button). It immediately sends a message to server 612 or 613 requesting assistance from an employee. If activated while a session is open, it preferably identifies the session ID and/or the store employee 602 who previously provided the customer 603 with assistance. In either event, it preferably also includes the location of the customer 603 and/or the customer ID 642 (which, e.g., can be used to determine the location of the customer 603 and/or his interests, thus helping the retailer identify the best employee to assist the customer 603).

(d) In-Store Session Resumption (B): Similar to the In-Store Session Initiation process, this process preferably can be initiated by either the store employee 602 or the customer 603, but more preferably, is initiated by the In-Store Session Initiation process, or at least under the control of, the store employee 602. Upon instantiation, unless already displayed by, the display interface 626 preferably provides a list of sessions in which the customer 603 previously has participated. Upon selecting one, a "Resume Session" display interface element preferably also is displayed by display interface 626, and then upon selecting the "Resume Session" display interface element (e.g., by the store employee after a preliminary discussion with the customer 603 and learning that the customer 603 wants to discuss the topic of such previous session), that session is reinitiated.

(e) Subsequent Information Review (C): This process permits the customer 603 to review information pertaining to a session after the session has ended (e.g., after the customer 603 leaves the store). Upon instantiation, the processor 622 of device 620 first retrieves information from database 630 regarding the previous sessions and then, through display interface 626, causes the display 625 to display a list of such sessions (e.g., identified by their respective topics). Preferably, each such entry functions as a link, allowing the user 603 to select any one of them. Upon doing so, all the information from that session is available for review. The following process, Subsequent Session Resumption, concerns one technique for resuming a previous session. Alternatively, for any of the purposes discussed herein, a session might be considered resumed (e.g., active again) for the time period that the customer 603 has opened the information for that session using the present process.

(f) Subsequent Session Resumption (C): Preferably included within the information that is available through the Subsequent Information Review process for each session are links to the store employee 602 and any consultant(s) 607 with which the customer 603 previously communicated in connection with such session. More specifically, in the preferred embodiments, the link to the store employee 602 links to central server 612 or to store-specific server 613 and includes an embedded identifier of the particular store employee 602 (e.g., the employee ID 677) and/or the session (e.g., the assigned session ID). Accordingly, if the specific employee 602 is not currently available, the subject server can use such information to identify another employee who is available and is likely to be helpful (e.g., someone with the same product expertise). Still further, in certain embodiments, in connection with such a link, the displayed user interface includes an element that the customer 603 can select to request a different store employee than the employee 602 who previously assisted him, even if that employee 602 currently is available. Such an option can allow the customer 603 to avoid an employee 602 with whom he previously had an unpleasant experience. In addition, data on the number of customers who choose that option with respect to a given employee 602 can then be used in evaluating the performance of such employee 602. Similarly, any link to a specific consultant 607 preferably links to the corresponding consultant server 617 and includes an embedded identifier of the particular consultant 607 and/or the session (e.g., the assigned session ID), so that if the specific consultant 607 is not currently available, the server 617 can use such information to identify another consultant 607 who is available and is likely to be helpful (e.g., someone with the same product expertise). As with the employee link, and for the same reasons, an option preferably also is provided allowing the customer 603 to request a different individual. Once a particular individual is identified, the customer app 615 and the corresponding server coordinate to establish a real-time communication link. Thereafter, the session is resumed and all the considerations discussed above in connection with an active session apply again. For example, the communications and/or any content that is transferred to the customer app 615 preferably are stored in the session information database 630 within the corresponding session record, e.g., using any of the other automated processes discussed herein.

i. Session-Related Online Activity Monitoring (C): In the current embodiment, the customer app 615 includes the present process for monitoring online activity 618 of the customer 603. In certain embodiments, this process is embedded into a separate Web browser that is included within the app 615 (e.g., an entirely unique browser or a branded and/or customized version of an existing browser). Alternatively, or in addition, the present process exists separately and is used to monitor online activity that occurs through the use of one or more separate (e.g., conventional) Web browsers. For privacy purposes, the customer 603 preferably has the ability to control such monitoring through user input interface 627, at least with respect to monitoring activity 618 when using external browser(s) (e.g., where the customer 603 might not be aware that information from his browsing might be saved in connection with a session). However, such monitoring can be particularly useful while a session is active and, therefore, preferably is, by default, turned on at such times. On the assumption that any Web browsing during such times is related to the active session, a record of such browsing preferably is made and stored into the session record within the session information database 630. For example, customer app 615 might be configured (e.g., by the customer 603 and/or by the retailer providing the app 615) to keep a record of all the sites visited and/or the app 615 might be structured to allow the customer 603, through user input interface 627, to designate or select portions of the information he is viewing to be saved (in which case, the selected content preferably is saved along with a link to the Webpage containing it and, even more preferably, to the specific location within that Webpage, although in alternate embodiments just the content or just the link is saved). In the preferred embodiments, all information pertaining to the customer's online activity 618 that has been saved is date-stamped, time-stamped, indexed for subsequent searching, stored in the corresponding session record within database 630, and also provided to the Activity-Driven Messaging process, discussed below, for immediate analysis. After the fact, the customer 603 and/or the store employee 602 (e.g., during a subsequent follow-up call) preferably can review and/or use automated tools to analyze such information.

ii. Activity-Driven Messaging (B): This process uses the information gathered during either or both of the Session-Related Online Activity Monitoring and Session-Independent Online Activity Monitoring processes described herein (collectively referred to herein as the Online Activity Monitoring processes) on an automated basis. Preferably, the present process includes a number of different predefined "triggers" and corresponding automated predefined "actions" based on those triggers. In certain embodiments, the main structure of the present process is hard-coded, and the retailer is able to specify the triggers and actions using a provided scripting language. As a result, the retailer is able to fine tune the process, e.g., to maximize its marketing value. In such embodiments, the hard-coded portion preferably analyzes the data generated by such Online Activity Monitoring process(es), identifying topics that the customer 603 appears to be studying and/or considering and assigning an "interest" score to each. For example, this portion of the process might assign a score to any such item about which the customer has conducted more than one search (or any other specified number of searches) viewed more than one webpage (or any other specified number of pages) and/or any combination of the foregoing criteria. The "interest" score preferably is then calculated based on a formulaic combination (e.g., a simple weighted average, with weights determined experimentally to provide the best results, from the point of view of the retailer) of: searches conducted, pages viewed, time spent viewing such pages, related links clicked within such pages and/or any other metrics that potentially could be relevant to the customer 603's potential interest in the product or product category. Also, rather than first applying a threshold test, in some embodiments an "interest" score is determined for all topics identified. In certain embodiments, multiple interest scores are calculated for each topic, with each measuring "interest" in a different way. Then, actions are taken based on the topics identified and/or the interest score(s) calculated for them (e.g., as specified by the rules established by the retailer using the provided scripting language). For example, based on a calculated interest score for the corresponding topic exceeding a specified threshold (or a set of interest scores exceeding corresponding thresholds), the process might: display an ad offering a deal to the customer 603; retrieve and display other content related to the topic; display a message suggesting that the customer 603 contact the store employee 602 to discuss the item; and/or send an automated message to the employee 602 and/or to the retailer suggesting that they attempt to contact the customer 603 to discuss the topic. These types of automated actions often can help ensure that the retailer remains involved at important points in the customer 603's purchasing decision-making More generally, the foregoing structure often can turn the current trend, in which customers look at products in a brick-and-mortar store and then purchase them online for a lower price, on its head, e.g., by driving customers 603 from online activity back to brick-and-mortar retailers. In other words, customer app 615 can allow the retailer, e.g., to match other online deals, offer alternatives, offer in-store demos, offer complementary products and/or services (all the foregoing either on an automated and/or manual basis), track what the customer 603 purchases from other sellers (thereafter, e.g., populating such information into the customer information database 675), etc. The specific rules, interest score formulas and other aspects of this process preferably are adjusted to achieve the desired goals of the retailer. As noted, in addition to (or instead of) providing automated notifications to the customer 603, in some cases the response action is an automated message to the store employee 602, or any other individual associated with the retailer, suggesting that such individual contact the customer 603 (e.g., via a text-based message and/or by initiating an audio or video call). Alternatively, or in addition, the customer 603's raw browsing data are sent to the retailer and then stored in the customer information database 675 and/or used by the retailer's version of the present app in a similar manner to that described above, but in this case the automated actions typically would be to assist the store employee 602 and/or the retailer more generally.

iii. Referral Identification (C): This process typically is intended to be executed in connection with either or both of the Online Activity Monitoring processes described herein, but especially the Session-Related Online Activity Monitoring process. The purpose of this process is to address a particular free-rider problem that otherwise can occur. Specifically, in the absence of this process, the customer 603 might consult with the store employee 602, eventually identifying a product that fully meets his needs, but then, rather than purchasing the product from or through the retailer, shops and then eventually purchases online in order to get the best possible price. However, in such situations, no compensation is paid for all the work performed by the store employee 602, even though such effort most likely was at least a significant, if not the main, factor in the customer 603's purchasing decision. To address this problem, in the appropriate circumstances, the present process provides, to a third-party entity that sells to the customer 603, a retailer identification code (or retailer ID) identifying the retailer who provided (or at least is associated with) the customer app 615. More specifically, in the preferred embodiments the customer app 615 (e.g., the present process or one of the Online Activity Monitoring processes) monitors to determine when the customer 603 is about to make an online purchase from a site that includes an interface element for accepting such a retailer ID. In the event of such a trigger, the present app automatically provides its retailer ID to the site (e.g., through one of its communication interfaces 640 or any other of its network interface and in accordance with preestablished protocols). Upon receipt of such retailer ID, the selling entity, typically through pre-arranged terms, can provide a commission to the retailer for which the store employee 602 works. Preferably, the present app also creates and preserves a record of the transaction and/or a record if a particular site with which it has a pre-arranged commission agreement does not in fact present an appropriate interface for accepting the retailer ID, all with the goal of providing an accounting from the retailer's side and thereby ensuring that appropriate payments ultimately are made. In one embodiment, the retailer ID is provided whenever the customer 603 makes a purchase while a session is active or with respect to a topic for which a session exists. In another embodiment, the retailer ID is only provided when the customer 603 purchases an item that had been recommended by that retailer or about which the retailer has engaged in more than a predetermined amount of communication with the customer 603 (e.g., each as indicated in the session information database 630). In a still further embodiment, a two-tier approach is employed, in which the retailer ID is provided for all purchases, but an additional code is provided when the customer 603 purchases an item that had been specifically recommended by the retailer or about which the retailer has engaged in more than a predetermined amount of communication with the customer 603 (e.g., so that a higher commission can be paid in such cases). In still further embodiments, the present process, or the third-party online seller's site upon been provided with the retailer ID, provides a user interface asking the customer 603 to provide an indication of how important the retailer was in the purchase, with an additional code then provided to such third-party online seller based on the response of the customer 603, and with the amount of the commission then depending upon the customer 603's response.

(g) Outside Session Initiation (C): In the preceding discussion, it generally is assumed that a session is initiated in-store and then can be resumed later on, when convenient for the customer 603. However, in some cases it will be desirable for a customer 603 to initiate a session with respect to a new item of interest outside of the store, possibly even with no intent of ever entering any physical location of the retailer that provided the customer app 615 in connection with the potential purchasing decision. Instead, for many purposes, the customer app 615 can be thought of as providing a centralized resource for purchasing decisions, which can be used in-store and/or anywhere else. When the customer 603 designates a user interface element for initiating a new session outside of the retailer's physical location, the present app is instantiated which, in the preferred embodiments, initiates the following sequence: customer app 615 directly messages central server 612 with an indication of the item that the customer 603 is considering and, in response, server 612 provides a unique session ID and a link for contacting an in-store employee 602 and/or a consultant 607 (e.g., after identifying such individual(s) using any of the expertise-based selection techniques described herein, in reference to the identified item). Once the session is initiated, the customer 603, the store employee 602 and/or the retailer generally can execute any of the processes described herein with respect to an open or existing session.

(h) Session-Independent Online Activity Monitoring (C): In certain embodiments, this process is executed (e.g., if and to the extent specified in the user settings) in order to monitor the customer's online activity 618 whenever a session is not currently active. For example, it can be used to identify when a purchase is about to be made, to determine whether that purchase pertains to any existing session within session information database 630, and then to instantiate the Referral Identification process if it is. This process preferably is very similar or identical to the Session-Related Online Activity Monitoring process, but rather than storing the monitoring information within a session record within database 630, the present process stores such information in activity information database 635. As a result, the present process can be used to identify and score topics that the customer 603 is searching and/or browsing that might be unrelated to any existing session. At the same time, the present process preferably includes steps to determine if each topic score satisfies a specified criterion (e.g., exceeds a specified threshold), and upon reaching a determination in the affirmative, the process first determines whether the topic matches one for a session for which a record already exists in session information database 630. If so, the process preferably queries whether the customer would like to resume that session and, if the customer 603 responds affirmatively, instantiates the Subsequent Session Resumption process with respect to that session and stores the topic-specific online activity information within the record for that session, e.g., in the manner described in the Session-Related Online Activity Monitoring process. On the other hand, if the topic's score satisfies the specified criterion but the topic does not match an existing session, the present process preferably queries whether the customer would like to initiate a new session for such topic; then, if the customer 603 responds affirmatively, the process preferably instantiates the Outside Session Initiation process and stores the topic-specific online activity information within the record for that session, e.g., in the manner described in the Session-Related Online Activity Monitoring process. Otherwise, if the specified criterion is not satisfied with respect to the identified topic, the present process stores information regarding the customer 603's online browsing and/or searching, in a manner similar to that described in the Session-Related Online Activity Monitoring process, but instead of storing such information in connection with a particular session, it is added into the online activity database 635 (e.g., date and time stamped and indexed). It is noted that when examining topic scores for the purpose of querying a customer, as described above, the criterion can pertain, not only to present activity of the customer 603, but also to historical activity information previously stored within database 635 relating to such topic.

The foregoing processes sometimes send information to the customer's device 620 regarding a particular product (such as information about the product, a coupon or other information about how to obtain a specified special-pricing deal). In such cases, the information preferably includes a link for the customer 603 to purchase that product. Upon clicking on such a link, the customer 603 preferably has a choice of picking up the product in-store that day (if currently available in the store's inventory) or having it delivered to his home (or to another customer-designated location, e.g., if intended as a gift). In addition, in certain embodiments the information also includes a link that the customer 603 can select to indicate a desire to see the product in the store, e.g., if the customer 603 previously has not had an opportunity to experience the product in person. Upon clicking such link, a message preferably is automatically sent (e.g., via communication interface 640) to the retailer, which can then choose to make the product available for the customer 603 (e.g., by having it the delivered to the store) and message the customer 603 (e.g., through this app) when it is ready. As a result, the customer 603 has the opportunity to see and hold the product before deciding on whether or not to purchase it. From the retailer's side, a monetary charge may be imposed for the service, which preferably is then credited toward the purchase price if the customer 603 ultimately decides to buy the product from the retailer.

When implementing a system 600, the physical location for a retailer often can be configured differently than for conventional retail locations. For instance, rather than a traditional retail establishment, having a large open space with lots of shelves to hold, display and make accessible to the customers a significant amount of the store's inventory, a store 601 according to the present invention preferably is divided into two sections. A smaller portion of the store 601 is publicly accessible and functions as a showroom, e.g., stocking only display samples of the products in inventory. A second, much larger portion of the store 601 preferably is inaccessible to the customers and functions as a warehouse or stockroom, with products delivered to the showroom, to a separate pickup desk, directly to the customer 603's car, or scheduled for shipment to the customer's home or other designated location, only on an as-needed basis (e.g., when actually purchased or when the showroom requires an additional display sample). Such a configuration can be much more efficient at delivering products to the customer 603 (e.g., more amenable to employing robotic and/or other kinds of automated systems), while at the same time significantly reducing the area in which customers need to search for the products that interest them and allowing the showroom space to be better-configured to enhance the customer's shopping experience.

The foregoing embodiments mainly focus on the population of customer information database 675 with information provided directly to the retailer by the individual customer 603 or input by the store employee 602 through her interactions with the customer 603. In fact, the information within database 675 may be generated in whole or in part based on other actions or behavior of the customer 603 (i.e., not directly related to a conscious provision of information to the retailer or the retailer's employee 602). Examples include information generated by in-store positioning or location-identifying systems (such as any of those described herein), cameras and other sensors, e.g., collecting and storing information regarding: (a) how much time the customer 603 spends in the particular location, aisle, or section of the store 601; (b) how much time the customer 603 is detected as looking at a particular item or portion of a shelf; (c) whether and for how long the customer 603 is detected to be holding a particular item; (d) how much time the customer 603 spends interacting with particular store employees 602 (or the aggregate time spent interacting with all store employees); (e) what the customer 603 is detected to be wearing (e.g., type, shape, brand and/or color of clothing); (f) whether the customer 603 uses his phone or other device while shopping in-store; (g) and/or any other customer information mentioned herein or otherwise.

Similarly, in certain embodiments, rather than the store employee 602 specifying a session's topic, the topic is assigned automatically based on detected information (e.g., any of the foregoing information generated from any of the foregoing systems and/or sensors) regarding the customer 603. In addition, in the preferred embodiments, the customer 603 also directly provides additional information to the retailer through the user input interface 627 of device 620, e.g., by responding to questions submitted by the retailer (e.g., questions sent automatically by the retailer in response to a triggering communication, action or behavior of the customer 603).

All the foregoing information, in turn, preferably is then processed by processor 674 to provide summary information and/or characterizations regarding the customer 603, e.g., using conventional and/or future-developed techniques, for use by the store employees and/or automated algorithms Dual-Mode Communication Systems.

Figure 8:
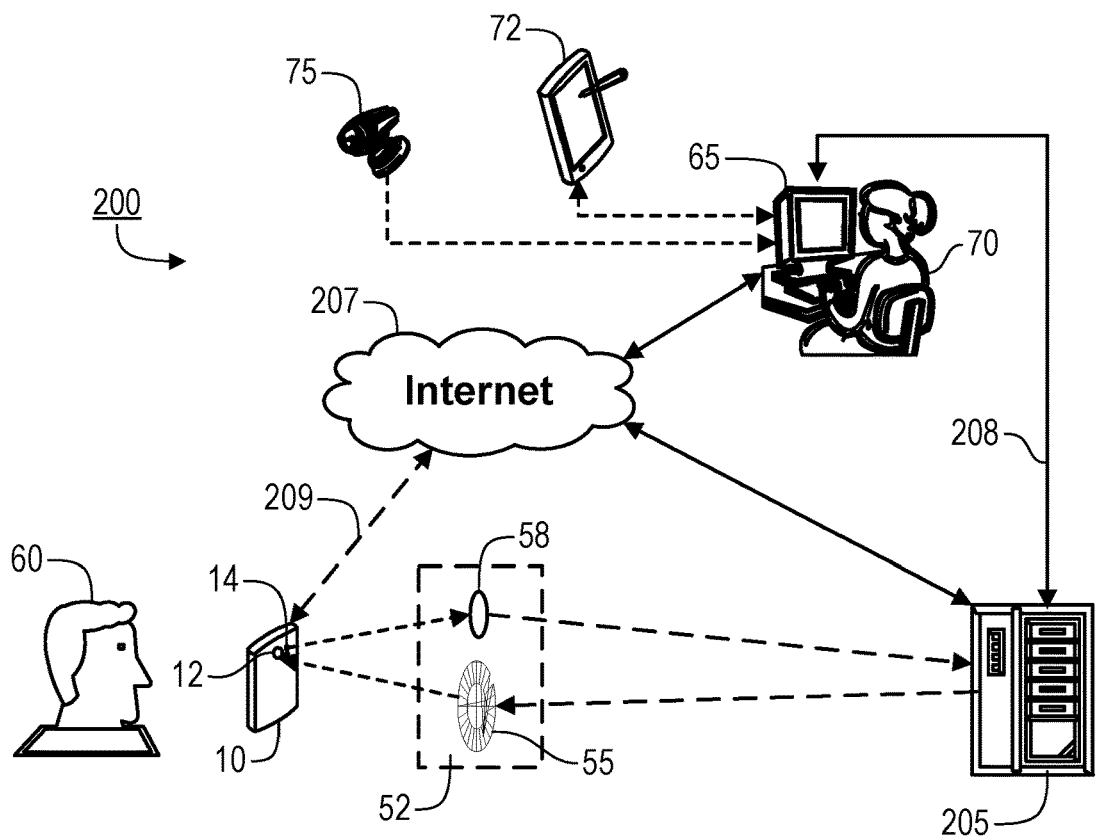
FIG. 8 is a block diagram of an alternate messaging system according to a representative embodiment of the present invention.

This section provides additional detail regarding certain embodiments of the dual-mode communication systems mentioned above (e.g., in connection with FIG. 8). As a reminder, in these systems, the user device 10 or 20 (for convenience, typically just referred to as user device 10 in this section and elsewhere herein) receives light-based messages from the messaging units 52 (e.g., having originated from a server, such as server 205, and/or having been pre-programmed with identification codes or other messages that they are to broadcast) and also communicates with a server (e.g., the same server 205 or a related server) via the Internet 207. In other words, the present embodiments contemplate systems in which local light-based communications are combined with Internet communications in certain ways to provide efficiencies and other benefits described herein.

Preferably, in the present embodiments: the user device 10's rear camera is used as the light sensor 12; and user device 10 is configured (e.g., through customer app 615) such that its display 625 (on its front surface) shows what such camera 12 sees, overlaid with information obtained (directly and/or indirectly) from, or based on, the digital light-based message(s) that the user device 10 receives. Thus, for example, the display screen of user device 10 might show a product that the camera sees, but overlaid with information about that product obtained based on one or more light-based messages that have been decoded from light emitted directly from light-based messaging unit(s) 52 and/or such light after reflecting off such product (and, in some cases, other items within its vicinity). Again, it is noted that: (a) such information could be directly embedded within such light-based message, (b) the light-based message might have included an Internet (or other network) address from which such information is retrieved; and/or (c) the user device 10 might reach out to a standard network address and use the received light-based message(s) to query for such information based on the light-based message(s) received.

In addition, or instead, in certain embodiments the user device 10 is configured such that its displayed image (as received from its camera 12) is supplemented with assisted-reality (AR) elements. In one such example, the displayed products themselves are identified and their images function as links, such that when a user touches (or otherwise designates) a product shown on the user device 10's display screen, such information (which, again, can be directly embedded within the digital light-based message received or indirectly obtained based on information included within such digital light-based message) additional information regarding that product is displayed, e.g., either: (a) on top of or otherwise in relation to the displayed product image, e.g., additional AR information; or (b) by opening a separate window (e.g., webpage) that provides static or dynamic content regarding the product.

In the preferred embodiments: (a) most of the communications discussed herein are between one of the various described devices (e.g., user device 10, associate device 72, central computer 65, etc.), on one hand, and server 205, on the other (typically, over the Internet 207); and (b) one or more central computers 65 configure and/or control the operation of server 205 with respect to the functionality described herein (again, typically over the Internet 207).

Generally speaking, in the present embodiments, in step 165 (discussed above in connection with FIG. 7) user device 10 initiates communications with the server 205 and/or with computer 65 (e.g., in response to one or more light-based messages that it receives from corresponding light-based messaging unit(s) 52, on a periodic basis, or on some other message-independent basis). In one implementation, a light-based message includes a Uniform Resource Locator (URL), other Internet or network address, telephone number, or any other type of preferably unique communications-link identifier (each referred to herein as a "communications address" or, simply, an "address"), and the user device 10 responds by initiating a connection to that address. In another implementation, the user device 10 initiates a connection to a standard address (e.g., on a periodic basis) and uses information within the received light-based messaging information (e.g., broader received data or after decoding into one or more messages) as part of a query to that standard address (which may result in a response that includes one or more such addresses, e.g., product-specific addresses). In any event, it should be noted that any product-specific address mentioned herein might link to static or one-way updated content (such as a webpage) and/or to a real-time, bi-directional and/or interactive communications link, e.g., with the server 205 or with the manufacturer of a corresponding product. Examples of the latter include any of various kinds of real-time text-based (e.g., text chat), audio (e.g., telephone or Internet-based conferencing) and/or visual links (e.g., using Apple FaceTime™, Skype™, Discord™ or other types of conferencing, calling or screen-sharing real-time communication links).

Figure 26:
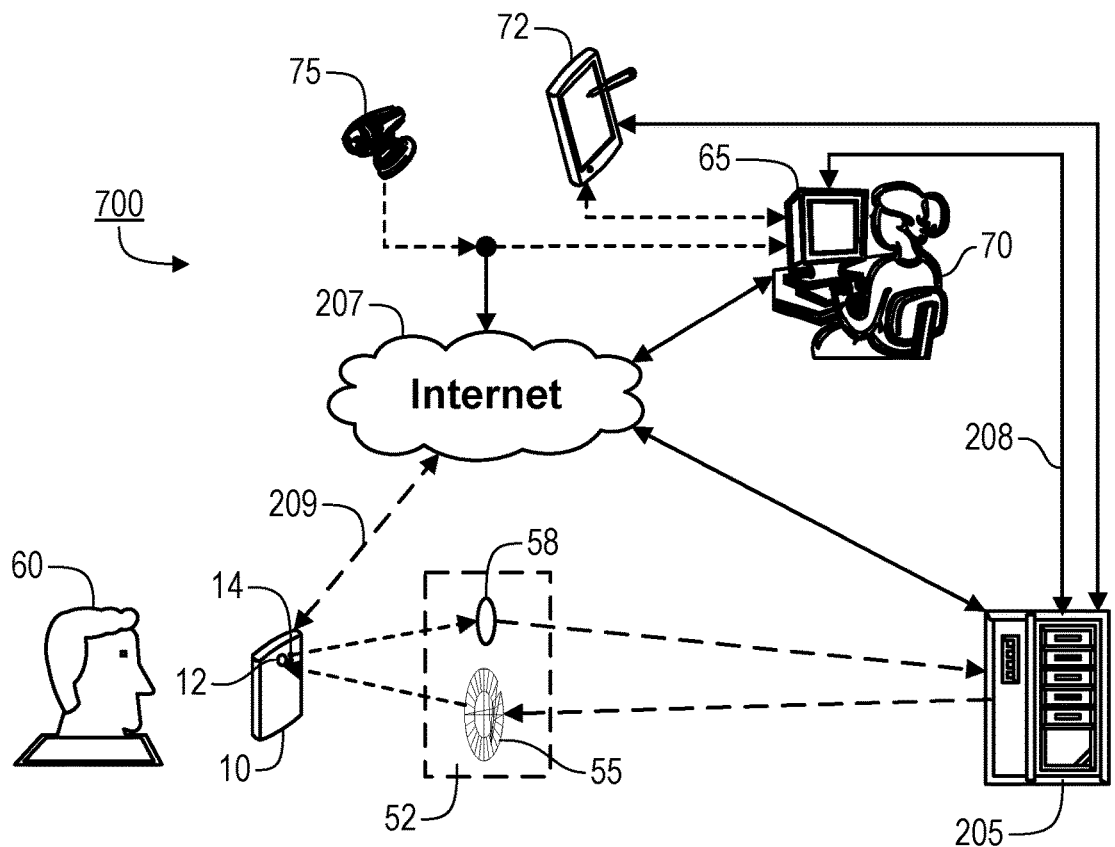
FIG. 26 is a is a block diagram of a messaging system according to another representative embodiment of the present invention.

In a system 700 according to the present embodiments, as shown in FIG. 26, nearly all of the communications preferably occur between server 205 and the various individual devices within system 700, with one or more central computers 65 being used to configure the data and/or functionality of server 205 (e.g., over a LAN, a WAN and/or the Internet 207), as discussed in greater detail below. Thus, for example, a communication link also exists between associate device 72 and server 205. That communication link preferably is implemented over a Wi-Fi connection between associate device 72 and a local wireless router (not shown), together with an Internet 207 connection between such local wireless router and server 205. As additionally noted above, in certain embodiments central computer(s) 65 also or instead can be used as a central server and implement some or all of the functionality ascribed herein to server 205.

In one class of the preferred embodiments, the messaging units 52 are located on and/or attached to the shelves 232, e.g., as shown in FIG. 10. Such a configuration often can permit more precise control over what messages are presented at different locations and/or even at different orientations of the user 60 and, more specifically, his or her user device 10. However, it should be noted that somewhat similar results can be achieved in alternate embodiments in which the light-based messaging units 52 are not necessarily located on and/or attached to the shelving units 232, but their emitted light 752 is directed toward, or otherwise directed in a manner so as to illuminate, such shelving units 232 and, more preferably, particular products on such shelving units 232, so that different light-based messaging units 52 illuminate different products or groups of products.

Figure 27:
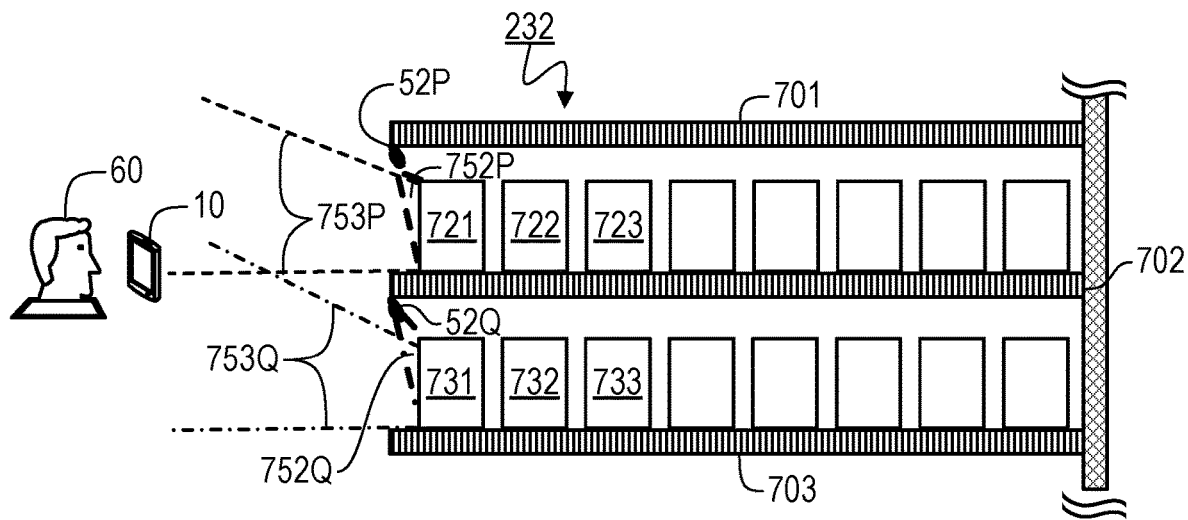
FIG. 27 is a side sectional view of a system that uses light-based messaging units attached to product shelves according to a representative embodiment of the present invention.
Figure 28:
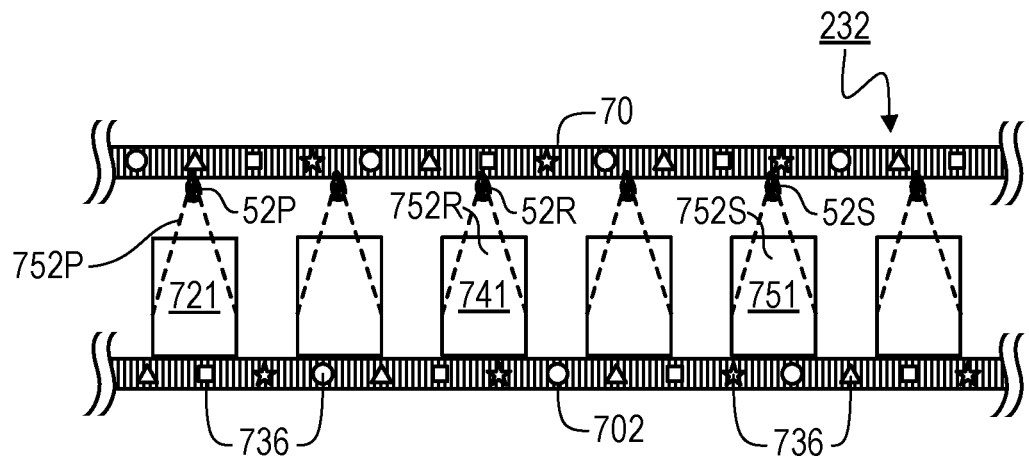
FIG. 28 is a front elevational view of a shelving unit according to a representative embodiment of the present invention.

One particular implementation in which the light-based messaging units 52 are provided on the shelving units 232, with their emitted light 752 directed toward different products, is shown in FIGS. 27 and 28. Specifically, FIG. 27 depicts a portion of a shelving unit 232 from the side, and FIG. 28 depicts a portion of such shelving unit 232 from the front. As shown, shelving unit 232 includes multiple vertically arranged shelves 701-703. Typically, products are disposed on most of such shelves (e.g., shelves 702 and 703). Conventionally, the type of product displayed in front (e.g., product 721 or 731) is representative of the products behind it (e.g., so that products 722 and 723 are identical to product 721, and products 732 and 733 are identical to product 731).

In the current embodiment, the light-based messaging units 52 (e.g., light-based messaging units 52P-S) are disposed on, or attached to, the shelf immediately above any shelf that supports products, with the light 752 emitted by each light-based messaging unit 52 (e.g., corresponding emitted light 752P-S) directed toward one or more corresponding products (e.g., corresponding product 721, 731, 741 or 751), which typically will be the front-most samples in rearwardly extending rows of identical products. In alternate embodiments, such light-based messaging units 52 are disposed in other locations. In any event, however, different product types preferably are illuminated by different light-based messaging units 52. As a result, the digital messages broadcast by such different light-based messaging units 52 can be, and preferably are, tailored to such different product types.

At the same time, in certain embodiments the light 752 (e.g., any of light 752P-S) emitted by such different light-based messaging units 52 (e.g., in terms of brightness and/or color) is selected so as to illuminate the corresponding product(s) in a visually pleasing manner (e.g., so as to illuminate each in the manner that a lighting designer associated with the product supplier believes constitutes the most favorable lighting conditions for such product). For this purpose, the brightness level of each light-based messaging unit 52 preferably is controlled by changing the percentage of "on" time (or the duty cycle) of the light source(s) 55 for such light-based messaging unit 52. When two or more differently colored light sources 55 (e.g., red, green and/or blue LEDs) are used for any given light-based messaging unit 52, color preferably is controlled by separately controlling the brightness levels of such differently colored light sources 55 (e.g., in the foregoing manner). As a result, both characteristics (brightness and color) can be changed, when and as desired, by an administrator 70 or other user (e.g., by submitting instructions from computer 65 to server 205, which then in turn communicates them to the corresponding light-based messaging units 52). As discussed elsewhere herein, such different characteristics also often can be used to distinguish the light that is output by different light-based messaging units 52 (e.g., and then received by a single user device 10).

According to one set of representative embodiments, the light-based messaging units 52 are fixed at regular intervals on each shelving unit 232, i.e., in a fixed grid pattern, e.g., with a first uniform distance between adjacent light-based messaging units 52 on the same shelf and/or with a second uniform distance between light-based messaging units 52 on adjacent shelves but otherwise at the same or similar horizontal positions. This configuration, while potentially easier to implement in some respects, can make it more difficult to align the light-based messaging units 52 with individual product types and/or make it more difficult to use shelf space efficiently. Thus, according to an alternate set of embodiments, the light-based messaging units 52 are horizontally adjustable (e.g., capable of sliding along a track on the shelf 232 and then being clamped or otherwise fixed into a desired position). This configuration, e.g., often can better permit individual light-based messaging units 52 to be aligned with corresponding product types, e.g., so that a single light-based messaging unit 52 primarily illuminates just a single product type.

In the current embodiment, the shelving units 232 are provided with markers 736 in order to assist in determining any camera movement between image frames and/or between light-based messaging samples, as discussed in greater detail below. The specific shapes of such markers 736 typically are not critical. However, it generally is preferred that they: (a) are varied in shape, such as having at least 2-7 different shapes (four in the present embodiment); (b) are alternated or otherwise arranged in patterns; (c) are easy to recognize by an automated process; and/or (d) are separated from each other by distances within a range of 6-36 inches. It is noted that individual ones of the shelving markers 736 can be existing parts of (e.g., integral with) the shelving units 232 and/or can be separately applied (e.g., painted on, glued on as decals, or otherwise attached).

Figure 29:
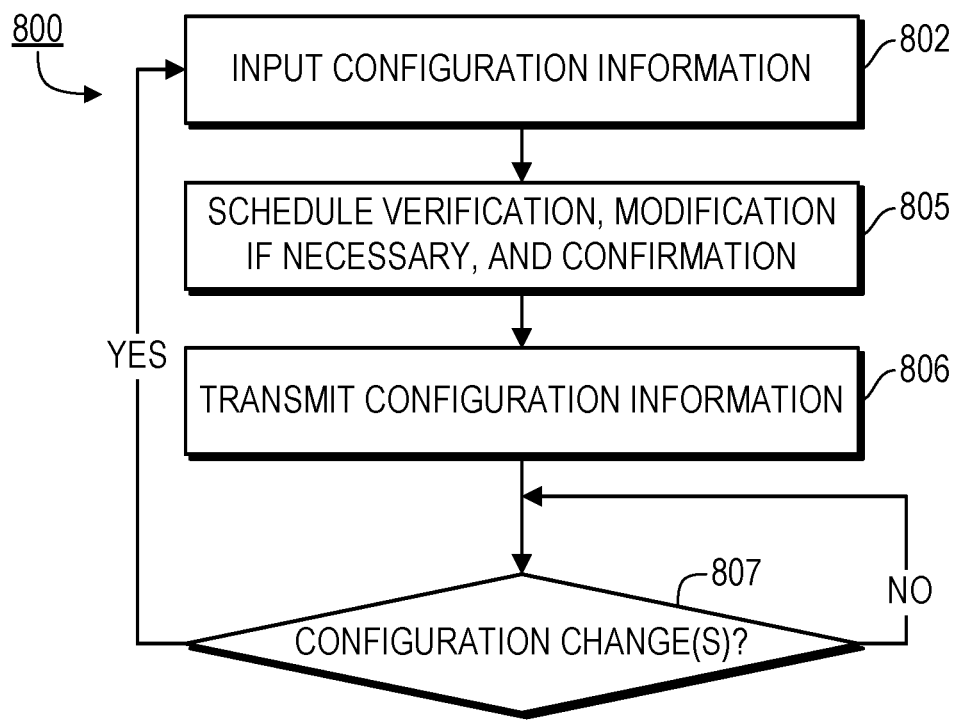
FIG. 29 is a flow diagram illustrating a process, executed by a central computer, for enabling an administrator to create and transmit server configuration information.

Similar to certain other embodiments described above, in the present embodiments computer 65 is configured with a software application that executes a process for allowing an administrator 70 to design a plan (which can be either static or scheduled/time-based) for controlling the light-based messaging units 52 and/or for specifying how the light-based messaging units 52 and/or products are arranged in relation to each other within a given retail space. In certain cases, server 205 only services related retail establishments (e.g., a single retail store chain), in which case a single administrative entity 70 preferably can control (and/or provide all the information in connection with) all of the light-based messaging units 52 with which the server 205 communicates. In other cases, server 205 services unrelated retail establishments (e.g., multiple different, separately managed, retail store chains), in which case a single administrative entity 70 preferably only controls (and/or provides information relation to) the light-based messaging units 52 within the stores with which it is associated. In either event, an exemplary process 800 (shown in FIG. 29) preferably is implemented by the administrative entity 70's computer(s) 65 in relation to those of the light-based messaging units 52 that are under the administrative entity 70's control. Except as otherwise noted below, the considerations pertaining to process 800 preferably are the same as those pertaining to process 100, discussed above in connection with FIG. 5.

Initially, in step 802, computer 65 inputs configuration information (e.g., entered by an administrator 70). Such information can include, e.g.: (a) digital messages to be broadcast by the individual light-based messaging units 52 (e.g., identification codes and/or network address information for obtaining information regarding them, the products in their vicinities, etc.); (b) any messaging schedules and/or schedule assignments; (c) how the light-based messaging units 52 (e.g., designated by identification codes that have been assigned to them) are laid out or arranged within the retail space (e.g., in relation to individual product types, or with separate inputting of information that independently specifies the layout and/or arrangement of the different product types); (d) information regarding the number, type(s), configuration(s) and/or other characteristics of the light sources 55 associated with individual ones of the light-based messaging units 52; (e) specification or identification of information to be displayed, or otherwise made available, in reference to different product types; (f) links to resources for the different product types; and/or (g) desired lighting parameters for different product types. Generally speaking, the inputting of such information is similar to, and the same considerations apply with respect to, steps 102-104 of process 100. Preferably, the purpose of this step 802 is to input complete information for configuring (and/or for describing the configuration of) the overall system 700, at least in relation to the particular retail store(s) for which the administrator 70 is responsible.

In step 805, any scheduling information input in step 802 is verified, modified if necessary and/or confirmed. Preferably, this step is identical to step 105, discussed above.

In step 806, the configuration information input in step 802 (potentially as modified in step 805, e.g., to avoid any conflicts) is transmitted to the server 205.

In step 807, a determination is made as to whether the administrator 70 has input an indication that a change in the configuration information is desired. If so, processing returns to step 802 in order to input any such change(s). If not, process 800 waits until such an indication is received.

It should be noted that the portions of the process 800 and corresponding steps of process 830 (discussed below) in relation to providing broadcast commands to the light-based messaging units 52 are optional. In certain embodiments of the invention, both the messages broadcast by the individual light-based messaging units 52 and the nature of the emitted light 752 are not controlled remotely (at least, not in real time). Preferably, in these alternate embodiments, the individual light-based messaging units 52 are pre-programmed (e.g., in their embedded software or firmware) to just broadcast an identification code that preferably: (a) is short, so it can be broadcast in a short period of time using a low data rate, and (b) is unique, at least within the particular retail store in which it is located. With this simple broadcast information, and appropriate specification and use of contextual information (e.g., layout of the light-based messaging units 52 and displayed products), as discussed elsewhere herein, the various devices within system 700 (typically, mainly server 205) can perform all the desired processing, with the added advantage that broadcasting just a short ID code e.g., not more than 5, 10, 15 or 20 bits in length, typically depending upon how many messaging units 52 are to be located within a particular retail store) can allow the user device 10 to quickly receive all relevant environmental information within a short period of time, even if it has a relatively slow processor and/or sensor. As a result, the feature of broadcasting just (preferably short) ID codes often is desirable across embodiments, even if the system 700 is configured such that those ID codes can in fact be changed or reassigned in real time.

Figure 30:
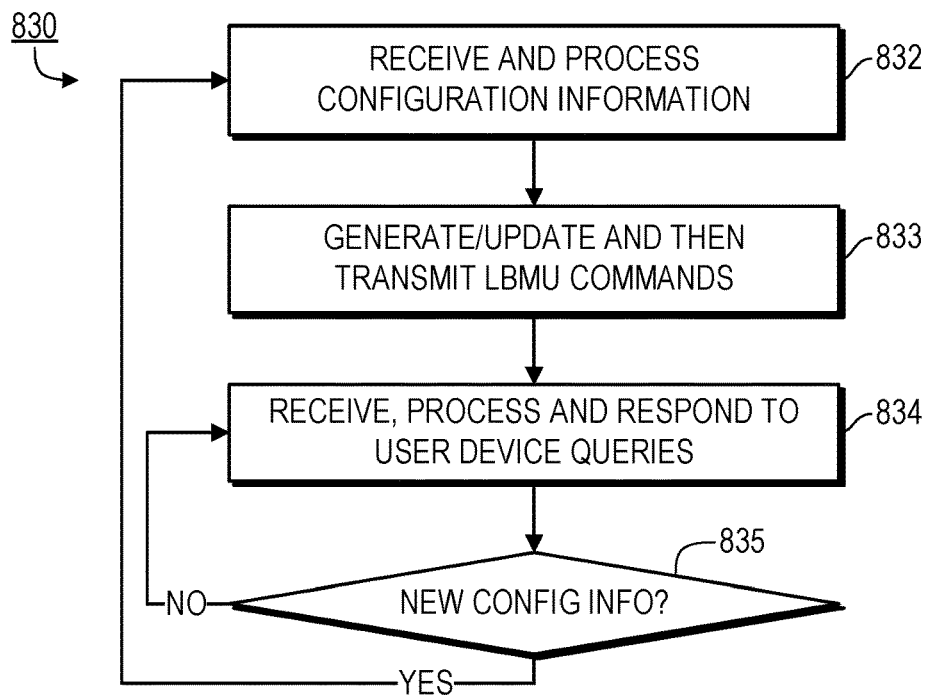
FIG. 30 is a flow diagram illustrating a process, executed by a central server, for responding to user queries and, optionally, controlling light-based messaging units.

FIG. 30 is a flow diagram illustrating a process 830, e.g., executed by central server 205 in coordination with process 800, discussed above, for (a) optionally controlling light-based messaging units 52 within one or more retail stores and (b) responding to user queries (typically, queries generated and transmitted automatically by the app 615 on the user device 10 in response to one or more digital messages received from the light-based messaging unit(s) 52).

Initially, in step 832 central server 205 first receives configuration information, e.g., transmitted from computer 65 in step 806, discussed above. Then, depending upon the format in which such configuration information has been provided, such information optionally is processed (also in this step 832), e.g., in order to identify: (a) relationships between the locations of the light-based messaging units 52 and the product types within a particular retail space encompassed by such information (e.g., to the extent such relationships are not already specified within the received information); (b) characteristics of the individual light-based messaging units 52 (e.g., by using model numbers of the light-based messaging units 52 embedded within the received information as indexes into a database of different models of light-based messaging units 52), such as any color capabilities of the associated light source(s) 55 and related color calibration/sensitivity information, relationships between duty cycle and brightness level(s) for the associated light source(s) 55, addressing/communication protocols, and/or available functionality of the corresponding controllers 56; and/or (c) network addresses of such light-based messaging units 52. Alternatively, any or all of such processing could have been performed by computer 65, with the results embedded within the configuration information sent in step 806, for simple extraction in this step 832.

With regard to information type (a) noted above, in the present embodiments server 205 controls in real time some aspect(s) of the light 752 emitted by individual light-based messaging units 52, e.g., based on where the light-based messaging units 52 are located and/or where their corresponding emitted light 752 is directed, particularly in relation to the locations of different product types, as discussed in greater detail below. For this purpose, and/or for use in executing step 834, discussed below (even in embodiments where such control over the light-based messaging units 52 is not exercised), it often is useful to maintain a data structure that reflects such spatial relationships. Probably the simplest such data-structure is a simple one-to-one pairing of light-based messaging units 52 and the product type that each is set to illuminate. However, such a simple mapping does not convey information about adjacent light-based messaging units 52 which might be useful in controlling the emitted light 752 of each so that the receiving user device 10 can more easily distinguish light received from multiple different light-based messaging units 52.

Therefore, an alternate data structure employs a two-dimensional grid-based mapping of each shelving unit side (e.g., any of shelving unit sides 232A-C), with each grid block: identified by a height index and a lateral position index, and with each such grid block identifying the product type located there and a specific light-based messaging unit 52 that illuminates it. As to the former, the height index preferably specifies the shelf number, e.g., with the bottom shelf indexed as 1 and each consecutive shelf numbered with consecutive integers, from the lowest shelf to the highest shelf. Similarly, the lateral position indexes preferably are consecutive integers, starting from 1 at the leftmost position (e.g., when facing toward the shelving unit 232). Thus, for example, each database entry would have the format of:
[store ID, shelving unit side, shelf, product type, lateral position, messaging unit],
so that an entry of [2314, 36, 2, Acme laundry detergent, 8, 461] would mean that: at the store (or retail location) with the identifier 2314, on shelving unit side 36, at the second shelf from the bottom, one would find Acme laundry detergent at the 8th position starting from the leftmost edge, and that product type would be illuminated by a light-based messaging unit 52 having an identifier (preferably a unique identifier) of 461. Such a data-structure allows an automated process (e.g., performed by server 205) to easily determine spatial relationships between individual light-based messaging units 52. In some cases (e.g., when the emitted light 752 and/or the reflected light 753 is expected to potentially interfere), an additional parameter is added to the database entry to designate when one shelving unit side faces another (e.g., when the two shelving units are on opposite sides of a shopping aisle), such as shelving units sides 232B and 232C (shown in FIG. 10).

The foregoing approach, while generally somewhat simple to implement and use by an automated process, potentially can lack flexibility in terms of spacing between different product types and/or between the individual light-based messaging units 52. Accordingly, in an alternate embodiment, the lateral position is specified as a distance (i.e., not necessarily integer) from a reference point (preferably, the left end of the shelving unit 232). In a still further embodiment, rather than a single entry that links a product type with an individual light-based messaging unit 52, an individual (e.g., each) product type has its own entry, and an individual (e.g., each) light-based messaging unit 52 has its own entry. An example of such a product type entry is:
[store ID, shelving unit side, shelf, product type, lateral position, width],
where: the first four parameters are as discussed above; the "lateral position" parameter specifies the distance, from a specified reference point (e.g., leftmost or rightmost end of the identified shelf) to a particular point (e.g., the center, leftmost or rightmost point) where the identified product type is located on the identified shelf; and the "width" parameter indicates how much space the identified product type takes up on the specified shelf (e.g., total width or one half the total width of its lateral display space on such shelf). Similarly, an example of a database entry for an individual light-based messaging unit 52 is:

[store ID, shelving unit side, shelf, lateral position, messaging unit ID],
where: the first two parameters are as discussed above; the "shelf" parameter identifies the particular shelf that primarily is being illuminated by the identified light-based messaging unit 52, and the "lateral position" parameter specifies the distance to the identified light-based messaging unit 52 (or to the center of its emitted light beam 752 on the identified illuminated shelf) from a specified reference point (e.g., leftmost or rightmost end of the identified shelf). The following discussion generally assumes a data-structure as described in the present paragraph, it being understood that alternate embodiments can employ any of the other data structures discussed herein.

In the preferred embodiments, such structured configuration information is provided directly by the administrator(s) 70 through their corresponding computer(s) 65. However, to the extent received in some other format, such information preferably is converted into such a structured format in this step 832.

In step 833, specific commands to the individual light-based messaging units 52: (a) are generated or, e.g., to the extent previously transmitted, updated, and then (b) are transmitted to such light-based messaging units 52. According to one embodiment, the server 205 instructs each light-based messaging unit 52 to repeatedly broadcast an identification code that has been assigned to it.

According to another, similar embodiment, the server 205 instructs each light-based messaging unit 52 to repeatedly broadcast a Web address, other Internet address, or any other communication system address (such as a telephone number or social media address) that has been assigned to such light-based messaging unit 52. For example, such address might simply have a one-to-one correspondence with a unique identification code that is associated with such light-based messaging unit 52. Alternatively, such address might have a one-to-one correspondence with a product type that is being illuminated by such light-based messaging unit 52. In this latter case, in this step 833 the server 205 first matches the light-based messaging unit 52 with the product type closest to such light-based messaging unit 52 on the shelf that is being illuminated by such light-based messaging unit 52. Preferably, this substep involves finding the center of the product type display on such shelf that is closest (i.e., the shortest distance) to such light-based messaging unit 52. In still further embodiments, server 205 also (or instead) instructs individual light-based messaging units 52 to repeatedly broadcast substantive information about the product type associated with the light-based messaging unit 52 (e.g., information retrieved from a database of product-type information that is accessible to server 205).

The preceding paragraphs discuss the substantive content that server 205 instructs individual light-based messaging units 52 to broadcast. In addition, server 205 preferably transmits information regarding the light that is to be output by the receiving light-based messaging unit 52 and/or how the substantive information is to be broadcast. Examples of the foregoing include overall brightness of the light to be used, color of the light to be used, and (as discussed elsewhere herein) the modulation technique and associated parameters to be used. As noted above, color and brightness preferably have been specified (directly or indirectly, e.g., by retrieving such information for the associated product type from a preferred product-type illumination database) by an administrator 70 through a central computer 65, although such parameters also (or instead) can be used to help a user device 10 distinguish the light 752 emitted by a different light-based messaging units 52.

The modulation technique (preferably, CDMA) and associated parameters preferably are sufficient to permit a user device 10 to distinguish the messages simultaneously received from multiple such light-based messaging units 52. For this purpose, unique modulation parameters preferably are assigned to any light-based messaging units 52 on the same shelving unit side or on an opposite shelving unit face (i.e., one across the aisle) having light outputs that are expected to overlap, e.g., within a specified distance that is based on brightness levels, angles in relation to directionalities of the light output by such light-based messaging units 52, and/or expected sensitivities (e.g., direction-based sensitivities) of the user devices 10. With such an approach, each unique parameter for encoding/decoding light-based broadcast messages is only used at a minimum specified distance (which can be a constant or can be made dependent upon positional relationship indicia, such as whether the light-based messaging units 52 are in the same shelf, on the same shelving unit side or on shelving unit sides across the aisle from each other) that is sufficiently large to ensure that overlap would not be an issue.

The foregoing instructions for a given light-based messaging unit 52 preferably are packaged into a message that is sent to the network address for such light-based messaging unit 52, e.g., across the Internet 207 and/or a WAN 208. In the preferred embodiments, the controller 56 for such light-based messaging unit 52 receives such message, unpacks it, and then modulates the light source 55 for such light-based messaging unit 52 in accordance with such instructions in order to broadcast the instructed substantive content as a binary-encoded digital signal that includes the desired digital message, as encoded with the instructed modulation technique and parameters and/or in accordance with the specified illuminating parameters.

It is noted that, in alternate embodiments of the invention, this step 833 is omitted entirely. Instead, in these alternate embodiments, e.g., the individual light-based messaging units 52 preferably are simply preprogrammed with identification codes that they broadcast on a continual basis, and they are arranged within a retail space either so that there is little chance that their emitted light 752 will overlap or so that any potential overlapping emitted light 752 will be broadcast with different modulation parameters, so that such light can be distinguished by a user device 10. In other words, a system 700 can be configured such that communications between server 205 and the light-based messaging units 52 are not necessary.

As noted above, the preferred modulation technique is CDMA, particularly when the light-based messaging units 52 are not being controlled in real time (so that coordination of their broadcasts, such as would be the case with TDMA, generally is not possible). In such embodiments, each light-based messaging unit 52 preferably is able to indicate which CDMA code it employs in its broadcasting, and then such light-based messaging units 52 are arranged so that any two using the same code or a minimum distance apart. More preferably, the light-based messaging units 52 are preinstalled on the shelving units 232 in a manner that this restriction is satisfied. Then, at most, the only restriction that it might be desirable to observe is which shelving unit 232 faces are permitted to be opposite each other in order to maintain the preferred minimum distance.

In step 834, server 205 receives one or more queries from one or more user devices 10, processes them, and then responds to them. A representative process by which such queries are generated by a given user device 10 is discussed below in connection with FIG. 31. In any event, in certain embodiments a query received in this step 834 includes a unique address, or some other code or identifier that can be mapped, using a lookup table, to a unique address that points either: (a) to a page (such as a webpage) that has been pre-populated with information and/or with links to other resources; and/or (b) to an individual or service for providing real-time two-way communications (e.g., via a telephone system, a conferencing app such as FaceTime™ or Skype™, or any other text-based, audio or audiovisual communication link). Accordingly, in response to such a query, in this step 834, server 205 preferably serves the requested page and/or establishes the appropriate real-time communication link, as applicable. As discussed in greater detail elsewhere herein, such unique address preferably corresponds to one or more particular product types, and the page that is served (if applicable) provides information regarding such product type(s), or the established communication link (if applicable) is between the corresponding user 60 (more specifically, the user's device 10) and an entity or individual that has expertise in such product type(s).

In alternate embodiments, some or all of the assisted-reality processing discussed below in connection with steps 863 and 864 of FIG. 31 also (or instead) is performed in this step 834. For example, when a unique code, identifier or address is received in a query from a user device 10, as discussed above, the above processing is performed. However, when an image or video, supplemented or annotated with information from one or more light-based messaging units 52, is received from a user device 10, then in response, AR processing preferably is performed, as discussed in greater detail in the following paragraphs, and finally AR information is transmitted back to such user device 10 in this step 834.

Figure 32:
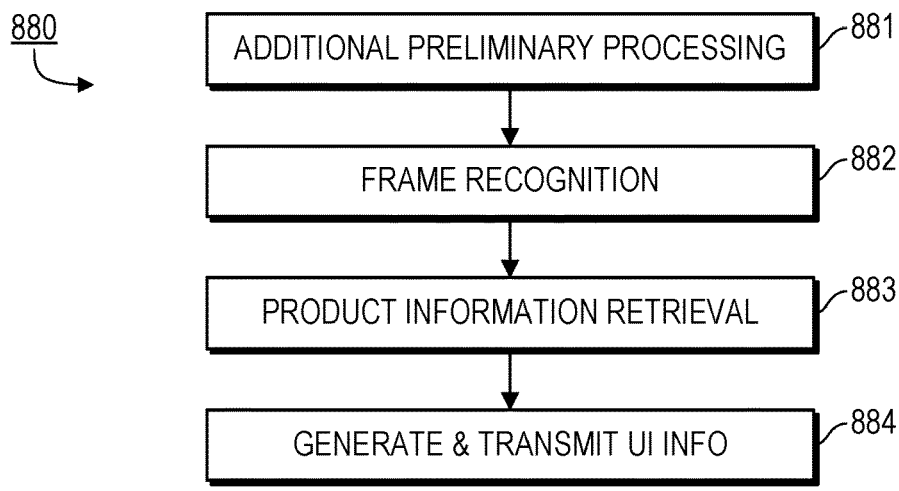
FIG. 32 is a flow diagram illustrating more-specific processing performed by a server when responding to user queries according to a representative embodiment of the present invention.

According to one such example of the latter, server 205 receives an image or video taken by the camera 12 of a user device 10, along with the light-based digital messaging information (e.g., raw collected data or demultiplexed/decoded message(s)) that have been received through such camera 12 from one or more light-based messaging units 52. Such information, depending upon the embodiment, can include the relative strengths (e.g., intensities or brightnesses) of different received/decoded digital messages. In fact, because a camera is being used as the light sensor 12, in some embodiments, different messages and/or strengths are identified (in the received query) for different areas of the image or video frame. An example of one particular type of AR processing 880 is discussed below in reference to FIG. 32. According to an alternate embodiment, the user device 10 transmits captured image or video information, along with raw captured light-based messaging information (e.g., fairly high-speed sampling of the received light, which may be aggregated across the entire sensor and/or image frame, such as at any of the minimum sampling rates noted below), and then that raw messaging information first is decoded by server 205 in this step 834 (e.g., by processing it with multiple different potential CDMA codes in parallel), thereby permitting faster decoding than typically would be possible if performed by the user device 10.

In step 835, a determination is made as to whether any new configuration information has been received, e.g., from one of the administrator computers 65. If so, processing returns to step 832 in order to process such information, followed by step 833 (if applicable) to generate and/or update and then transmit the appropriate commands to the corresponding light-based messaging units 52. If not, then processing returns to step 834 to wait for and then respond to queries from user devices 10.

Figure 31:
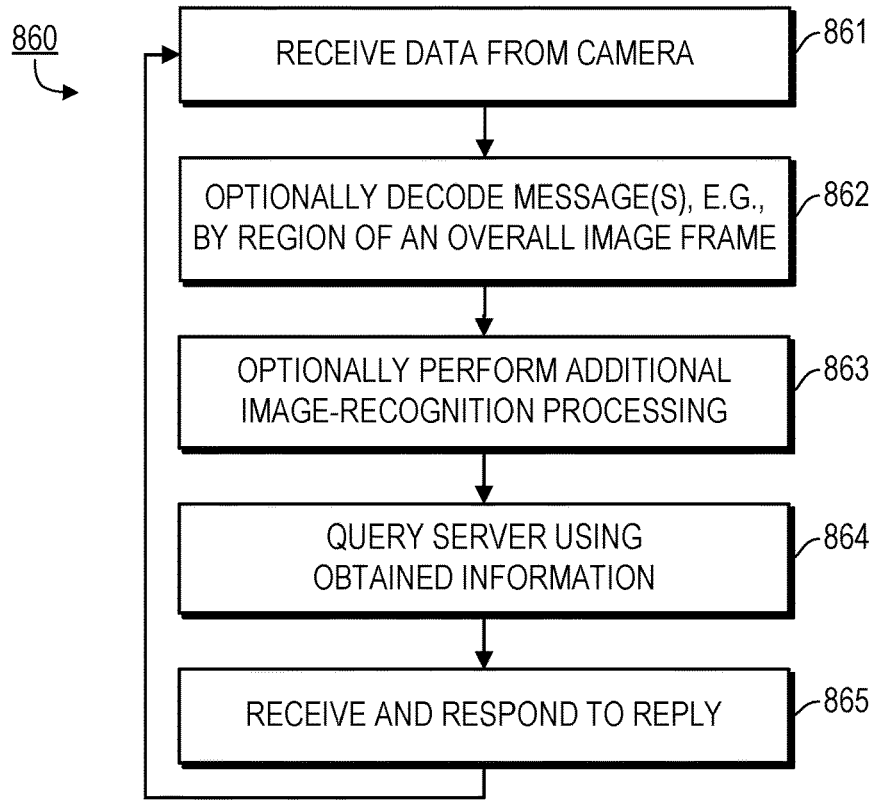
FIG. 31 is a flow diagram illustrating a process, executed by a user device, for receiving and responding to binary-encoded digital light signals.

In the current embodiments, customer app 615 (implemented by the user device 10) also (or instead) implements a process 860, as shown in FIG. 31. Generally speaking, process 860 provides an overall structure for how the user device 10 can implement a two-mode communication approach according to various embodiments of the present invention. As indicated below, the specific implementation details of a process 860 according to the present invention can vary according to the particular embodiment. Moreover, each particular implementation (especially the specific data generated and transmitted by user device 10) typically will affect how the other processes within the corresponding system 700 are implemented, as discussed in greater detail below.

Initially, in step 861 the user device 10's camera, which is used as the sensor 12 in the current embodiments, provides the user device 10's processor with detected data. In the preferred embodiments, for each pass of steps 861-865, two types of data are captured and processed: light-based messaging data (from the light-based messaging units 52) and image data (typically, frame-based image data of the type conventionally output by camera 12). Depending upon the speed (e.g., in terms of maximum possible frame rate) of the camera 12, particularly in comparison to the modulation rate of the light-based messaging units 52, and/or the expected distribution of light from the light-based messaging units 52 across the image frame, it sometimes can be possible to use a successive sequence of image frames (e.g., video or burst-mode stills) for both, e.g., using most or all of them for decoding the light-based message(s) in step 862 (discussed below), and then retaining just one (or a very small subset) for image processing in step 863 and/or for transmitting to the server in step 864 (both also discussed below).

However, in alternate embodiments, rather than detecting sequences of full frames, camera 12 is configured to detect in this step 861 just one full frame (as image data) and multiple samples (as messaging data), with the latter having lower (or rougher) spatial sampling (potentially even a single sample or set of samples for the entire frame or a single sample or set of samples for each of a few specified regions). In other words, in these alternate embodiments, higher (or better) spatial resolution (i.e., closer samples, e.g., at least 250,000 pixels in the frame) and lower temporal resolution (longer period(s) of time between frames, e.g., at least ½ second) are used for the detected image data (which, e.g., subsequently is processed in step 863), while lower spatial resolution (i.e., samples that are fewer in number and/or further apart) but higher temporal resolution (shorter period(s) of time between samples, e.g., not more than ¹⁄₁₀ or ¹⁄₂₀ second) are used for decoding the light-based messaging (which, e.g., subsequently or processed in step 862). According to one set of embodiments, not more than 10-20 composite spatial samples of messaging information are preserved for each temporal sample and, in certain cases, just a single such spatial sample is preserved. For purposes of the preceding sentence, a composite sample is intended to mean the combining of signals from one or more different sensor elements (e.g., adding or averaging all the values from one row of a CMOS sensor). This use of different spatial and temporal resolutions for the two different data types currently is believed to provide the best processing efficiency. However, it should be noted that this preference and, in particular, the specific parameters noted in this paragraph can change as technology advances.

In a more-specific case, in which the user device 10's camera uses a CMOS sensor (which currently is typical for smartphone cameras), image data are detected sequentially, one row at a time. Here, in the currently preferred embodiments, the detected image data include an entire frame (all rows of data), but the detected light-based messaging data only includes a small subset (e.g., not more than 1-5 rows) of the image data. For example, an entire frame might be collected first and then just the center row (or a spatially equivalent row, using a known image-stabilization technique to correct for any movement of the camera between sample detections) repeatedly sampled at each iteration after that to obtain the light-based messaging data. In this way, very high sample rates of the light signal(s) incident on essentially the same space can be obtained for subsequent decoding of the light-based messaging data. On the other hand, if it is determined that the light-based messaging illumination is equivalent across the entire frame, then (still assuming a CMOS sensor) the rows from the initial frame (which also is used for the image data) can be used as samples of the light-based messaging data and one or more repeated frames can be captured and used in whole for the image data, while their individual rows also are retained and subsequently used as samples of the light-based messaging data.

In either event, preferably all the samples from each row are combined to obtain a single composite sample for the particular time point that corresponds to the capturing of that row. However, in alternate embodiments (particularly where variation is expected across the length represented by the row), the row is divided into at least two sections, and all the samples in each section are combined so that the result is a sample for each spatial interval. Of course, any such segmentation can be performed in this step 861 or in any of the subsequent processing discussed herein. To capture differences in the vertical dimension as well, in certain embodiments, multiple sample rows (rather than just a single row) are sequentially detected, with the entire sequence being repeated. However, it is currently believed that detection of just a single row would be adequate, while providing the greatest potential sampling speed. In any event, the sampling of the light-based messaging data preferably is performed at a fairly high rate, such as at least: 50, 100, 300, 1,000 or even 2,000 samples per second. Again, this is in contrast to the image data, for which frames typically can be captured no more frequently than 2 or 1 per second and, currently more preferably, are not be captured more frequently than once every 2 or 4 seconds.

In step 862, the user device 10 optionally decodes one or more digital messages from the light-based messaging data obtained in step 861 (from broadcast(s) made by one or more of the light-based messaging units 52). Preferably, this step 862 (to the extent performed) is similar to a combination of steps 162 and 163, discussed above. Alternatively, some or all of the processing discussed in connection with this step 862 instead can be if performed by server 205, as discussed below.

Generally speaking, in the preferred embodiments, the information from multiple different received digital messages (and, more generally, from the broadcasts of multiple different light-based messaging units 52) is processed with the ultimate goal of providing a more comprehensive understanding of the specific current environment in which the user device 10 is located and/or oriented. In this regard, the light reaching camera 12 preferably is demultiplexed and/or decoded, often simultaneously providing various kinds of information from multiple distinct light-based messaging units 52. Subsequent processing, discussed below, explains how that information can be combined with the image information obtained by camera 12 to obtain faster and more accurate analyses of the user 60's environment. For at least that reason, information from multiple (preferably all) received broadcast signals is retained, processed, and used in providing feedback to the user 60.

In the various implementations of the present embodiments, to the extent that previously performed in step 861: (a) the signals received simultaneously by the camera 12's sensor at any given instant (e.g., an entire row in the case of a CMOS sensor or the entire array in the case of a CCD sensor) are combined to obtain a single composite signal; and/or (b) the received signals corresponding to the pixels within each of multiple different regions (e.g., one-dimensional intervals or two-dimensional spaces) are combined in order to generate a composite signal for each of such multiple different regions. In the simplest implementation of the latter, these regions are defined in advance in a predetermined manner, such as a fixed grid of nonoverlapping rectangular regions (e.g., fixed-sized rectangles, at least two, three or four in each dimension) that collectively encompass the entire frame. In alternate implementations, the user device 10's processor first identifies discrete shapes (e.g., using an existing image-processing technique, such as edge detection) and then characterizes each identified shape as a region for the foregoing purpose. In certain implementations, the identified shapes are then characterized (e.g., using the light-based messaging units 52 and/or other known features on the shelving units 232 as markers), e.g., as: products, portions of a shelving unit 232 or other items, and only the regions characterized as products are further processed. It is noted that the foregoing approaches use the camera 12's inherent focusing feature to provide spatial discrimination within the detected frame.

Regardless of the number (preferably, 1-20 such regions within the overall image frame) and/or specific selection of such region(s), preferably all of such composite signal(s) then are processed in the manner described above in connection with steps 162 and 163 in order to identify, for each corresponding region: (a) the light-based digital message(s) received within it, (b) identifiers for the corresponding light-based messaging units 52, and/or (c) the signal strength of the light originating from each such light-based messaging unit 52.

The result of this step 862 preferably is a set of one or more defined regions representing the image frame, together with one or more digital messages for each such region and, in some cases, also an indication of the signal strength for individual ones of such digital messages. With regard to the latter, the same digital message often will be identified in two or more different regions, but with different signal strengths which sometimes can be used in subsequent processing to better determine the position and/or orientation of the user device 10. In the preferred embodiments, each such digital message comprises an identification code for, or a network address corresponding to, a particular light-based messaging unit 52.

In step 863, additional image processing (beyond any shape detection that was performed in step 862) optionally is performed on one or more of the full image frame(s) that were obtained in step 861. Depending upon the particular embodiment, such additional image processing might include, e.g.: (a) processing to identify additional and/or more-specific features of the previously identified shapes; (b) rough image recognition, e.g., to distinguish whether individual ones of the previously identified shapes are portions of the shelving unit 232, individual products, or something else; (c) optical character recognition (OCR), e.g., to read the labels on product packaging; and/or (d) matching product images against a database of known product-type images (either in isolation or in combination with the OCR data and/or the received light-based digital messages) in order to identify individual product types within the current image frame.

However, possibly other than processing types (a) and (b) discussed in the preceding paragraph, most of the other processing (particularly the higher-level recognition processing) discussed in the preceding paragraph preferably is performed by the server 205, as discussed in greater detail below, because server 205 typically will have access to much more processing power and database information than user device 10. In any event, various techniques for implementing each such category of such image processing are conventionally readily available, and any or all of such processing can be distributed among user device 10, server 205 and/or any other networked devices as desired, e.g., according to well-known engineering trade-offs.

In fact, in certain embodiments both of steps 862 and 863 are omitted entirely, with the user device 10 mainly or exclusively transmitting the raw data it collected in step 864 (discussed below), and with some or all of the processing described for steps 862 and 863 above instead being performed by the server 205. Often, this approach is preferred in order to take advantage of the greater processing power and access to resources of server 205.

In step 864, the user device 10 transmits the foregoing information produced by it to server 205, typically across the Internet 207 using one or more intermediate networks, such as Wi-Fi or a cellular-based network. Preferably, such information includes: (a) at least one full image frame obtained in step 861; (b) one or more digital messages, either in the form of the raw data collected in step 861 or after having been decoded in step 862, either for the frame as a whole or separate digital message(s) for different identified regions within the frame; (c) strength of the received light from which individual digital messages were decoded; and/or (d) any or all of the image processing results obtained in step 862 and/or step 863.

Upon receiving such information (and in response to it), as noted above, server 205 implements step 834 of process 830 (shown in FIG. 30). The foregoing discussion of the types of processing 800 that can be performed by user device 10 (according to the various embodiments of the present invention) permits a better understanding of the types of processing (again, according to the various embodiments) that can be performed in step 834. Accordingly, one process 880 for implementing step 834 is now described in reference to FIG. 32.

Initially, in step 881 additional preliminary processing (e.g., including message decoding and/or image-recognition processing) optionally is performed by server 205. As to message decoding, as noted above, in certain embodiments the raw sampled messaging data was transmitted to the server by the user device 10 in step 864. In such a case, the server 205 preferably attempts to demultiplex all potential channels (more preferably, in parallel or simultaneously). For example, in one embodiment that employs a CDMA encoding approach: (a) the received data preferably are decoded using each potential CDMA code in parallel; (b) then a determination is made as to which channel(s) actually include a broadcast message; and finally, (c) those messages are recorded and preserved (e.g., for the frame as a whole or for the individual regions to which they apply, as applicable).

As to the potential preliminary image-recognition processing, this step 881 optionally includes preprocessing, such as edge detection or digital fingerprinting, to identify and/or characterize features of the image(s) received from the user device 10. For instance, any or all of the processing discussed above in connection with step 863 instead could be performed by server 205 in this step 881, e.g., with user device 10 potentially transmitting just the raw image data received by its camera 12, or a lightly processed version of it, to server 205 in step 864. That is, the division of the desired image-processing workload, as between user device 10 and server 205, preferably is made according to known engineering trade-offs involving, e.g., relative available processing capacities; characteristics of the communication channel between the two, as well as between each and other available network resources; and the ability of each to access data resources (e.g., the desirability of granting access of specific data resources to each). Generally speaking, it is preferred that server 205 performs most of the present processing, and only it has access to most of the data resources. Accordingly, the following discussion generally reflects this preferred approach. However, the specific embodiments described herein should be understood as being merely exemplary.

Figure 33:
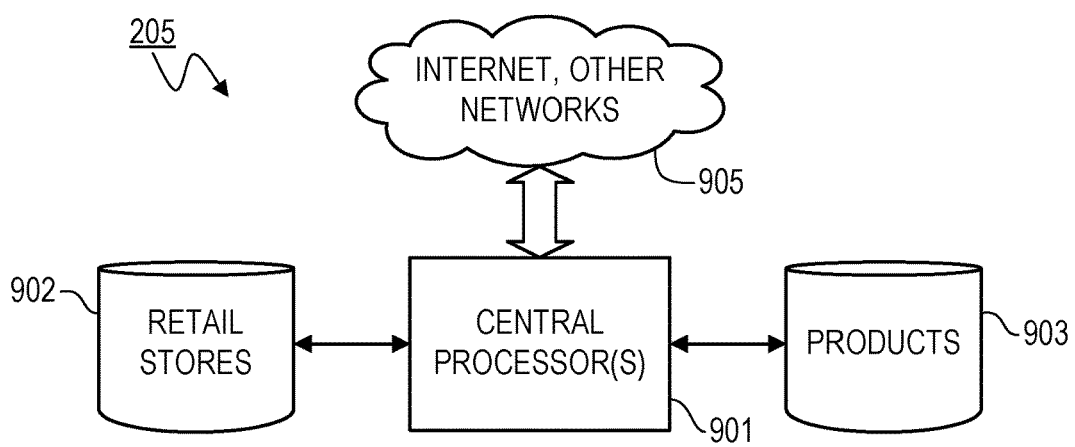
FIG. 33 is a block diagram of a server configuration according to a representative embodiment of the present invention.

Next, in step 882, server 205 preferably uses the preliminary image frame information (generated by the user device 10 in step 863 and/or by the server 205 in step 881), together with the decoded messaging information (generated by server 205 in step 881 and/or by user device 10 in step 862) to recognize the contents of the received image frame. For this purpose, server 205 preferably is configured as shown in FIG. 33. Specifically, one or more central processors 901 execute the processing steps described herein as being performed by server 205 and have access to: a database of retail store layout information 902, a product database 903, and one or more communications networks 905 (such as the Internet 207 and/or a wide-area network 208), typically through a separate network interface and/or one or more intermediate communication networks (not shown). Retail store database 902 preferably includes product-type and light-based messaging unit 52 layout information, as described above in connection with step 832, together with information regarding the characteristics of each represented type of light-based messaging unit 52. Product database 903 preferably includes, for each product type that it encompasses (e.g., which preferably includes all of the product types stocked by the retail stores that server 205 services): (a) various kinds of identification information, such as image-matching information (e.g., an actual image of the product type or a digital fingerprint for such image), textual information (such as text that appears on the product or its packaging), and/or a unique identifier for such product; and (b) information regarding such product type, such as narrative descriptive information, structured information for easy retrieval of specific characteristics pertaining to it, and/or a link or network address for obtaining such information, e.g., as discussed elsewhere herein. Retail store database 902 typically will have been populated by the administrator(s) 70 using process 800, discussed above. Product database 903 also may have been populated in this manner and/or using information received from other entities, such as the corresponding product manufacturers and/or distributors.

In the preferred embodiments, in the present step 882, processor(s) 901 first utilize the identified digital messages received from the light-based messaging units 52 in order to identify the particular shelving unit face, as well as to at least approximately identify the particular portion of such shelving unit face that is encompassed within the received image frame(s). These determinations preferably are made, at a minimum, by determining which light-based messaging units 52 have emitted light that has been detected within such image frame(s). For that purpose, as indicated above, the decoded messages preferably identify the light-based messaging units 52 that broadcast them (e.g., include unique identification codes). More accurate information regarding the specific portion of the shelving unit face 232 that is depicted within the captured image frame often can be achieved by comparing the relative strengths of the light received from different light-based messaging units 52 and/or the relative strengths of such light in different portions (or regions) of the image frame(s).

In any event, such messaging information preferably is used, in conjunction with the product and light-based messaging unit 52 layout information stored in database 902, to narrow down the potential product types that potentially are present within the image frame(s) (e.g., by first retrieving from database 902 identifiers for all potential product types that potentially could have been captured within the image frame, based on the spatial proximity to the light-based messaging units 52 from which messages have been received), thereby making the task of identifying each product whose image appears in the frame(s) much easier. In other words, even using conventional image-recognition technology, the image-recognition speed and accuracy can be significantly improved because a structure according to the preferred embodiments of the present invention only requires matching to one of a relatively small handful of potential candidates within the overall product database 903 (e.g., accessing that limited set based on the product identifiers retrieved from database 902). In that regard, the light-based messaging information typically can be used to narrow down the set of potential product types within the frame, e.g., to not more than 20, 30, 40 or 50. Of course, for wider frames (where the user's camera 12 was a significant distance away from the shelving unit face 232), it is possible that images of a higher number of different product types might have been included. However, it is not expected that such a case will occur very often.

Use of such a hybrid recognition approach (i.e., image matching in combination with detection of light-based digital messages) often can achieve much better results. However, in alternate embodiments, either of such approaches can be used individually. For example, within a certain portion of an image frame that has been determined to contain an image of a product, it can be possible to identify that product type simply by simply choosing the broadcast digital light-based message having the highest strength (e.g., on the assumption that it is being directly illuminated by the light-based messaging unit 52 that corresponds to it). Again, however, recognition speed and accuracy often can be significantly improved by using both approaches together, particularly in the real world where products might not be optimally aligned with the light-based messaging units 52 that are intended to be associated with them. Also, even the image recognition/matching substep potentially can be supplemented by using the expected product layout information contained in database 902, rather than attempting to match product images in isolation; however, such approaches might not reliably provide improved results, particularly when individual product items have been shelved incorrectly.

Using any of the foregoing approaches, each product displayed within the image frame, together with its two-dimensional location (e.g., specified as a rectangular box or area within the frame that encompasses the space occupied by such product type), preferably is identified as a specific product type in this step 882. It is noted that in the accompanying drawings, for ease of illustration, the products themselves are depicted as rectangular boxes, which often, but not always, will be the case. Instead, in many situations, a product either will not be packaged or will be packaged in some non-standard manner Preferably, image information regarding how each such product type is displayed on a shelf (e.g., images or fingerprints of the product type taken from multiple different viewing angles) is present in product database 903. However, regardless of the specific appearance of any given product, designating the two-dimensional space occupied by it within the received image frame(s) can be useful, e.g., for the reasons discussed in more detail below.

In step 883, information regarding the product type(s) identified in step 882 is retrieved from product database 903. In the preferred embodiments, the type of information depends upon what is desired to be presented to the user (at least initially), as discussed in greater detail below in connection with step 884 and/or step 865. That decision, in turn, is predetermined upon creation of the system 700 in certain embodiments of the invention, while in others, it is made by the user 60 (e.g., through the user interface provided by app 615, from a number of available options) and is transmitted along with the query to the server 205 in step 864. In any event, retrieval of such information preferably involves a straightforward query to database 903, using the identified product type and the selected user option (if applicable) or other indication of the desired type of information to be presented. The retrieved product information preferably then is logically linked to the product type with which it is associated which, in turn, preferably is logically linked to the specific portion(s) of the image frame(s) at which such product type image is located.

Finally, in step 884 user interface information (e.g., including the foregoing logical associations) is generated and transmitted back to the user device 10 across the appropriate communication network(s) 905. Preferably, the specific type of user interface information that is transmitted in this step 884 was specified the user device 10 (e.g., based on real-time and/or initial configuration input from the user 60) in step 864 and received by server 205 in step 834.

For example, user device 10 may have requested AR elements that can be included in its display. In such a case, in this step 884 server 205 preferably creates the content for each AR element and specifies where it is to be placed within the image frame. As to the former, typical content would include a textual description of the product (such as the manufacturer's name and the model name or number), although any other relevant text, logo(s), other icon(s) or image(s), GIF(s) and/or other static and/or animated elements also (or instead) can be used. In any event, it often is preferable also to associate a link to additional information and/or other resources pertaining to such product with the AR element. All of such content preferably was retrieved from product database 903 in step 883. As to the latter, the location within the frame preferably is just the location identified for the product type in step 882 (e.g., a rectangular box), specified in reference to one or more reference points in the frame itself (e.g., the lower left corner of the frame) or, more preferably in some embodiments (as discussed in greater detail below), in reference to fixed point(s) on the shelving unit 232. In any event, such information preferably is simply transmitted in this step 884 (e.g., for subsequent incorporation into the image frame by user device 10).

However, in alternate embodiments, such information is incorporated into the image frame received in step 834, and the supplemented image frame is transmitted in this step 884. In still further embodiments, the retrieved information is provided in any other desired format (e.g., in a separate page that can be displayed by user device 10).

In any event, referring back to FIG. 31, in response to receipt of such information transmitted by the server 205 in step 884, user device 10 executes step 865 of process 860, in which the received information preferably is presented to the user 60. Commonly, the image frame(s) transmitted by the user device 10 in step 864 and then processed by the server 205 in steps 881 and 882 will include images of multiple different products, and all the potentially relevant information for such different products will be difficult to display in a manner that is intuitive to the user 60. As a result, in the preferred embodiments just a small amount of information (e.g., just the name of the product manufacturer and the name of the product itself) preferably is annotated into the existing image frame, and that information serves as a link to an address through which additional information about the product can be obtained by the user 60. Again, such information preferably would have been retrieved by server 205 in step 883 and then included within the information transmitted by it to the user device 10 in step 884.

Figure 34:
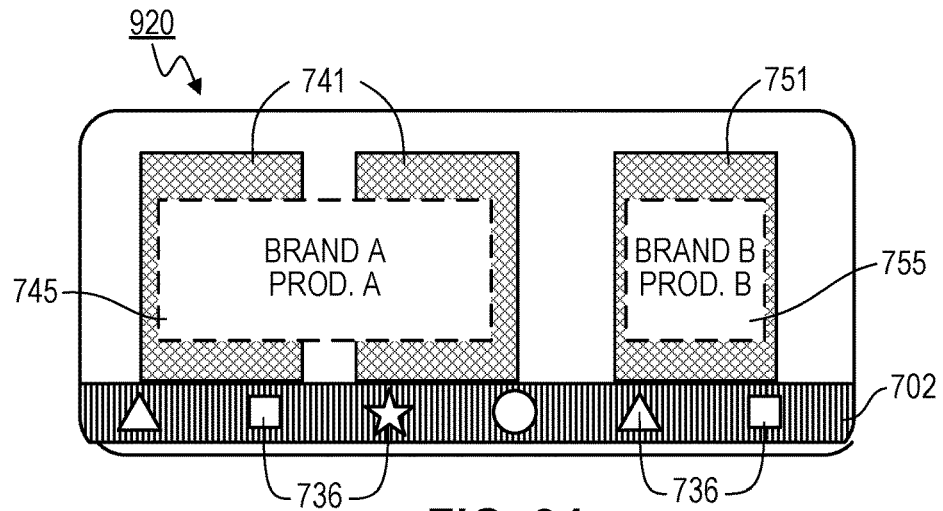
FIG. 34 is a front elevational view of the display screen for a user device according to a representative embodiment of the present invention.

An example of a resulting annotated image frame 920 that might be displayed by user device 10 in the present step 865 is illustrated in FIG. 34. In the present example, the image frame 920 includes the image frame that the user device 10's camera 12 captured (in step 861) and transmitted to the server 205 (in step 864), i.e., showing a portion of a shelf 702 that includes two different product types: product type 741, for which two (rearwardly extending) rows of boxes have been captured in the frame 920, and product type 751, for which one row of boxes has been captured in the frame 920. Annotated onto this image, for each product, is a text box that identifies the manufacturer (or brand) of the product and the name of the product itself. Thus, for example, product type 741 is overlaid with text box 745, and product type 751 is overlaid with text box 755. In addition to the textual information, each such text box preferably serves as a link to an external address, so that the user 60 can simply touch the text box in order to: (a) retrieve a new page that includes additional information regarding that particular product; and/or (b) open a real-time communication link (e.g., textual, voice and/or visual) with a customer-service representative who can answer questions about the product. The specific action upon clicking on any such link (e.g., pulling up an information page or establishing a two-way real-time communication link), depending upon the particular embodiment, is: (1) predetermined (either in a fixed manner or as a default selection) and/or (2) selected by the user 60 (from a set of available options). As to the latter, the user 60 might decide in advance (e.g., from a "settings" menu in the customer app 615) and/or in real time (e.g., by providing two separate links, one for retrieving a product information page and one for opening a real-time communication link) which action will occur.

Similarly, again depending on the particular embodiment, the type of displayed text (and/or other indicia) is determined in advance (e.g., predetermined for the particular embodiment or selected by the user 60 from a "settings" menu) and/or in real time (e.g., responsive to a current search being performed by the user 60). As to the latter, e.g., a user 60 might enter certain product features and/or other criteria through the customer app 615 and then scan the shelves using his or her device's camera 12. In response, e.g.: (a) the app 615 uploads the captured information to the server 205 (as discussed above); and (b) the server 205 then identifies the depicted products, retrieves relevant product information, looks for matches to the user-specified criteria, and then generates the display icons (e.g., similar to display boxes 745 and 755, including text and/or other indicia), such that when a match is discovered it is indicated in the corresponding display box (e.g., including appropriate text or an icon, or highlighting the text box in bold or in a particular color). Once again, because of the unique configuration of the present embodiments, recognition of individual product types can be much faster and more accurate, thereby providing a better user experience than could be achieved using conventional approaches.

In the foregoing embodiments, the light-based messaging units 52 preferably just repeatedly broadcast an identification code, which even more preferably, has a bitlength that is as short as possible. As a result, the bitrate(s) of their light-based transmissions can be kept relatively low, while still transmitting the corresponding identification code in a relatively short period of time. Beneficially, such an approach can permit a user device 10, even one with a relatively slow processor and/or camera 12, to identify all of the light-based messaging units 52 within the camera 12's frame in real time. Then, the substantive information relating to such identified light-based messaging units 52 can be retrieved from existing database(s) (such as database 902 and/or 903). However, in alternate embodiments, at least some of such light-based messaging units 52 also (or instead) are configured to transmit substantive information (e.g., regarding the products within their vicinities).

Often in the present embodiments, it will be desirable for the display screen 625 of the user device 10 to continuously display what is being seen by its camera 12. At the same time, there typically will be some time lag before what is captured within a particular image frame 920 can be identified and then the corresponding AR element(s) (e.g., AR elements 745 and/or 755) generated. Although, as noted above, the position(s) of such AR element(s) typically are specified in reference to the initially captured frame, by the time that information is available, the displayed image frame often will have moved somewhat in reference to the particular shelving unit 232 (and its corresponding products) that the camera 12 is capturing. To address this problem, shelving markers 736 (discussed above) preferably are provided, and the user device 10's processor preferably employs image processing using such markers 736 in order to identify the change in camera 12's perspective (e.g., changes in parallel translation, distance and/or angle of view), either on a periodic basis and/or between the time that the original information was captured in the time that the corresponding AR element(s) are to be displayed. In this regard, the preferred properties noted above for the shelving markers 736 are intended to accommodate the anticipated amount of camera movement (and corresponding changes in the resulting image frame) between initial capture and subsequent display (such as movement of up to 3-18 inches), preferably allowing such changes to be readily discerned.

Such motion information preferably is used in step 865 to modify the position(s), and in some cases also the shape(s) and size(s), of the AR elements that are being displayed. In addition to, or instead of, using the shelving markers 736 for this purpose, motion sensing data provided by the user device 10 (e.g., conventionally used for image stabilization) is used for the same purpose in the preferred embodiments. Still further, either or both of such kinds of information for maintaining frame-to-frame consistency is used to maintain sample-to-sample consistency in the messaging data captured in step 861.

In the foregoing embodiments, the individual light-based messaging units 52 preferably repeatedly broadcast their identification codes. However, in alternate embodiments, the same codes that are used to encode their broadcasts for multiplexing purposes (e.g., CDMA codes) are used as the identification codes for the corresponding light-based messaging units 52.

As noted above, the above-described processing can be distributed between the server 205 and the user device 10 in any desired manner (typically, in an attempt to achieve the best overall efficiency). In order to further this goal, in certain embodiments, user device 10 maintains continual communications with server 205, e.g., so that server 205 is continually aware of the location and orientation of user device 10 and provides user device 10 information regarding its local surroundings so that user device 10 can more efficiently process the information it receives. For instance, in certain embodiments in which the light-based messaging units 52 color encode their broadcasts, server 205 provides to user device 10 information regarding such color schemes of the light-based messaging units 52 within the current local vicinity of user device 10, so that user device 10 can quickly distinguish them on that basis (e.g. without having to use CDMA demultiplexing). Similarly, in certain embodiments server 205 provides to user device 10 the CDMA codes of the light-based messaging units 52 within the current local vicinity of user device 10, so that user device 10 can limit its demultiplexing processing to just those codes.

System Environment.

Generally speaking, except where clearly indicated otherwise, all of the systems, methods, modules, components, functionality and techniques described herein can be practiced with the use of one or more programmable general-purpose computers. Such devices (e.g., including any of the electronic devices mentioned herein) typically will include, for example, at least some of the following components coupled to each other, e.g., via a common bus: (a) one or more central processing units (CPUs); (b) read-only memory (ROM); (c) random access memory (RAM); (d) other integrated or attached storage devices; (e) input/output devices and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); (f) software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; (g) a display (such as a liquid crystal display, an organic light-emitting display, a polymeric light-emitting display or any other thin-film display); (h) other output devices (such as one or more speakers, a headphone set, a laser or other light projector and/or a printer); (i) one or more input devices (such as a mouse, one or more physical switches or variable controls, a touchpad, tablet, touch-sensitive display or other pointing device, a keyboard, a keypad, a microphone and/or a camera or scanner); (j) a mass storage unit (such as a hard disk drive, a solid-state drive, or any other type of internal storage device); (k) a real-time clock; (l) a removable storage read/write device (such as a flash drive, a memory card, any other portable drive that utilizes semiconductor memory, a magnetic disk, a magnetic tape, an opto-magnetic disk, an optical disk, or the like); and/or (m) a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop, tablet or slate) computers and/or smaller computers, such as personal digital assistants (PDAs), wireless telephones (e.g., smartphones) or any other programmable appliance or device, whether stand-alone, hardwired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality and/or for implementing the modules and components of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

Additional Considerations.

As used herein, the term "coupled", or any other form of the word, is intended to mean either directly connected or connected through one or more other elements or processing blocks, e.g., for the purpose of preprocessing. In the drawings and/or the discussions of them, where individual steps, modules or processing blocks are shown and/or discussed as being directly connected to each other, such connections should be understood as couplings, which may include additional steps, modules, elements and/or processing blocks. Unless otherwise expressly and specifically stated otherwise herein to the contrary, references to a signal herein mean any processed or unprocessed version of the signal. That is, specific processing steps discussed and/or claimed herein are not intended to be exclusive; rather, intermediate processing may be performed between any two processing steps expressly discussed or claimed herein.

As used herein, the term "attached", or any other form of the word, without further modification, is intended to mean directly attached, attached through one or more other intermediate elements or components, or integrally formed together. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Where a specific value is mentioned herein, such a reference means that value or substantially that value, which includes values that are not substantially different from the stated value, i.e., permitting deviations that would not have substantial impact within the identified context. For example, stating that a continuously variable signal level is set to zero (0) would include a value of exactly 0, as well as small values that produce substantially the same effect as a value of 0.

In the preceding discussion, the terms "operators", "operations", "functions" and similar terms refer to method or process steps or to hardware components, depending upon the particular implementation/embodiment.

In the event of any conflict or inconsistency between the disclosure explicitly set forth herein or in the accompanying drawings, on the one hand, and any materials incorporated by reference herein, on the other, the present disclosure shall take precedence. In the event of any conflict or inconsistency between the disclosures of any applications or patents incorporated by reference herein, the disclosure most recently added or changed shall take precedence.

For purposes of the present disclosure, any explicit or implicit reference to any data items being included within the same database record means that such data items are linked together or logically associated with each other. Also, except to the extent clearly and expressly indicated to the contrary, references herein and/or in the accompanying drawings to information being included within a database, or within different databases, are not to be taken as limiting; rather, such references typically are intended to simplify and/or more clearly illustrate the subject discussion, and in alternate embodiments any or all of the referenced information can be distributed across any number of database structures, as is well-understood in the art.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In certain instances, the foregoing description refers to clicking or double-clicking on user-interface buttons (typically in reference to desktop computers or laptops), touching icons (typically in reference to devices with touchscreens), dragging user-interface items, or otherwise entering commands or information via a particular user-interface element or mechanism and/or in a particular manner. All of such references are intended to be exemplary only, it being understood that each such reference, as well as each other aspect of the present invention as a whole, encompasses designation or entry of commands or information by a user in any of the ways mentioned herein or in any other known manner, using the same or any other user-interface element or mechanism, with different entry methods and different user-interface elements being most appropriate for different types of devices and/or in different situations. In addition, or instead, any and all references to inputting commands or information should be understood to encompass input by an automated (e.g., computer-executed) process.

In the above discussion, certain methods are explained by breaking them down into steps listed in a particular order. Similarly, certain processing is performed by showing and/or describing modules arranged in a certain order. However, it should be noted that in each such case, except to the extent clearly indicated to the contrary or mandated by practical considerations (such as where the results from one step are necessary to perform another), the indicated order is not critical but, instead, that the described steps and/or modules can be reordered and/or two or more of such steps (or the processing within two or more of such modules) can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. A messaging system, comprising:
   a plurality of messaging units disposed at different locations within a retail store, each of said messaging units including at least one light source;
   at least one messaging/modulation controller coupled to the light sources and configured to turn the light sources on and off so as to broadcast input digital messages;
   a central server coupled to the at least one messaging/modulation controller and configured to selectively provide messages to said at least one messaging/modulation controller for broadcast by different ones of said messaging units; and
   sensors coupled to the central server and configured to: (a) obtain information about individuals within the retail store and (b) provide said information to the central server,
   wherein the central server selects messages to be broadcast by individual ones of the messaging units based on the information received from said sensors, and
   wherein said sensors comprise at least one of: a camera, a RFID sensor, a laser range finder, a radio receiver having a directional antenna, or a sensor provided on a user device carried by one of said individuals.

2. A messaging system according to claim 1, further comprising at least one receiver that receives transmissions from user devices within the retail store.

3. A messaging system according to claim 2, wherein the central server selects messages to be broadcast by individual ones of the messaging units also based on said received transmissions.

4. A messaging system according to claim 1, wherein each of a plurality of said sensors comprises a camera.

5. A messaging system according to claim 1, wherein each of a plurality of said sensors is provided on a user device carried by one of said individuals.

6. A messaging system according to claim 1, wherein the at least one light source in each of a plurality of said messaging units includes a light-emitting diode (LED).

7. A messaging system according to claim 1, wherein the central server selects said messages to be broadcast by individual ones of the messaging units also based on manually input information regarding said individuals within the retail store.

8. A messaging system according to claim 1, wherein said sensors comprise plural different kinds of sensors.

9. A messaging system according to claim 8, wherein said sensors comprise a camera and at least one of a radio receiver and an infrared sensor.

10. A messaging system according to claim 1, further comprising a tracking system that tracks locations of a plurality of said individuals within the retail store and provides said location information to the central server.

11. A messaging system according to claim 10, wherein the tracking system inputs data from a plurality of said sensors and then combines said data to generate tracking information.

12. A messaging system according to claim 11, wherein said data from said plurality of said sensors is combined to generate said tracking information using at least one of triangulation or Kalman filtering.

13. A messaging system according to claim 10, wherein the central server selects messages to be broadcast by individual ones of the messaging units also based on said location information.

14. A messaging system according to claim 10, wherein the tracking system tracks the locations of said plurality of the individuals based on broadcasts from user devices carried by said plurality of the individuals.

15. A messaging system according to claim 10, wherein the tracking system tracks said locations of both (a) registered users whose user devices are in bidirectional communication within said messaging system and (b) other individuals who are not registered users.

16. A messaging system according to claim 15, wherein said locations are displayed on a map of at least a portion of said retail store, and wherein said registered users are designated in a first manner on said map and said other individuals are designated in a second manner on said map, said first manner being different than said second manner.

17. A messaging system according to claim 16, wherein said sensors comprise a radio receivers.

18. A messaging system according to claim 17, wherein said radio receivers are used to identify the locations of said other individuals.

19. A messaging system according to claim 1, wherein said information about said individuals within the retail store said information pertains to at least one of personal characteristics or activities of said individuals.

20. A messaging system according to claim 1, wherein said information about said individuals within the retail store comprises at least one of approximate age, gender, height, facial characteristics, or biometric information.

21. A messaging system according to claim 1, wherein said information about said individuals within the retail store is used to track locations of individuals who are not communicating within said messaging system.

* * * * *